United States Patent
Kaminaga et al.

[11] Patent Number: 5,772,946
[45] Date of Patent: Jun. 30, 1998

[54] PRESS-FORMING APPARATUS

[75] Inventors: Kenzo Kaminaga, Tokyo; Kouichi Imai, Shizuoka-ken; Takaaki Watabe, Tokyo; Hisao Matsuno, Kanagawa-ken; Masaaki Suzuki, Tokyo; Akira Nishioka, Tokyo; Yusi Sakurada, Tokyo; Teruo Kagawa, Tokyo, all of Japan

[73] Assignee: Nikkiso Company Limited, Tokyo, Japan

[21] Appl. No.: 481,274
[22] PCT Filed: Oct. 18, 1994
[86] PCT No.: PCT/JP94/01748
  § 371 Date: Nov. 7, 1995
  § 102(e) Date: Nov. 7, 1995
[87] PCT Pub. No.: WO95/12486
  PCT Pub. Date: May 11, 1995

[30] Foreign Application Priority Data

| Nov. 4, 1993 | [JP] | Japan | 5-275827 |
| Jun. 13, 1994 | [JP] | Japan | 6-130409 |
| Jun. 13, 1994 | [JP] | Japan | 6-130688 |
| Jun. 14, 1994 | [JP] | Japan | 6-132321 |
| Jun. 16, 1994 | [JP] | Japan | 6-134651 |
| Jul. 15, 1994 | [JP] | Japan | 6-154427 |

[51] Int. Cl.$^6$ .................................................. B28B 7/06
[52] U.S. Cl. .......................... 264/313; 264/101; 264/102; 264/571; 425/389; 425/405.1; 425/405.2
[58] Field of Search .................................... 264/101, 102, 264/313, 571; 425/389, 405.1, 405.2; 156/89

[56] References Cited

U.S. PATENT DOCUMENTS

| 1,854,498 | 4/1932 | Anderson | 425/405.1 |
| 1,863,854 | 6/1932 | Jeffery | 264/313 X |
| 2,415,504 | 2/1947 | MacDonald | 425/389 |
| 3,284,195 | 11/1966 | Googin et al. | 264/313 X |
| 3,323,188 | 6/1967 | Abbot | 425/405.1 |
| 3,593,380 | 7/1971 | Voronov et al. | 425/389 |
| 3,650,657 | 3/1972 | Witkin | 425/389 |
| 3,662,041 | 5/1972 | Hartman | 264/313 |
| 4,148,597 | 4/1979 | Larsen | 425/389 |
| 4,704,082 | 11/1987 | Buhler et al. | 425/405.1 |
| 4,851,167 | 7/1989 | Marc | 264/26 |
| 5,122,176 | 6/1992 | Goettler | 65/102 |
| 5,137,663 | 8/1992 | Conaway | 264/36 |

Primary Examiner—Donald E. Czaja
Assistant Examiner—Sean Vincent
Attorney, Agent, or Firm—Browdy and Neimark

[57] ABSTRACT

A press-forming apparatus is disclosed in which a preform such as green sheets, for example, is charged into a cavity in a pressure container, the cavity is covered with a lid member, and the green sheets are pressed by a pressure medium while the green sheets are heated by heating means, whereby the green sheets are press-formed into an integral laminated product. The pressure force should preferably be fluctuated during the pressing operation.

9 Claims, 34 Drawing Sheets

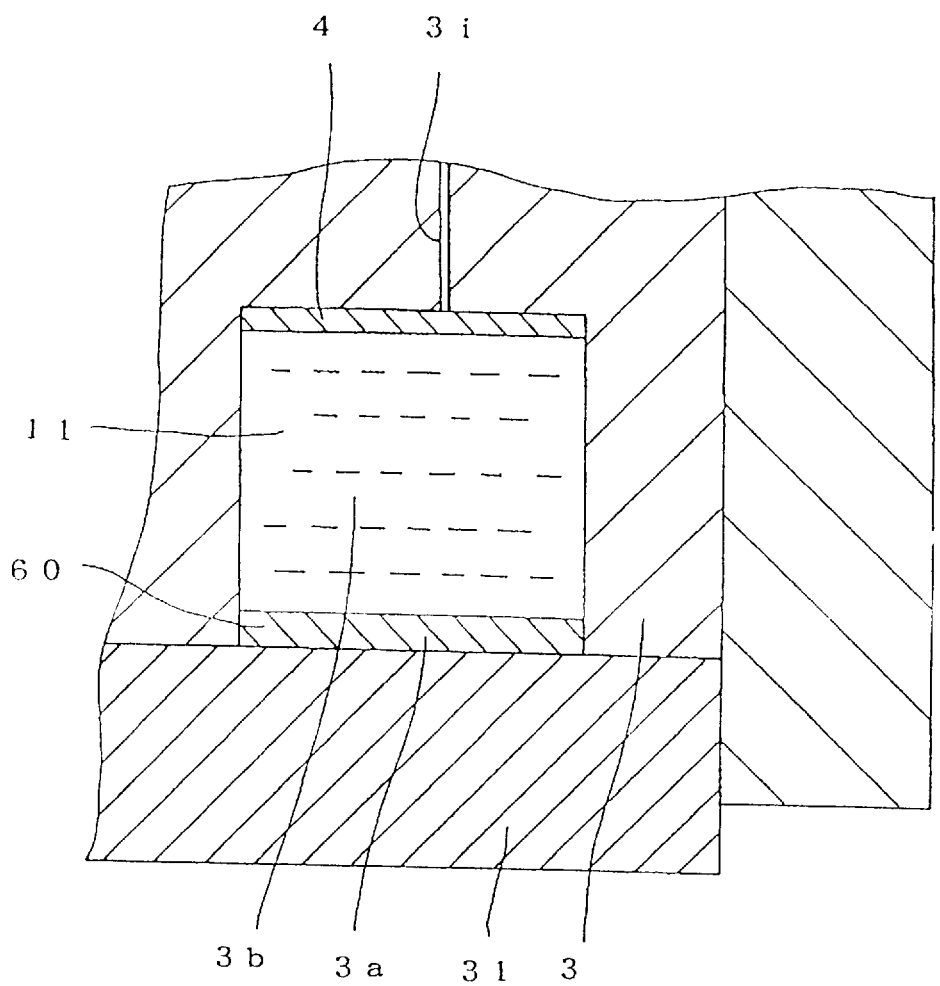
F I G. 8

F I G. 4 4
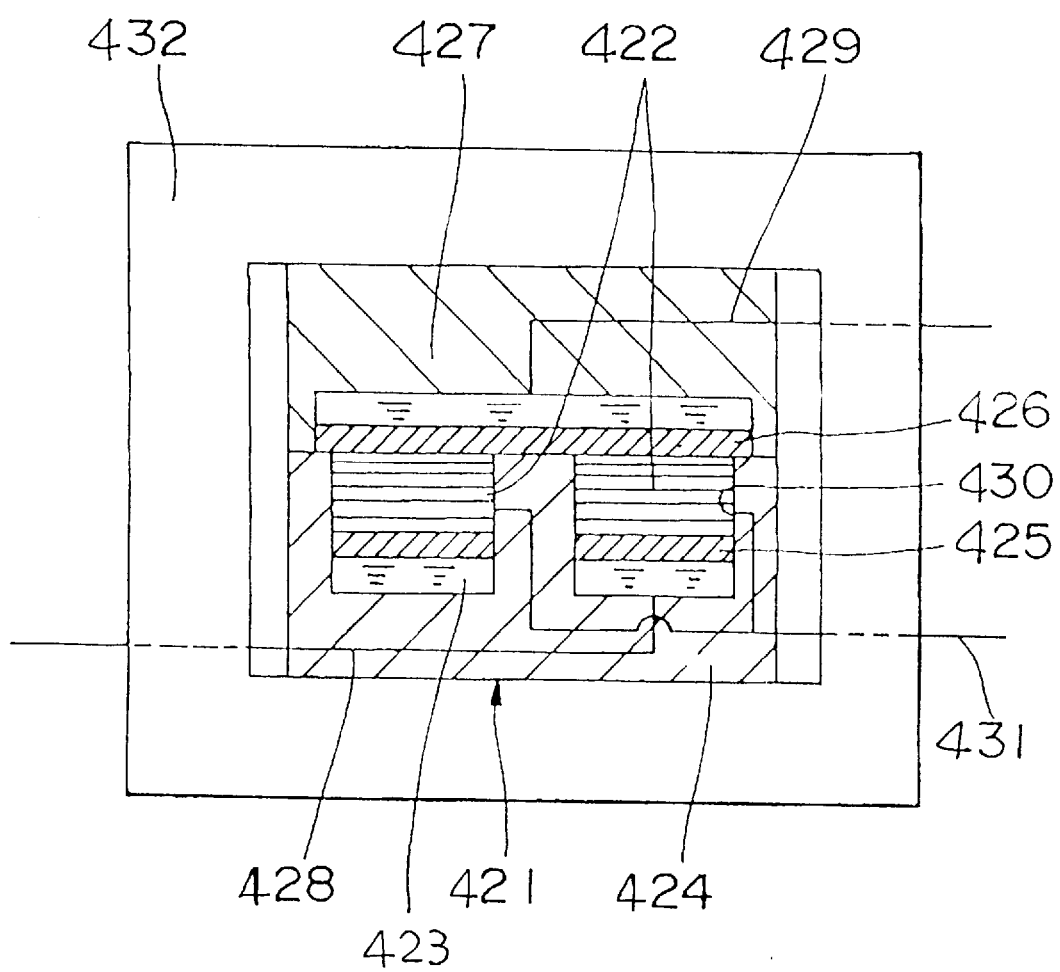

PRESS-FORMING APPARATUS

TECHNICAL FIELD

The present invention relates to a press-forming apparatus for press-forming a preform, such as ceramic green sheet, a prepreg comprising reforcing fibers impregnated with thermoplastic resin or the like, and so on, and to a method of press-forming such a preform.

BACKGROUND ART

In the past, a multilayer capacitor was known as an example of ceramic laminate. The multilayer capacitor has a plurality of layers of internal electrodes formed in the ceramic unit and external electrodes electrically connected to the internal electrodes and disposed on the opposite ends of the capacitor.

In the conventionally known method of making such multilayer capacitor, a plurality of rectangular electrodes are formed on a ceramic green sheet. A plurality of such green sheets each having a plurality of electrodes are stacked one upon another and, thereafter, are pressed by a mechanical press to bond the green sheets together. The press-bonding is carried out such that the stacked green sheets are placed in a lower mold member of a metallic mold and then pressed by an upper mold member so that the green sheets are formed or moulded into a caramic unit free of any gap between the sheets. After the press-bonding, the ceramic unit is cut into a columnar chip which is then subjected to a burning. Thereafter, the external electrodes are formed on the opposite sides of the thus burned chip.

The press-bonding method carried out by the mechanical press has a problem that, because each sheet has different thicknesses in a portion formed with internal electrodes and in other portions free of the electrodes, the other portion of the sheet cannot be pressed to a desired density and thus is liable to cause a delamination.

Especially, the difference in density attained by the press-bonding is greater and becomes highly influential as the number of stacked green sheets is increased. Thus, there has been a problem that the production of multilayer capacitors is liable to make defective products due to insufficient or poor press-bonding with a resultant low production yield.

In addition, the press-bonding by the mechanical press causes strain in the metallic mold during pressing, so that the application of force varies with the operative positions of the upper and lower mold members to generate uneven pressing force which is one of the causes of the delamination.

Moreover, when the press-bonding is carried out by the mechanical press, the chip after the burning has a substantially completely columnar shape. Thus, the external electrodes formed on the columnar chip project or bulge therefrom a distance equal to the thickness of each external electrodes, with a resultant problem that the mountability of the chip onto a substrate is lowered.

The present invention was made under the circumstances explained above.

In other words, the present invention has an object to provide apparatus and method which solve the problems pointed out above and are effective to uniformly press a preform such as, for example, a stack of ceramic green sheets to produce, at an improved yield, a press-formed product such as a ceramic laminate which is free of delamination and damage.

Another object of the present invention is to provide a press-forming apparatus which is free from mechanical trouble and which is operative to produce laminated products speedily and cyclically.

A further object of the present invention is to provide a press-forming apparatus in which, when a projecting portion of a lid member is to be fitted into or removed from a cavity in a pressure container, the projecting portion of the lid member can be fitted into and removed from the cavity easily, smoothly and without any trouble.

A still further object of the present invention is to provide a press-forming apparatus in which, when a projecting portion of a lid member is to be fitted into or removed from a cavity in a pressure container, the projecting portion of the lid member can be fitted into and removed from the cavity easily, smoothly and without any trouble, and in which gas generated during a press-forming operation can be removed to assure that the apparatus can produce void-free and scratch-free laminated products at an improved yield.

A still further object of the present invention is to provide a press-forming apparatus which, when a pressurized fluid is forcibly introduced into a pressurized fluid containing space defined by an elastic member disposed to extend across a cavity and an inner surface of the cavity to apply a pressure to a stack of sheet placed in a material receiving space defined by the elastic member, the inner surface of the cavity and a projecting portion of a lid member fitted into the cavity (the projecting portion is also termed as an insert because the portion is inserted into the cavity) to thereby form a laminate, are capable of producing a void-free, crack-free and scratch-free laminate quickly, cyclically and without any troubles such as mechnical troubles caused when the lid member is mounted in or dismounted from the cavity in a pressure container or a trouble that the elastic member is damaged due to strain caused by mounting and dismounting of the lid member.

It is a still further object of the present invention to provide a press-forming apparatus in which a pressurized fluid containing space is structured in a liquid-tight manner to assure an efficient press-forming of laminate.

It is a still further object of the present invention to provide a press-forming apparatus which has a simplified structure and can be made easily.

It is a still further object of the present invention to provide a press-forming apparatus in which the pressure in the material receiving space can be smoothly reduced when a projecting portion of a lid member is fitted into the material receiving space or after the projecting portion of the lid member has been fitted into the material receiving space.

It is a still further object of the present invention to provide a press-forming apparatus in which an elastic member provided in a material receiving space is not damaged even if the pressure in the material receiving space is reduced after a projecting portion of a lid member has been fitted into the material receiving space and which is operative to produce void-free and bubble-free laminates.

It is a still further object of the present invention to provide a press-forming apparatus which is structured to assure that the product obtained by a press-forming operation can be taken out with its shape kept completely and without any damage caused to the product whereby the apparatus is capable of producing press-formed products at an improved yield.

DISCLOSURE OF THE INVENTION

The present invention is a press-forming apparatus comprising:

a pressure container having formed therein a cavity having an opening at one end and an inner end face opposite to said opening;

a lid for closing said opening of said cavity;

fixing means for fixing said lid to said pressure container so as not to be separable therefrom when a press-forming of a preform received in said pressure container is performed with said lid mounted on said pressure container to close said opening; and means for heating the interior of said cavity;

said pressure container being provided with a first elastic member disposed in said cavity to extend across said cavity so as to divide said cavity into a material receiving space for receiving the preform and a pressurized fluid containing space for containing a pressurized fluid and sealingly separate said spaces from each other, first pressurized fluid introducing and discharging means for forcibly introducing and discharging the pressurized fluid into and out of said pressurized fluid containing space, and gas introducing and discharging means for introducing and discharging gas into and out of said material receiving space; and said fixing means comprising a frame having horizontal members for confining upper and lower end faces of said pressure container with said lid mounted thereon to close said opening during the press-forming, said frame having formed therein a central space for receiving said pressure container and being movable to a retracted position remote from said pressure container when the apparatus is not in press-forming operation The present invention is a press-forming apparatus comprising:

a pressure container having formed therein a cavity having an opening at one end and an inner end face opposite to said opening;

a lid for closing said opening of said cavity;

fixing means for fixing said lid to said pressure container so as not to be separable therefrom when a press-forming of a preform received in said pressure container is performed with said lid mounted on said pressure container to close said opening; and means for heating the interior of said cavity;

said pressure container being provided with a first elastic member disposed in said cavity to extend across said cavity so as to divide said cavity into a material receiving space for receiving the preform and a pressurized fluid containing space for containing a pressurized fluid and sealingly separate said spaces from each other, first pressurized fluid introducing and discharging means for forcibly introducing and discharging the pressurized fluid into and out of said pressurized fluid containing space, and gas introducing and discharging means for introducing and discharging gas into and out of said material receiving space;

said lid being provided with a second elastic member for covering said opening of said cavity in a liquid-tight manner, a pressing space covered by said second elastic member so as to receive the pressurized fluid, and a second pressurized fluid introducing means for introducing the pressurized fluid into said pressing space; and said fixing means comprising a frame having horizontal members for confining upper and lower end faces of said pressure container with said lid mounted thereon to close said opening during the press-forming, said frame having formed therein a central space for receiving said pressure container and being movable to are tracted position remote from said pressure container when the apparatus is not in press-forming operation.

The present invention is a press-forming apparatus comprising:

a pressure container having formed therein a cavity having an opening at one end and an inner end face opposite to said opening;

a lid for closing said opening of said cavity;

fixing means for fixing said lid to said pressure container so as not to be separable therefrom when a press-forming of a preform received in said pressure container is performed with said lid mounted on said pressure container to close said opening; and means for heating the interior of said cavity;

said pressure container being provided with a first elastic member disposed in said cavity to extend across said cavity so as to divide said cavity into a material receiving space for receiving the preform and a pressurized fluid containing space for containing a pressurized fluid and sealingly separate said spaces from each other, first pressurized fluid introducing and discharging means for forcibly introducing and discharging the pressurized fluid into and out of said pressurized fluid containing space, and gas introducing and discharging means for introducing and discharging gas into and out of said material receiving space;

said lid being provided with a second elastic member for covering said opening of said cavity in a liquid-tight manner, a pressing space covered by said second elastic member so as to receive the pressurized fluid, and a pressurized fluid layer comprising a layer of the pressurized fluid sealed in said pressing space; and said fixing means comprising a frame having horizontal members for confining upper and lower end faces of said pressure container with said lid mounted thereon to close said opening during the press-forming, said frame having formed therein a central space for receiving said pressure container and being movable to a retracted position remote from said pressure container when the apparatus is not in press-forming operation.

The present invention is a press-forming apparatus comprising:

a pressure container having formed therein a cavity having an opening at one end and an inner end face opposite to said opening;

a lid for closing said opening of said cavity;

fixing means for fixing said lid to said pressure container so as not to be separable therefrom when a press-forming of a preform received in said pressure container is performed with said lid mounted on said pressure container to close said opening; and means for heating the interior of said cavity;

said pressure container being provided with a first elastic member disposed in said cavity to extend across said cavity so as to divide said cavity into a material receiving space for receiving the preform and a pressurized fluid containing space for containing a pressurized fluid and sealingly separate said spaces from each other, and first pressurized fluid introducing and discharging means for forcibly introducing and discharging the pressurized fluid into and out of said pressurized fluid containing space; and said lid having a projecting portion to be fitted into said cavity to close said opening and being provided with gas introducing and discharging measns for introducing and discharging gas into and out of said material receiving space in said cavity.

The present invention is a press-forming apparatus comprising:

a pressure container having formed therein a cavity with an opening at one end and an inner end face opposite to said opening, and an elastic member disposed to extend across said cavity and cooperate with said inner end face of said cavity and an inner peripheral surface thereof to define a first pressurized fluid containing space;

pressurized fluid introducing and discharging means for forcibly introducing and discharging a pressurized fluid into and out of said first pressurized fluid containing space;

an insert to be inserted into said cavity; and fixing means for fixing said insert to said pressure container so as not to be separable therefrom when a press-forming of a preform received in said pressure container is performed with said insert inserted in said cavity in said pressure container;

said insert having a cylinder and a piston;

said cylinder having an outer peripheral surface to be disposed in sliding engagement with said inner peripheral surface of said cavity, an inner peripheral surface to be disposed in sliding engagement with an outer peripheral surface of a free end portion of said piston, a material receiving space defined by a free end face of said piston and said inner peripheral surface of the cylinder, and piston driving means for actuating said piston.

The present invention is a method of manufacturing a formed product by using a press-forming apparatus of any one of the inventions pointed out above, wherein a preform is placed in said material receiving space in said cavity, said lid is mounted on said pressure container to close said opening of said cavity with said preform placed therein, said pressure container with said lid mounted thereon is placed in said fixing means centrally thereof, thereafter, a pressurized fluid is forcibly introduced by first pressurized fluid feeding means into a space between said inner end face of said cavity and said first elastic member and said material receiving space is evacuated by said gas introducing and discharging means while the interior of said cavity is heated by heating means, to thereby form said preform into a press-formed product, thereafter, gas is introduced by said gas introducing and discharging means into said material receiving space to restore the pressure therein to a normal pressure level and the pressurized fluid in said pressurized fluid containing space is discharged therefrom by said first pressurized fluid feeding means, said fixing means is moved away from said pressure container, then said lid is removed from said pressure container and, thereafter, the pressurized fluid is forcibly introduced by said first pressurized fluid feeding means into said pressurized fluid containing space to force said press-formed product out of said material receiving space.

BRIEF DESCRIPTION OF THE DRAWINGS

FIG. 8 is a schematic sectional view of a further example of the laminated ceramic product making apparatus which is an example of the present invention, the further example of the apparatus having a mold releasing member disposed in a cavity;

FIG. 44 is a diagrammatic sectional view showing an example of the press-forming apparatus used in the method of the present invention.

BEST MODES FOR CARRYING OUT THE INVENTION

Figure 1:
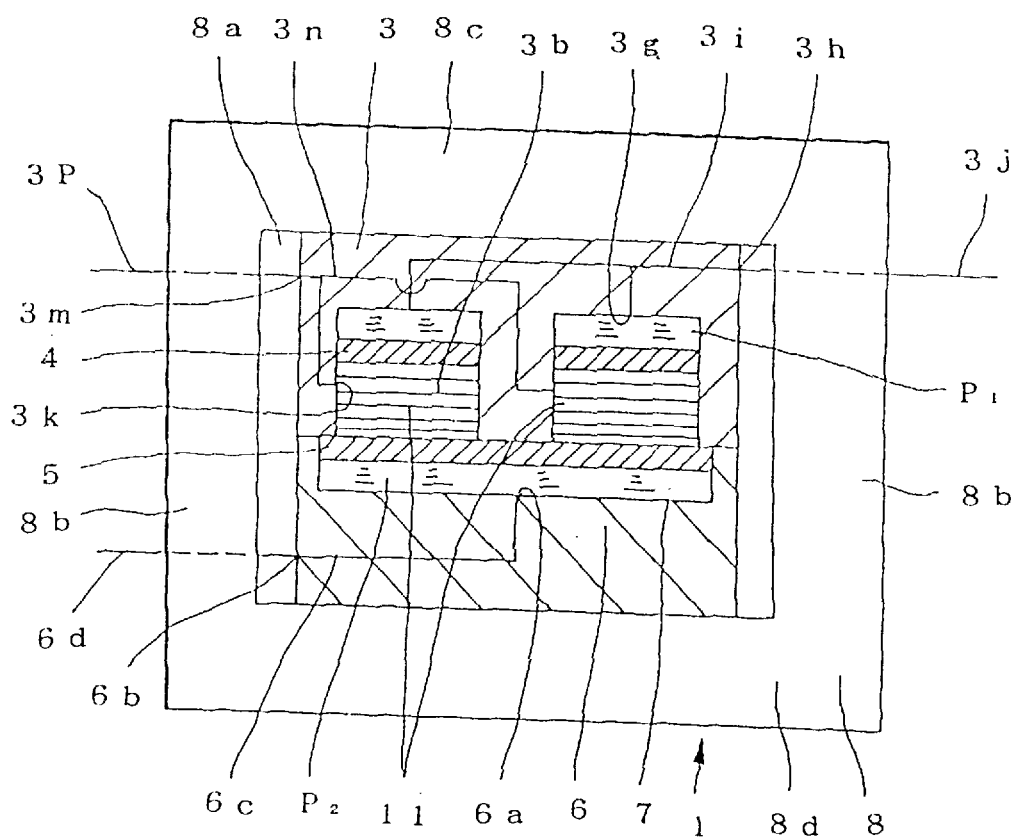
FIG. 1 is a schematic sectional view showing a laminated ceramic product making apparatus which is an example of the present invention.

A material which is to be fed into and pressed by a press-forming apparatus of the invention is termed as a preform.

The preform may be of any kind so long as it can be charged into the press-forming apparatus and pressed by a pressurized fluid into a formed product.

Preferred examples of the preform are a prepreg comprising reinforcing fibers, a thermo-setting resin in a partly harded condition (which may be called as B stage) and solvent, as desired; another prepreg comprising reinforcing fibers, a thermoplastic resin and solvent, as desired; a further prepreg comprising reinforcing fibers, ceramic particles, an unhardened resin, a hardener, a solvent, as desired, and so on, powdery materials mainly formed of ceramics, and ceramic green sheets.

The reinforcing fibers in the prepreg may be PAN-based carbon fibers, pitch-based carbon fibers, ceramic fibers, carbon fibers made by vapor phase growing, and so on.

Preferred examples of the thermo-setting resin are epoxy resin, unsaturated polyester resin, vinylester resin, phenol resin, and so on. Preferred examples of the thermoplastic resin are polyethylene, polypropylene, polystyrene, nylon, polybutylenetelephthalate, ABS resin, polysulfone resin, polyphenylenesulfide resin, polyethersulfone, polyetheretherketone, thermoplastic polyimide, and so on.

In the case where a thermo-setting resin is used, a hardener should preferably be used.

The prepreg may be of any form and may be in the form of a sheet.

Examples of the ceramics are $Al_2O_3$, $Al_2O_3$—TiC (TiN), BeO, MgO, lead titanate zirconate (PZT), Mn-Zn ferrite, $Y_2Fe_5O_{12}$, $ZrB_2$, $Si_3N_4$, zirconia, mullite, $SiO_2$, aluminium nitride, and so on.

The powdery material mainly formed of ceramics may include known additives such as solvents and binders, if necessary.

The ceramic green sheet may be a flexible sheet or film formed by molding a mixture of powdery ceramic and/or a meterial which forms a ceramic, a binder of an organic polymer or an inorganic polymer which is reformed into a ceramic by burning and, if required, a solvent. The ceramic green sheet may alternatively be a sheet which does not include the binder or the solvent and which has a low flexibility and is formed by molding powdery ceramic and/or a material which forms a ceramics. The ceramic green sheet may include reinforcing fibers such as ceramic fibers.

The press-forming apparatus can be used to make formed or molded products such as ceramic capacitors, large-sized radar domes and other component parts for airplane, radar domes and sonar domes for submarine, IC packages, valve members, pump impellers, turbine blades, jet engine exhaust port plugs, and furnace materials. In addition, the well known formed or molded FRP products can also be formed by the method of the present invention.

However, the press-forming apparatus is suited for the formation or molding of the above-mentioned ceramic green sheets into ceramic capacitors and so on.

Accordingly, a press-forming apparatus which forms or molds ceramic green sheets into products will be described in detail hereinunder.

A. PRESS-FORMING APPARTUS

EXAMPLE 1

The press-forming apparatus shown in this example may be called as "ceramic lamination making apparatus" which is conveniently descriptive of the contents thereof.

The ceramic lamination making apparatus is disclosed as an example 1 in Japanese Patent Application No. Hei 6-134651 on which the present application is based.

As shown in FIG. 1, the ceramic lamination making apparatus 1, which is an embodiment of the present invention, comprises a pressure container body (which is also termed "base" in this embodiment) 3, first elastic members 4, second elastic members 5, a lid 6 and a yoke 8 which is a fixing member.

The base 3 has a cylindnrical outer shape. However, the base may have any other outer shape, such as a square-shaped post-like configuration.

Figure 2:
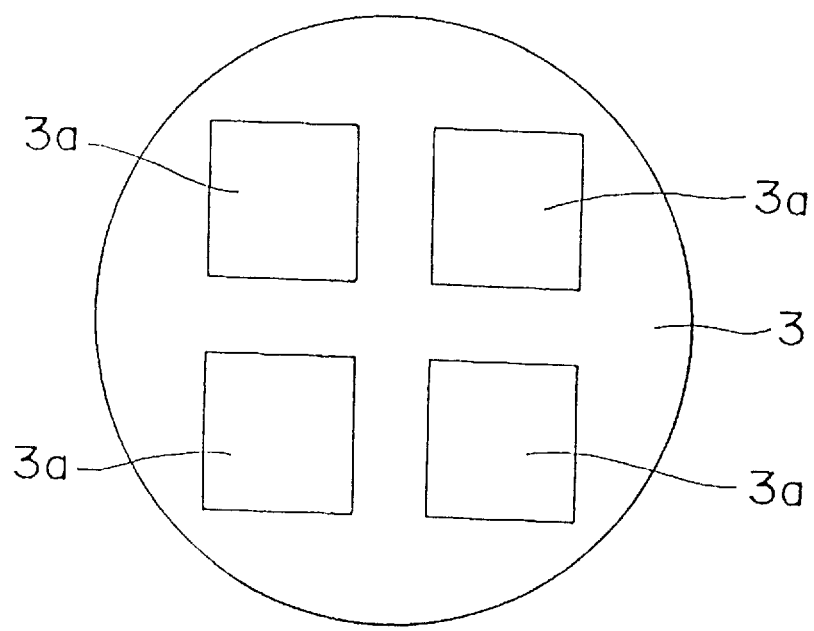
FIG. 2 is a schematic plan view showing the bottom surface of a pressure container (which is also termed as base for the sake of convenience) of a laminated ceramic product making apparatus which is an example of the press-forming apparatus of the present invention.
Figure 3:
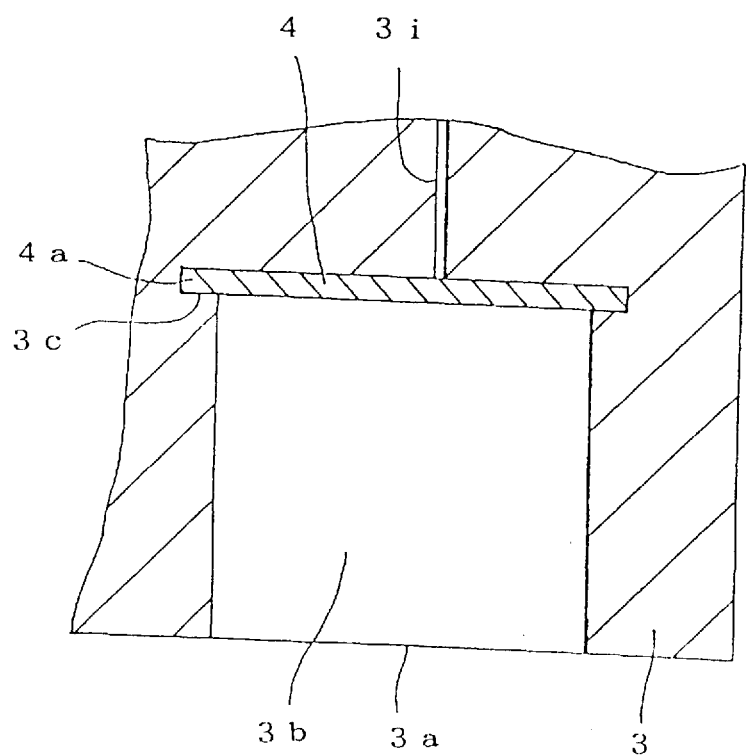
FIG. 3 is a schematic sectional view of a part of the base of the laminated ceramic product making apparatus which is an example of the present invention.

As shown in FIGS. 2 and 3, the base 3 has a bottom face in which are formed four cavities 3b each having a square opening 3a. The size of each opening 3a is so determined as to be substantially equal to the size of the upper surface of a ceramic lamination to be obtained. Ceiling surfaces of the cavities 3b are formed in the base 3.

As shown in FIG. 1, the first elastic members 4 are so disposed on the ceiling surfaces of the cavities 3b as to be in liquid-tight engagement with the peripheral surfaces of the cavities 3b. In the embodiment shown in FIG. 1, pressurized liquid is held between the ceiling surface of each cavity 3b and the associated first elastic member 4 so that the first elastic member 4 is downwardly bulged way from the ceiling surface.

Figure 4:
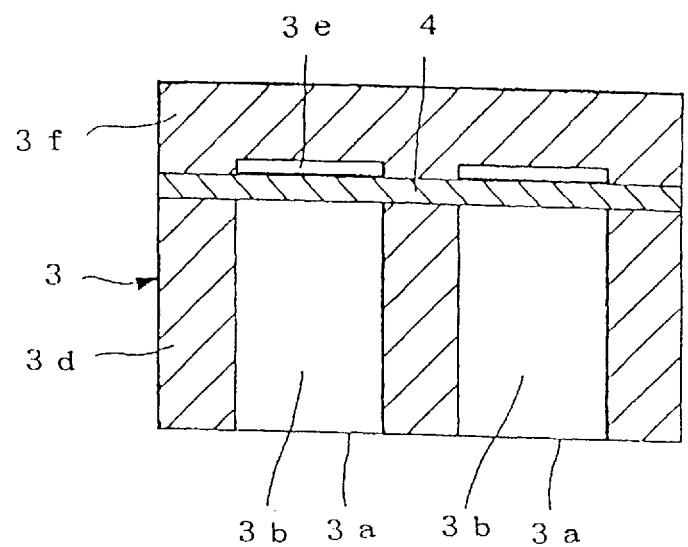
FIG. 4 is a schematic sectional view showing a modification of the base of the laminated ceramic product making apparatus which is an example of the present invention.

The first elastic members 4 may be made of any pressure-resistant material having elasticity, and is usually made from rubber. In order to dispose the first elastic members 4 on the ceiling surfaces of the cavities 3b, the outer peripheral edge 4a of each elastic member 4 may be tightly fitted into a gap 3c formed in the base adjacent to the ceiling surface of the associated cavity 3b, as shown in FIG. 3. Alternatively, the base 3 may, as shown in FIG. 4, comprise a first cylindrical base member 3d having formed therein four through-holes each having a square opening 3a, a second disk-like base member 3f having formed therein four shallow recesses 3e of the same shapes as the four through-holes, and a first elastic member 4 of, for example, rubber having an area the same as that of the upper surface of the first base member 3d and that of the bottom face of the second base member 3f and interposed between the upper surface of the first base member 3d and the bottom surface of the second base member 3f.

As shown in FIG. 1, the base 3 has formed therein a first pressurized fluid introducing and discharging passage 3i connecting a first port 3g opened in the ceiling surface of each cavity 3b to a second port 3h opened in the outer peripheral surface of the base 3. A pipe line 3j introduces pressurized fluid into the second port 3h from a pressurized fluid reservoir (not shown) disposed outside the base 3. A first pressurized fluid feeding means (not shown) having a pump (not shown) is provided in the pipe line 3j to pump the pressurized fluid to the first pressurized fluid introducing and discharging passage 3i so that the pressurized fluid is forcibly introduced into a space between the ceiling surface of the cavity 3b and the first elastic member 4 therein. In this embodiment, a first pressurized fluid introducing mechanism comprises the first pressurized fluid introducing and discharging passage 3i and the first pressurized fluid feeding means.

The base 3 has formed therein a gas introducing and discharging passage 3n connecting a third port 3k open in the part of the inner peripheral surface of each cavity 3b which is not covered with the first and second elastic members 4 and 5, to a fourth port 3m open in the outer peripheral surface of the base 3. To the gas introducing and discharging passage 3n are connected a pipe line 3p connected to the fourth port 3m, a gas discharging pump (not shown) connected to an end of the pipe line 3p and a gas discharging means (not shown) comprising a gasleakage valve (not shown) disposed in the pipe line 3p. In this embodiment, a gas introducing and discharging means comprises the gas introducing and discharging passage 3n and the gas discharging means.

The second elastic member 5 is formed of an elastic material such as rubber and is in the form of a sheet of a size large enough to cover all of the openings of the four cavities 3b open in the upper surface of the base 3.

The lid 6 has an upper surface of size and area substantially the same as those of the bottom surface of the base 3. The upper surface of the lid is formed therein with a recess 7 of an area large enough to cover all of the openings of the four cavities 3b in the bottom surface of the base 3. The second elastic member 5 is mounted in the recess 7 with the peripheral surface of the elastic member disposed in sealing engagement with the inner peripheral surface of the recess 7. The second elastic member 5 and the recess 7 are designed such that the shape of the opening of the recess 7 is substantially the same as the shape of the second elastic member 5 in its plan view, or the shape of the second elastic member 5 in its plan view is slightly larger than the shape of the opening of the recess 7.

The lid 6 has formed therein a second pressurized fluid introducing and discharging passage 6c interconnecting a fifth port 6a open in an appropriate portion of the bottom of the recess 7 and a sixth port 6b open in the outer peripheral surface of the lid 6. A second pressurized fluid feeding means (not shown), which comprises a pressurized fluid reservoir (not shown) disposed outside the base 3, a pipe line 6d introducing the pressurized fluid from the pressurized fluid reservoir to the sixth port 6b, and a pump (not shown) disposed in the pipe line 6d for pumping the pressurized fluid to the second pressurized fluid introducing and discharging passage 6c, forcibly introduces the pressurized fluid into a space between the bottom of the recess 7 of the lid 6 and the second elastic member 5. In this embodiment, a second pressurized fluid introducing means comprises the second pressurized fluid introducing and discharging means 6c and the second pressurized fluid feeding means.

The lid 6 is designed to be movable by an appropriate driving means (not shown) between an appropriate position beneath the openings 3a in the base 3 and a lid mounting position in which the lid is mounted on the base 3.

Figure 5:
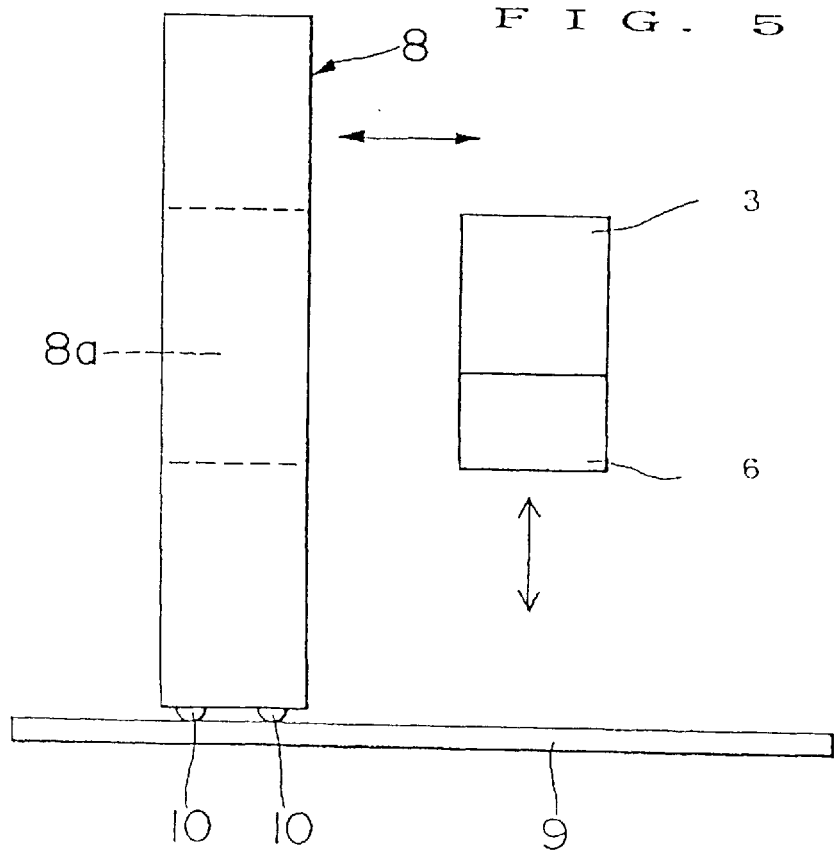
FIG. 5 is a schematic side elevational view showing a laminated ceramic product making apparatus which is an example of the present invention.

As shown in FIGS. 1 and 5, the yoke 8 has a pair of vertically upstanding vertical sections 8b and upper and lower horizontal sections 8c and 8d interconnecting the upper ends of the vertical sections 8b and the lower ends of the vertical sections 8b, respectively. The upper and lower horizontal sections 8c and 8d and the pair of vertical sections 8b cooperate together to define an opening 8a large enough to accommodate the base 3 with the lid 6 mounted thereon. The opening 8a is designed such that, when the base 3 with the lid 6 mounted thereon is received in the opening 8a, the bottom face of the upper horizontal section 8c extends at a level slightly higher than the upper surface of the base 3, the upper face of the lower horizontal section 8d is placed at the level of the bottom face of the lid 6, and the spacing between the pair of vertical sections 8b is of a dimension sufficiently greater than the diameter of the base 3. The base 3 is supported by appropriate means such as a frame (not shown). The opening 8a can also be termed as a space which is capable of accommodating a pressure container comprising the base 3 and the lid 6 mounted thereon.

The yoke 8 is provided with heating means which heats the interiors of the cavities 3b in the base 3 during a pressure forming.

As shown in FIG. 5, the yoke 8 is provided with wheels 10 rolling on a rail 9 so that the yoke is horizontally movable. When a plurality of green sheets of ceramics are received in the cavities 3b in the base 3, the yoke is positioned away from the base 3 so that the lid 6 can be dismounted from the base 3. When a pressure forming is carried out, the yoke 8 is moved so that the base 3 with the lid 6 mounted thereon is received in the opening 8a.

The production of a ceramics lamination by means of the ceramic lamination making apparatus of the described structure will be described hereunder.

In an initial position, the yoke 8 is at a waiting position remote from the base 3 while the lid 6 is positioned beneath the base 3.

Laminations 11 are disposed on the second elastic member 5 mounted on the lid 6.

Each of the laminations 11 comprises a stack of thin sheets of ceramic which, if necessary, has been softly pressed to adhere the ceramic sheets together or, alternatively, has been slightly baked to connect the ceramic sheets together. Further alternatively, the ceramic sheets may be lightly bonded together by means of a binder used to form the sheets.

Figure 6:
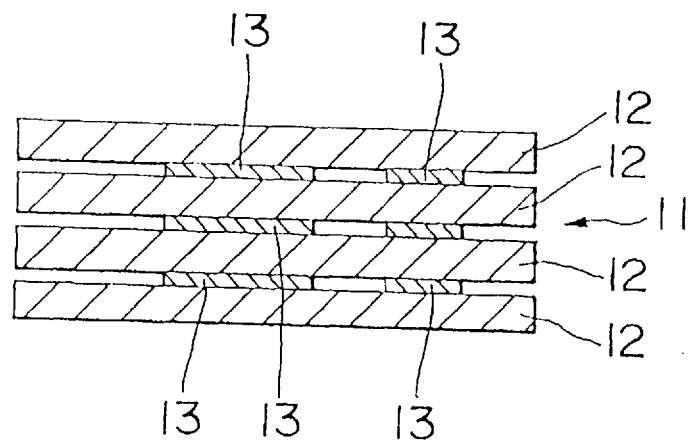
FIG. 6 is a schematic sectional view of a preform comprising a stack of cermic green sheets.

In the case where the laminated ceramics products to be produced by the ceramic lamination making process are to be formed into laminated capacitors, the lamination 11 may comprise a stack of a plurality of ceramic green sheets 12 each having formed thereon a plurality of internal electrodes 13, as shown in FIG. 6.

The lamination 11 shown in FIG. 6 comprises a stack of four green sheets 12 with three layers of internal electrodes 13 formed therein. However, the number of the green sheets 12 to be stacked is not limited to four and the number of the layers of the internal electrodes is not limited to three. Any other numbers of the green sheets and of the internal electrodes may suitably be selected.

After the laminations 11 have been placed on the second elastic member 5, the lid 6 is lifted so that the laminations 11 are received in the cavities 3b. Alternatively, the the lid 6 may not be lifted but the base 3 may be lowered to allow the laminations 11 to be received in the cavities 3b, although this is a mere matter of design choice.

After the laminations 11 have been received in the cavities 3b, the yoke 8 is moved so that the base 3 with the lid 6 mounted thereon is placed in the opening 8a. In this position, the bottom surface of the upper horizontal section 8c of the yoke 8 is positioned very close to the upper surface of the base 3 and the upper surface of the lower horizontal section 8d of the yoke 8 is positioned very close to the bottom surface of the lid 6.

With the members disposed in the described positions, the laminations 11 of a plurality of the stacked ceramic green sheets 12 are pressure-formed as follows:

The pressure-forming may be carried out by any of two methods to be described hereunder.

The first method comprises the step of discharging gas in the cavities 3b by means of gas introducing and discharging means. While the gas is being discharged or after the gas has been discharged to establish a high level of vacuum in the cavities 3b, the pump of the first pressurized fluid feeding means is operated to pump a pressurized fluid P1 from the pressurized fluid reservoir through a pipe line and the first pressurized introducing and discharging passage 3i into a space between the ceiling surface of each cavity 3b and an associated first elastic member 4. The pump of the second pressurized fluid feeding means is also operated to pump a pressurized fluid P2 from a pressurized fluid reservoir through a pipe line and the second pressurized fluid introducing and discharging passage 6c into a space between the bottom face of the recess 7 of the lid 6 and the second elastic member 5. The pressurized fluid P2 introduced into the space between the second elastic member 5 and the bottom of the recess of 7 of the lid 6 generates a pressure which functions to press the lid 6 downwards and urges the second elastic member 5 upwardly into the cavities 3b. However, because the lower horizontal section 8d of the yoke 8 disposed under the lid 6 prevents the lid 6 from being moved downwards, the pressurized fluid P2 introduced into the space between the second elastic member 5 and the lid 6 generates a strong force which functions to urge the laminations 11 upwards via the second elastic member 5. On the other hand, the pressurized fluid P1 introduced into the space between the cavities 3b in the base 3 and the first elastic members 4 disposed therein generates pressures which function to lift the base 3 and urge the first elastic members 4 downwards. However, because the base 3 is fixed and the upper horizontal section 8c of the yoke 8 is disposed on the upper surface of the base 3 to prevent the same from being moved upwards, the pressurized fluid P1 generates a strong pressure which operates to press the laminations 11 downwards via the first elastic members 4.

The laminations 11 received in the cavities 3b are pressed by the strong downward pressure acting through the first elastic members 4 and by the strong pressure acting through the second elastic member 5, so that the ceramic green sheets 12 are firmly bonded together to form laminated ceramic products.

The application of the pressures onto the laminations 11 through the first and second elastic members 4 and 5 may preferably be continued for a predetermined time period. Because pressurized fluid are used for the press-forming, uniform pressures are applied through the first and second elastic members 4 and 5 to the whole surfaces of the green sheets 12. Thus, the pressure-forming does not cause any defect which otherwise would be caused due to uneven application of pressures to stacked green sheets 12.

After the application of pressures for the predetermined time period, pressure relief valves (not shown) respectively provided in the pipe lines 3p and 6d are opened to discharge the pressurized fluid P1 from the spaces between the first elastic members 4 and the ceiling surfaces of the cavities 3b and the pressurized fluid P2 from the space between the second elastic member 5 and the recess 7, whereby the pressures acting through the first and second elastic members 4 and 5 are lowered.

When the pressures are lowered or when the pressure forces are lost, a clearance is formed between the upper surface of the base 3 and the upper horizontal section 8c of the yoke 8 which has regulated the upper surface of the base 3. Similarly, a clearance is also formed between the bottom face of the lid 6 and the lower horizontal section 8d of the yoke 8 which has regulated the bottom surface of the lid 6. Then, the yoke 8 is horizontally moved to its initial retracted position.

The lid 6 is lowered to separate the lid 6 and the second elastic member 5 from the bottom surface of the base 3. Then, the pump of the first pressurized fluid feeding means is further operated to again forcibly introduce the pressurized fluid into the space between each of the first elastic members 4 and the ceiling surface of the associated cavity 3b to apply a pressure through the first elastic member 4 to the laminated ceramic product. The application of the pressure forces the laminated ceramic product downwards out of the cavity 3b. The laminated ceramic product thus forced out is extracted to finish removal of the laminated ceramic product from the cavity 3b.

In the described method of removing the laminated ceramic product, the lid 6 and the second elastic member 5 are separated from the bottom surface of the base 3 and then a pressure is exerted through the first elastic member 4 to the laminated ceramic product left in the associated cavity 3b to extract the laminated ceramic product from the cavity 3b. However, the laminated ceramic product may alternatively be extracted by the following procedure:

The pump of the first pressurized fluid feeding means is further operated in response to the downward movement of the lid 6 to again forcibly introduce the pressurized fluid into the space between each of the first elastic members 4 and the ceiling surface of the associated cavity 3b, so that a pressure is applied through the first elastic member 4 to the laminated ceramic product. Thus, the laminated ceramic product is forced out of the cavity 3b when the lid 6 is lowered. Accordingly, the lid 6 can be removed from the base 3 with the laminated ceramic product thus forced out placed on the lid 6. When the lid 6 is removed from the base 3 by the described procedure, the laminated ceramics product rests on the second elastic member 5 of the thus removed lid 6. Accordingly, the laminated ceramic products can be immediately taken out of the second elastic member 5 and fresh ceramic laminations can be placed on the second elastic member 5. In other words, the operation can be quickly carried out.

The second pressure-forming method can simply be said as being of a content that the pressure required for the pressure-forming of a laminated product is transmitted through the second elastic member 5 and the press-formed laminated ceramic product is removed by utilization of pressure transmitted through an associated first elastic member 4. More specifically, the gas in the cavity 3b is discharged by the gas introducing and discharging means. While the gas is discharged or after the gas has been discharged to create a high level of vacuum in the cavity 3b, the pump of the second pressurized fluid feeding means is operated to forcibly introduce the pressurized fluid P2 from the pressurized fluid reservoir through the pipe line 6d and the second pressurized fluid introducing and discharging passage 6c into the space between the bottom face of the recess 7 in the lid 6 and the second elastic member 5. The pressurized fluid P2 forced into the space between said bottom face of the recess 7 in the lid 6 and the second elastic member 5 generates a pressure which forces the lid 6 downwards and urges the second elastic member 5 upwards. However, because the lower horizontal section 8d of the yoke 8 disposed under the lid 6 prevents the same from being moved downwards, the introduction of the pressurized fluid generates a strong pressure which presses the ceramic laminations upwards through the second elastic member 5.

By the strong upward pressing force applied by the second elastic member 5 to the laminations 11 mounted in the cavities 3b, the laminations 11 are pressed so that the respective ceramic green sheets 12 in each cavity are firmly secured together to form a laminated ceramic product.

It is preferred that the pressing of the laminations through the second elastic member 5 lasts a predetermined time period. Because pressurized fluid is used in the pressing operation, the pressure is applied through the second elastic member uniformly to the entire surface areas of the green sheets 12. Accordingly, there occurs no forming-error which would otherwise be caused due to uneven application of pressure to stacked green sheets 12. Moreover, because the ceramic laminations 11 subjected to pressing forces through the second elastic members 5 are urged against the ceiling surfaces of the cavities 3b through the first elastic members 4, the first elastic members 4 act as damping members.

After the pressing operation for the predetermined time period, the pump of the second pressurized fluid feeding means is operated to discharge the pressurized fluid P2 from the space between the second elastic member 5 and the bottom face of the recess 7 of the lid 6, whereby the pressing force acting through the second elastic member 5 is reduced.

When the pressing force is reduced or lost, a clearance is formed between the bottom surface of the closure 6 and the lower horizontal section 8d of the yoke 8 which has regulated the bottom surface of the lid 6. Then, the yoke 8 is horizontally moved to its initial retracted position.

The lid 6 is moved downwards together with the second elastic member 5 to separate the closure 6 from the base 3. In this separated position, laminated ceramic products are kept received in the cavities 3b.

Thus, the pump of the first pressurized fluid feeding means is operated to forcibly introduce the first pressurized fluid P1 into the space between each of the first elastic members 4 and the ceiling surface of the associated cavity 3b to apply a pressure through the first elastic member 4 to the laminated ceramic product, whereby the laminated ceramic products are forced out of the cavities 3b. The laminated ceramic products thus forced out are then extracted to finish removal of the laminated ceramic products from the cavities 3b.

Also in this second method, the pressurized fluid P1 may alternatively be forcibly introduced to force the laminated ceramic products from the cavities 3b simultaneously with the downward movement of the lid 6, as described in the first method, to thereby assure that the lid 6 with the laminated ceramics products mounted on the elastic member 5 of the lid 6 is removed from the base 3.

EXAMPLE 2

Next, another example of the laminated ceramic product making apparatus will be described with reference to the drawings, wherein the members similar to those of the described example 1 are designated by reference numerals used in FIGS. 1–6.

The laminated ceramic product making apparatus of the example 2 is disclosed as example 2 in the specification of Japanese Patent Application No. Hei 6-134651 which is a basis of this application.

Figure 7:
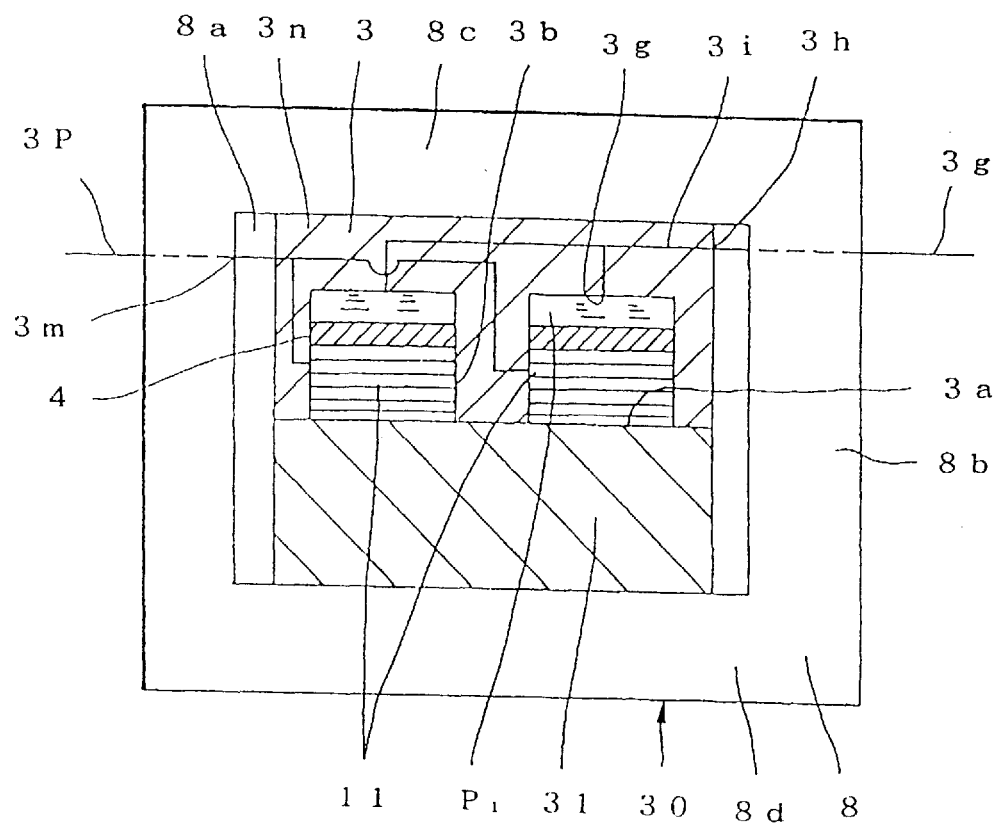
FIG. 7 is a schematic sectional view showing another example of the laminated ceramic product making apparatus which is an example of the present invention.

As shown in FIG. 7, a laminated ceramics product making apparatus 30 which is an embodiment of the present application comprises a base 3 forming a pressure container, first elastic members 4, a lid 31 and a yoke 8 which is a fixed member.

The base 3, the first elastic members 4 and the yoke 8 are substantially similar to those of the described embodiment 1.

The lid 31 is a cylindrical member having an upper surface of a shape and area substantially the same as those of the bottom face of the base 3.

The bottom surface of the lid 31 is not provided with such a recess as in the preceding embodiment (designated by 7 in FIG. 1).

The second pressurized fluid introducing and discharging passage 6c connecting the fifth port 6a open in the bottom face of the recess 7 shown in FIG. 1 and the sixth port 6b open in the outer periphery of the lid shown in FIG. 1 is not provided in the lid 31. The laminated ceramic product making apparatus 30, therefore, is not provided with the second pressurized fluid feeding means shown in FIG. 1 and comprising the pressurized fluid reservoir disposed outside the base 30, pipe line 6d for introducing the pressurized fluid from the pressurized fluid reservoir to the sixth port 6b, and the pump disposed in the pipe line 6d for forcibly feeding the pressurized fluid to the second pressurized fluid introducing and discharging passage 6c. Thus, this laminated ceramic making apparatus is not provided with a second pressurized fluid introducing mechanism.

The yoke 8 is provided with heating means operativeto heat the interiors of the cavities 3b in the base 3 during pressure-forming.

The manufacture of a laminated ceramic product by the use of the laminated ceramic product making apparatus of the structure described above will be described hereunder.

Initially, the yoke 8 is waiting at a position remote from the base 3 and the lid 31, while the lid 31 is separated from the bottom surface of the base 3 and waiting at a position beneath the base 3.

Stacks 11 of a plurality of ceramic green sheets are disposed on the portions of the upper surface of the lid 31 aligned with the openings in the bottom face of the base 3. The lid 31 is moved upwards until the upper surface of the lid 31 is attached to the bottom surface of the base 3. Thus, the stackes 11 placed on the upper surface of the lid 31 are received in the cavities 3b.

In this embodiment, the base 3 is fixed while the lid 31 is movable upwards and downwards. However, the lid may alternatively be fixed while the base 3 may be movable upwards and downwards. Further alternatively, the lid 31 and the base 3 may both be upwardly and downwardly movable. In short, the movement of the lid 31 and the base 3 may be appropriately determined based on consideration of various factors such as convenience in operability and advantageous or industrial operability, the only requirement being that the lid 31 and the base 3 can be separated, the stacks 11 can be placed on the upper surface of the closure 31 and thereafter the stacks 11 on the closure 31 can be received in the cavities 3b.

After the stacks 11 have been received in the cavities 3b, the yoke 8 is moved to receive in the opening 8a in the yoke 8 the base 3 with the lid 31 attached thereto. In this position, the bottom face of the upper horizontal section 8c is positioned very close to the upper surface of the base 3 and the upper surface of the lower horizontal section 8d of the yoke 8 is positioned very close to the bottom surface of the lid 31.

With the elements positioned as above, such a stack 11 of a plurality of ceramic green sheets 12 as one shown in FIG. 6 is press-formed in the manner to be described hereunder.

More particularly, the gas in the cavities 3b is discharged by gas discharging means. While the gas is being discharged or after the gas has been discharged to establish a high level of vacuum in the cavities 3b, the pump of the first pressurized fluid feeding means is operated to forcibly introduce pressurized fluid from the pressurized fluid reservoir through the pipe line and the first pressurized fluid introducing and discharging passage 3i into the space between the ceiling of each cavity 3b and the associated first elastic member 4. The pressurized fluid introduced into the space between the first elastic member 4 and the ceiling surface of the cavity 3b generates a pressure which tends to raise the base 3 upwards and urge the first elastic member 4 downwards in the cavity 3b. However, because the the upper horizontal section 8c of the yoke 8 lies on the upper surface of the base 3, the base 3 is prevented from being moved upwards. As a result, the pressurized fluid P1 forcibly introduced into the space between the first elastic member 4 and the ceiling surface of the cavity 3b generates a strong pressure force which is operative to press the stack 11 downwards via the first elastic member 4.

This strong pressure force is applied through the stack 11 to the lid 31 and tends to downwardly force the lid 31 through a lower opening in the cylindrical member 7. However, because the lower horizontal section 8d of the yoke 8 lies under the bottom surface of the lid 31 to prevent the same from being moved downwards, the stack 11 receives a high compression force from the first elastic membmr 4 and the lid 31. In the thus compressed stack 11, the ceramic green sheets 12 are firmly bonded together to form a liminated ceramic product.

It is preferred that the application of the compression force through the first elastic member 4 to the stack 11 be continued for a predetermined time period. Because the pressurized fluid P1 is used in this compression operation, the pressure is uniformly applied through the first elastic member 4 to the entire surface areas of the green sheets 12. Thus, the press-forming operation does not cause any defect which would otherwise be caused due to uneven application of pressure to the stacked green sheets 12.

After the lapse of the predetermined time period, the pressure relief valve (not shown) provided at an appropriate point of the pipe line 3p is opened to discharge the pressurized fluid P1 from the space between the first elastic member 4 and the inner end face of the cavity 36. The discharge of the pressurized fluid P1 lowers the compression force acting through the first elastic member 4.

When the compression force is reduced or lost, a clearance is formed between the upper surface of the base 3 and the upper horizontal section 8c of the yoke 8 which has confined the upper surface of the lid 31, while another clearance is formed between the bottom surface of the lid 31 and the lower horizontal section 8d. Thus, the yoke 8 is moved horizontally to its initial retracted position.

The lid 31 is moved downwards from the bottom surface of the base 3 to remove the closure. In the position of the lid 31 separated from the base 3, there is a possibility that the laminated ceramic produces are kept in the cavities 3b.

In such a case, the pump of the first pressurized fluid feeding means is further operated to again forcibly introduce the pressurized fluid P1 into the space between each first elastic member 4 and the ceiling surface of the associated cavity 3b to apply pressure through the first elastic member 4 to the laminated ceramic product. The pressure thus applied forces the laminated ceramic product out of the cavity 3b. The laminated ceramic product thus forced out is extracted to finish the removal of the laminated ceramic product from the cavity 3b.

In this embodiment, the lid 31 is separated from the base 3 and, then, the laminated ceramic products are forced out of the cavities 3b by the introduction of the pressurized fluid P1. However, the pressurized fluid P1 may alternatively forcibly introduced simultaneously with or in response to the separation of the lid 31 from the base 3 to assure that, when the lid 31 has been separated from the base 3, the laminated ceramic products are placed on the upper surface of the closure 31. This facilitates immediate extraction of the laminated ceramic products at the time point when the base 31 has been separated from the base 3, so that succeeding laminations can be placed on the upper surface of the lid 31 with a resultant remarkable improvement in the operability and production efficiency.

In this embodiment, the laminations 11 to be received in the cavities 3b are adapted to engage directly with the upper surrface of the lid 31. However, it is preferred that a mold-releasable member 3a is provided on the lid 31 at a point faced to each cavity 3b, as shown in FIG. 8. The mold-releasable member may be formed of a material, such as TEFLON, for example, which has a mold-releasing nature relative to the ceramic green sheet and is of a circular shape having a diameter substantially the same as that of the opening of each cavity 3b. Of course, it is not essential that the mold-releasing member is of a circular shape having a diameter substantially the same as that of the opening of each cavity. The only requirement is that the mold-releasing element be designed to have a shape which is capable of isolate the outer surface of the lamination 11 from the face of the lid 31.

The mold-releasing member 3a is fitted in the opening of each cavity 3b so that the bottom surface of the lid 31 does not directly engage with the outer surface of the lamination 11. Accordingly, when the lamination 11 has been pressed, the lid 31 is prevented from being stuck to the bottom surface of the laminated ceramic product.

EXAMPLE 3

Then, a further example of the laminated ceramic product making apparatus of the inventive press-forming apparatus will be described with reference to the drawings, wherein members similar to those of the laminated ceramic product making apparatus of the example 1 are designated by the reference numemrals used in FIGS. 1–6.

The laminated ceramic product making apparatus of this example 3 is disclosed as Example 3 in the specification of Japanese Patent Application No. Hei 6-134651 which is a basis of the present application.

Figure 9:
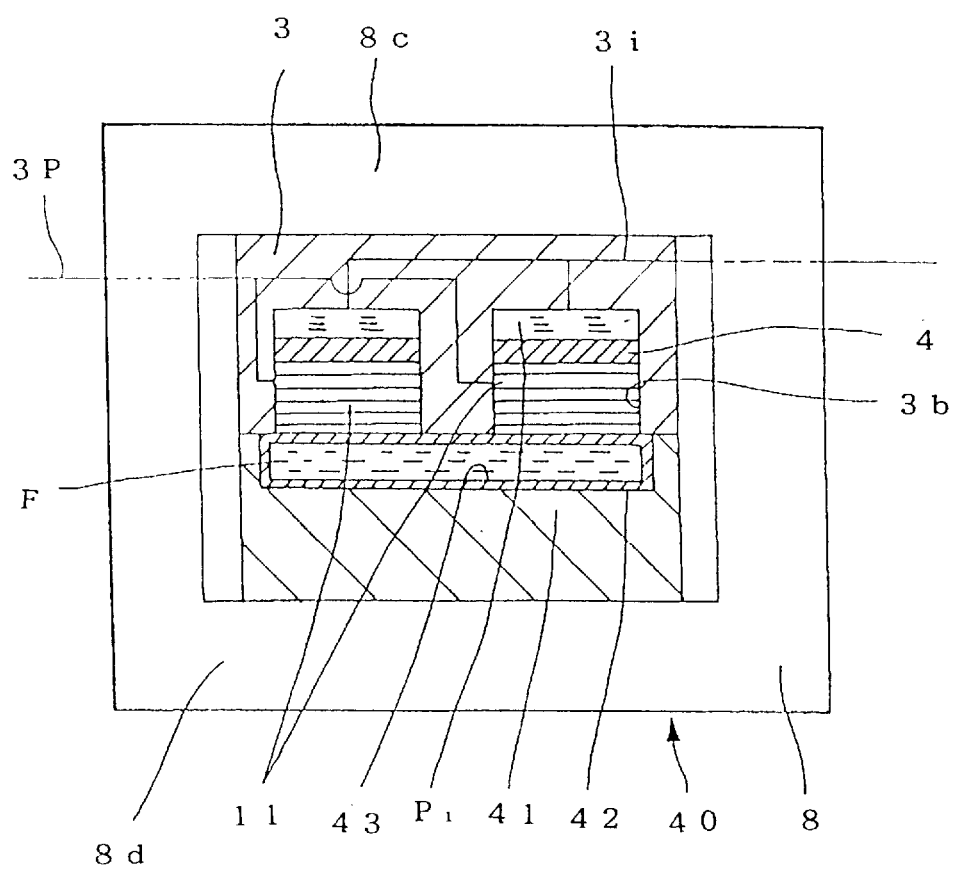
FIG. 9 is a schematic sectional view of a still further example of the laminated ceramic product making apparatus which is an example of the invention, the still further example of the apparatus having a layer of pressurized fluid.

As shown in FIG. 9, the laminated ceramicproduct making apparatus 40 as an embodiment of the present invention has a base 3, first elastic members 4, lid 41 and a yoke 8 which is a fixed member.

The base 3, the first elastic members 4 and the yoke 8 are substantially the same as those described in connection with the example 1.

The lid 41 is a cylindrical member having an upper surface of substantially the same shape and area as those of the bottom surface of the base 3. The upper surface of the cylindrical lid 41 has formed therein a recess 42 having an opening area which is large enough to cover the openings of four cavities 3b in the base 3 when the lid 41 is attached to the bottom surface of the base 3. The recess 42 receives therein a bag 43 containing a fluid F and made of a pressure-resistant material. In this embodiment, the bag 43 containing the fluid F forms a layer of pressurized fluid.

The bag 43 is used in this embodiment as a pressurized fluid layer. It is needless to say that the pressurized fluid layer may be of any other structure that can act as a cushion when the laminations 11 are pressed. There is no limitation in respect of the structure of the pressurized fluid layer. For example, the pressurized fluid layer may comprise, for example, an elastic sheet sealingly closing the opening of the recess 42 formed in the upper surface of the lid 41 and an amount of fluid sealed in the recess 42 by the elastic sheet.

The lid 41 is not provided with such a second pressurized fluid introducing and discharging passage 6c as one shown in FIG. 1 which interconnects the fifth port 6a opened in the bottom surface and the sixth port 6b opened in the outer periopehral surface. Thus, this laminated ceramic product making apparatus 30 is not provided with such a second pressurized fluid feeding means as one shown in FIG. 1 which comprises a pressurized fluid reservoir disposed outside the base 30, a pipe line 6d for introducing a pressurized fluid from the pressurized fluid reservoir to the sixth port 6b, and a pump provided in the pipe line 6d for forcibliy feeding thepressurized fluid to the second pressurized fluid introducing and discharging pass age 6c. As a conclusion, the laminated ceramic produc making apparatus 40 is not provided with the second pressurized fluid introducing mechanism.

The production of a laminated ceramic product by the laminated ceramic product making appartatus 40 of the described structure will be described hereunder.

In an initial position, the yoke 8 is waiting at a position retracted from the base 3, while the lid 41 is waiting at a position below the base 3.

A stack 11 of a plurality of ceramic green sheets is so placed on the upper part of the bag 43 in the recess 42 in the lid 41 that the part on which the stack 11 is placed is aligned with the opening in the bottom face of the base 3. In the case where there is a possibility that the stack 11, if directly placed on the bag 43, would be forced partly into the bag 43 and not stably supported thereon due to the material of the bag 43, a support member may preferably be superposed on the bag 43.

The lid 41 is moved upwards so that the upper surface of the lid 41 is attached to the bottom surface of the base 3, whereby the stack 11 placed on the lid 41 can be received in the cavity 3b.

In this embodiment, the base 3 is fixed while the lid 41 is movable upwards and downwards. However, the lid 41 may alternatively be fixed and the base movable upwards and downwards. Further alterntively, the lid 41 and the base 3 may both be movable upwards and downwards. Conclusively, the movements of the lid 41 and the base 3 may be appropriately determined based on consideration of various factors such as simplified operation and convenience or industrial operability, the only one requirement being that the lid 41 and the base 3 can be separated apart to allow the stack 11 to be placed on the upper surface of the lid 41 and, thereafter, the stack 11 on the lid 41 can be received in the cavity 3b.

After the stack 11 has been received in the cavity 3b, the yoke 8 is moved so that the base 3 with the lid 41 mounted thereon is placed in the opening 8a in the yoke 8. In this position, the bottom surface of the upper horizontal section 8c of the yoke 8 is positioned very close to the upper surface of the base 3 while the upper surface of the lower horizontal section 8d of yoke 8 is positioned very close to the bottom surface of the lid 41.

With the members positioned as described, press-forming of such a lamination or stack of ceramicgreen sheets 12 as shown in FIG. 6 is carried out as follows:

Namely, the gas discharging means is operated to discharge the gas from the cavity 3b. While the gas is being discharged or after the gas has been discharged to establish a high level of vacuum in the cavity 3b, the pump of the first pressurized fluid feeding means is driven to pump the pressurized fluid P1 from the pressurized fluid reservoir through the pipe line and the first pressurized fluid introducing and discharging passage 3i into the space between the ceiling surface of the cavity 3b and the first elastic member 4. The pressurized fluid P1 introduced into the space between the first elastic member 4 and the bottom surface of the cavity 3b produces a pressure tending to move the base 3 upwards and move the first elastic member 4 downwards into the cavity 3b. However, because the upper horizontal section 8c is positioned on the upper surface of the base 3, the base 3 is prevented from being moved upwards, with a result that the pressurized fluid introduced into the space between the first elastic member 4 and the ceiling surface of the cavity 3b generates a strong pressure force which downwardly presses the stack 11 via the first elastic member 4.

This strong pressure force is applied through the stack 11 to the lid 41 and tends to separate the lid 41 away from the bottom surface of the base 3. However, because the lower horizontal section 8d of the yoke 8 is positioned to prevent the lid 41 from being moved downwards, the stack 11 receives a compression force of a high pressure level from the first elastic membmer 4 and the lid 41. In the thus compressed stack 11, the respective ceramic green sheets 12 are secured together into a unit to form a laminated ceramic product.

In this press-forming, the bag 43 is provided as a pressurized fluid layer. Thus, a reaction force is generated which is directed in the direction of vector from the bag 43 towards the first elastic member 4. Due to this reaction force, pressing forces act on the plurality of green sheets in the opposite directions, whereby the green sheets are firmly bonded together to form a laminated ceramic product.

The pressing of the stack 11 through the first elastic member 4 should preferably be continued for a predetermined time period. Since the pressurized fluid is utilized in this pressing, the pressure is uniformly applied through the first elastic member 4 to the whole surfaces of the green sheets, to thereby avoid the occurrence of forming defect which would otherwise be caused due to uneven application of pressure to stacked green sheets 12.

After the lapse of the predetermined time period, the pressure relief valve (not shown) in the pipe line 3p is opened to discharge the pressurized fluid from the space defined between first elastic member 4 and the ceiling surface of the base 3. The discharge of the pressurized fluid decreases the pressing force acting through the first elastic member 4.

When the pressing force is decreased or lost, a clearance is formed between the bottom surface of the lid 41 and the lower horizontal section 8d of the yoke 8 which has confined the bottom surface of the lid 41, while another clearance is formed between the upper surface of the base 3 and the upper horizontal section 8c of the yoke 8 which has confined the upper surface of the base 3. Then, the yoke 8 is horizontally moved to its initial retracted position.

The lid 41 is moved downwards from the bottom surface of the base 3 to separate the lid 41 from the base 3. With the lid 41 being in the separated position, there is a possibility that the laminated ceramic product is kept contained in the cavity 3b.

In such a case, the pump of the first pressurized fluid feeding means is further driven to again forcibly introduce the pressurized fluid into the space between the first elastic member 4 and the ceiling surface of the cavity 3b to apply a pressure through the first elastic member 4 to the laminated ceramic product. The application of the pressure forces the laminated ceramic product out of the cavity 3b. The laminated ceramic product thus forced out is extracted to finish a removal of the laminated ceramic product from the cavity 3b.

In this embodiment, the lid 41 is separated from the base 3 and, thereafter, the laminated ceramic product is forced out of the cavity 3b by forcible introduction of the pressurized fluid P1. However, the pressurized fluid P1 may alternatively be introduced simultaneously with or in response to the separation of the lid 41 from the base 3 so that the laminated ceramic product rests on the upper surface of the lid 41 when the lid 41 has been separated from the base 3. This remarkably improves the openability and production yield because, when the lid 41 has been separated from the base 3, the laminated ceramic product can be taken out immediately and a succeeding stack can be placed on the upper surface of the lid 41.

EXAMPLE 4

The press-forming apparatus of the present invention and, particularly, the laminated ceramic product making apparatus can have various modifications within the gist of the invention.

Figure 10:
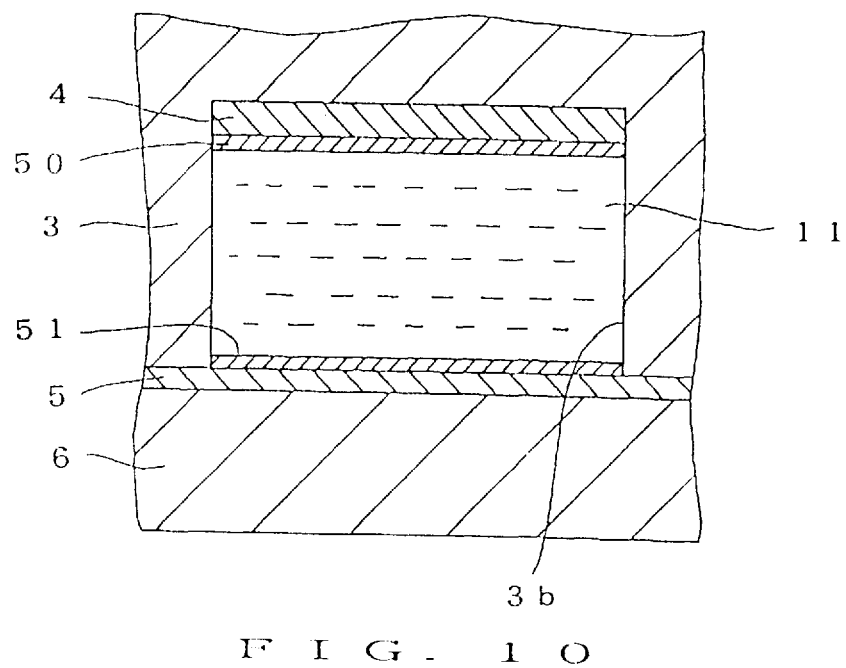
FIG. 10 is a schematic sectional view of a still further example of the laminated ceramic product making apparatus which is an example of the present invention.

(1) As shown in FIG. 10, in the embodiments 1—3, it is preferred that a first hard plate 50 be disposed in a superposed relationship to the bottom surface of the first elastic member 4. Assume that the pressurized fluid is forced into the space between the first elastic member 4 and the bottom surface of the cavity 3b to perform a press-forming of a stack of ceramic sheets and the stack 11 is placed directly on the bottom surface of the first elastic member 4. If the first elastic member has a wavy surface, the pressure applied through the first elastic member to the stack 11 causes the upper surface of the stack 11 to be pressed into a wavy shape with a result that a deformed laminated ceramic product is formed. The first hard plate 50 disposed on the bottom surface of the first elastic member 4, however, is effective to assure that, even if the bottom surface of the first elastic member 4 is deformed and wavy, the upper surface of the stack 11 of ceramic sheets can be press-formed into a planar shape, whereby laminated ceramic product free from any deformation can be made.

The first hard plate is of the same shape as the ceiling surface of the cavity and, usually, made of a pressure-resistant material.

(2) As shown in FIG. 10, in the examples 1–3, it is preferred that a second hard plate 51 be disposed in a superposed relationship to the upper surface of the second elastic member 5. Assume that a press-forming of a stack 11 of ceramic sheets is carried out with the bottom surface of the stack being in direct contact with the upper surface of the second elastic member 5. If the upper surface of the second elastic member 5 is wavy, the pressure force generated by the introduction of the pressurized fluid presses the bottom surface of the stack 11 into a wavy shape with a result that deformed laminated ceramic product is obtained. The second hard plate 51 placed on the upper surface of the second elastic member 5, however, is operative to assure that, even if the upper surface of the second elastic member is deformed and wavy, the bottom surface of the ceramic stack 11 is pressed into a planar shape, whereby laminated ceramic product free from deformation can be made.

The second hard plate 51 is of the same shape as the opening of the cavity and, usually, made of a pressure-resistant material.

(3) In the laminated ceramic product making apparatus of the examples 1–3, the base is shown as being provided with four cavities. However, there is no limitation in respect of the number of the cavities formed in the base and any desired number of cavities may be provided so long as the objects of the present invention are not spoiled.

The shape of each cavity is not limited to square shape as viewed in horizontal section and a circular shape as viewed in horizontal section can be selected as the shape of each cavity. Each cavity may be of any shape in horizontal section so long as the cavity is of a size large enough to accommodate a ceramic lamination.

Figure 11:
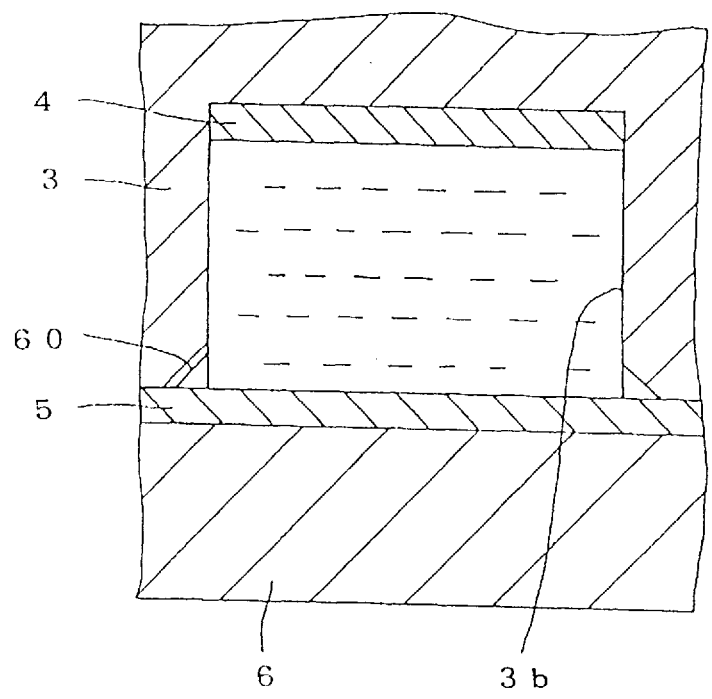
FIG. 11 is a schematic sectional view of a still further example of the laminated ceramic product making apparatus which is an example of the present invention.

(4) The peripheral edge of each cavity 3b formed in the base 3 may be beveled as at 60, as shown in FIG. 11.

The bevelled surface 60 provided along the peripheral edge of each cavity 3b is operative to assure that the laminated ceramic product press-formed in the cavity can be removed therefrom without being damaged by the peripheral edge of the cavity, with a resultant improvement in the production yield.

(5) In the examples 1–3 described above, the fixing member is the yoke. In the present invention, however, the fixing member may be of any structure provided that the fixing member can prevent the lid from being moved downwards away from the base by the pressure generated by the pressurized fluid forcibly introduced into predetermined portions. In place of the afore-mentioned yoke as the fixing member, an appropriate means may be employed which is operative to fixedly connect the base and the lid together. The fixing member may be a combination of a pin or bolt for fixing together the base and the cylindrical member for receiving the base, and a pin or bolt for fixing together the cylindrical member and the lid on the base.

However, the yoke is more preferable as the fixing member. In the case where the yoke is employed as the fixing member, the yoke may be simply moved to confine the pressure container and the lid mounted thereon. Use of the yoke can eliminate a pin-insertion operation or bolt-tightening operation.

(6) In the examples 1–3, the lid is arranged to be attached to the bottom surface of the pressure container body. However, the upper surface of the pressure container may alternatively be formed therein with a recess which can be covered with the the lid.

In short, this alternative modification can be shown by drawings corresponding to FIGS. 1, 3, 4, 7, 8, 9, 10 and 11 which are inverted upside-down. Laminated ceramic product making apparatus shown in such inverted drawings may be readily understood by taking the "ceiling surface", "lower portion" and "upper portion" in the description of the examples 1–3 as "bottom surface", "upper portion" and "lower portion", respectively.

This example is disclosed in the specification of Japanese Patent Application No. Hei 5-86549 which is a basis of the present application and the disclosure of which is incorporated herein by reference.

Further preferred modes of the present invention will be pointed out hereinunder.

A first mode is a laminated ceramic product making apparatus which comprises a base having formed therein a cavity capable of receiving a plurality of ceramic green sheets; a first elastic member disposed on the ceiling surface of said cavity to cover said ceiling surface in a liquid-tight manner; a second elastic member for covering a lower opening of said cavity in a liquid-tight manner; a lid for closing the lower opening of said cavity via said second elastic member; a first pressurized fluid introducing mechanism provided in said base for introducing a pressurized fluid into a space between the ceiling surface of said cavity and said first elastic member; a second pressurized fluid introducing mechanism for introducing a pressurized fluid for applying a pressure to said second elastic member; a fixing member for fixing said lid and said base during a press-forming of said green sheets; a gas introducing and discharging means for discharging gas from a space defined between said first elastic member in said cavity and said second elastic member; and heating means for heating the interior of said cavity.

A second mode is a laminated ceramic product making apparatus which comprises a base having formed therein a cavity capable of receiving a plurality of ceramic green sheets; a first elastic member disposed on the ceiling surface of said cavity to cover said ceiling surface in a liquid-tight manner; a lid for closing the lower opening of said cavity in a liquid-tight manner; a first pressurized fluid introducing mechanism for introducing a pressurized fluid into a space between the ceiling surface of said cavity and said first elastic member; a fixing member for fixing said lid and said base during a press-forming of said green sheets; a gas introducing and discharging means for discharging gas from a space defined between said first elastic member in said cavity and said lid; and heating means for heating the interior of said cavity.

A third mode is a laminated ceramic product making apparatus of the second mode wherein a mold-releasing member is mounted on a surface of said lid directed to said cavity.

A fourth mode is a laminated ceramic product making apparatus which comprises a base having formed therein a cavity capable of receiving a plurality of ceramic green sheets; a first elastic member disposed on the ceiling surface of said cavity to cover said ceiling surface in a liquid-tight manner; a second elastic member for covering a lower opening of said cavity in a liquid-tight manner; a first pressurized fluid introducing mechanism provided in said base for introducing a pressurized fluid into a space between the ceiling surface of said cavity and said first elastic member; a lid for closing the lower opening of said cavity via said second elastic member; a layer of pressurized fluid sealingly disposed between said second elastic member and said lid; a fixing member for fixing said lid and said base during a press-forming of said green sheets; a gas introducing and discharging means for discharging gas from a space defined between said first elastic member in said cavity and said second elastic member; and heating means for heating the interior of said cavity. A fifth mode is a laminated ceramic product making apparatus of any one of the first to fourth modes, wherein a first hard plate is superposed on said first elastic member.

A sixth mode is a laminated ceramic product making apparatus of any one of the first, fourth and fifth modes, wherein a second hard plate is superposed on said second elastic member.

A seventh mode is a laminated ceramic product making apparatus of any one of said first to sixth modes, wherein a plurality of cavities are provided.

An eighth mode is a laminated ceramic product making apparatus of any one of the first to seventh modes, wherein a beveled surface is provided along the peripheral edge of said cavity or each of said cavities.

A ninth mode is a laminated ceramic product making apparatus of any one of the first to eighth modes, wherein said first elastic member has its peripheral edge inserted into a gap provided in the peripheral surface of said cavity or each of said cavities.

A tenth mode is a laminated ceramic making apparatus of any one of the first to ninth modes, which can be understood by taking the "ceiling surface" and "lower opening" as "bottom surface" and as "upper opening", respectively.

An eleventh mode is a method of making a laminated ceramic product by using the laminated ceramic product making apparatus of the first mode, wherein a plurality of ceramicgreen sheets are placed in a stacked relationship on said second elastic member in said cavity; said first pressurized fluid feeding mechanism is operated to forcibly introduce the pressurized fluid into a space between the ceiling surface of said cavity and said first elastic member and said second pressurized fluid introducing mechanism is operated to forcibly introduce the pressurized fluid to perform a press-forming of the plurality of green sheets via said first and second elastic members; and, after the press-forming, the pressure force applied by said second pressurized fluid introducing mechanism is removed so that a laminated ceramic product can be extracted from said cavity by the pressure force applied by said first pressurized fluid introducing mechanism.

A twelfth mode is a method of making a laminated ceramic product by use of the laminated ceramicproduct making apparatus of the first mode, wherein a plurality of ceramic green sheets are placed in a stacked relationship on said second elastic member in said cavity; said second pressurized fluid introducing mechanism is operated to press said second elastic member to thereby perform a press-forming of said plurality of ceramic green sheets; the pressing by said second pressurized fluid introducing mechanism is stopped; and, thereafter, said first pressurized fluid introducing mechanism is operated to introduce a pressurized fluid into a space between said first elastic member and the ceiling surface of said cavity to extract a laminated ceramic product from said cavity.

(1) According to the present invention, a laminated ceramic product making apparatus can be provided which can produce a laminated ceramic product at a high production yield without causing any layer-separation.

(2) According to the present invention, the problem that the bottom surface of a ceramic lamination is stuck to the upper surface of the lid due to press-forming and chips and cracks are caused when the thus stuck ceramic lamination is peeled away from the upper surface of the lid can be eliminated to thereby assure that laminated ceramic products can be made at a higher production yield.

(3) According to the present invention, a laminated ceramic product can be made such that the shape of the bottom surface of the first elastic member is not transferred to the upper surface of the laminated ceramic product and the laminated ceramic product is not deformed by the first elastic member, whereby the yield of the products can be improved.

(4) According to the present invention, a laminated ceramic product can be made such that the shape of the upper surface of the second elastic member is not transferred to the bottom surface of the laminated ceramic product and the laminated ceramic product is not deformed by the second elastic member, whereby the yield of the products can be improved.

(5) According to the present invention, a base provided with a plurality of cavities can be used to assure that a plurality of laminated ceramic products can be made in a single press-forming operation, with a resultant improvement in the yield of products.

(6) According to the present invention, a beveled surface is provided along the peripheral edge of the opening of the cavity to assure that, when the laminated ceramic product is extracted from the cavity after the press-forming operation, the peripheral edge portion of the cavity does not cause any scratch in the laminated ceramic product, ensuring a production of scratch-free laminated ceramic products with a resultant improvement in the yield of products.

(7) According to the present invention, the peripheral edge portion of the first elastic member is inserted into a gap formed in the peripheral wall surface of the cavity to assure that the first elastic member is reliably sealingly mounted to eliminate leakage of the pressurized fluid forcibly introduced into the space between the first elastic member and the ceiling surface of the cavity, whereby the press-forming of the ceramic green sheets can be performed efficiently, with a resultant increase in the efficiency of the production of laminated ceramic products.

(8) According to the present invention, press-formed laminated ceramic products can be easily extracted from the cavity without any layer-separation caused, facilitating a production of laminated ceramic products at an improved yield.

EXAMPLE 5

A press-formed product making apparatus shown in this Example 5 is an example of the press-forming apparatus of the present invention. The press-formed product making apparatus is disclosed as embodiment 1 in the specification of Japanese Patent Application No. Hei 6-130688 which is a basis of the present application.

Figure 12:
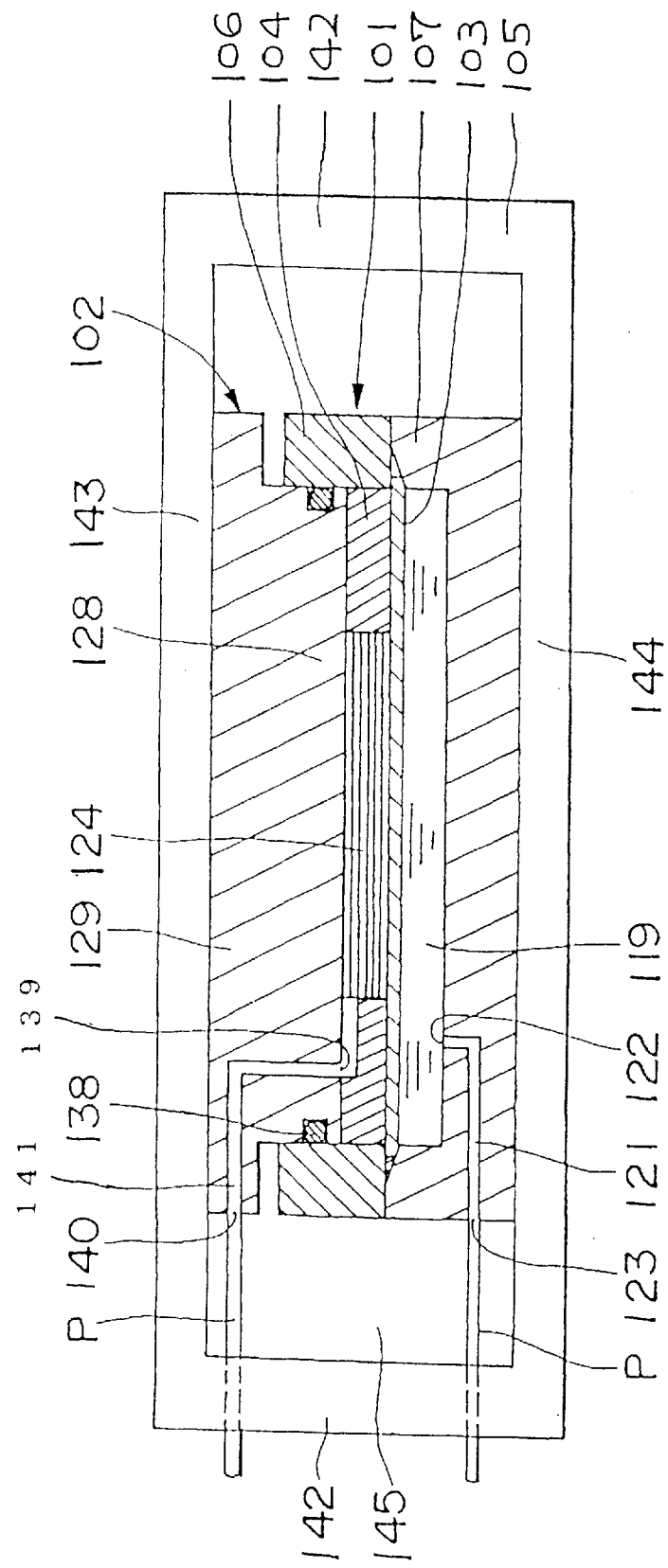
FIG. 12 is a diagrammatic sectional view of a press-formed product making apparatus which is an embodiment of the press-forming apparatus of the present.

As shown in FIG. 12, the press-formed product making apparatus comprises a pressure container 101, a lid member 102, an elastic member 103, a spacer 104 and a yoke 105 as a fixing member.

The pressure container 101 has an outer diameter much greater than its height and is genelly cylindrical. However, the shape of the pressure container 101 is not limited to the circular shape and may be designed to have a shape similar to a square board.

The pressure container 101 is formed of a first body 106 and a second body 107 on which the first body 106 is superposed and has a cavity formed therein.

Figure 13:
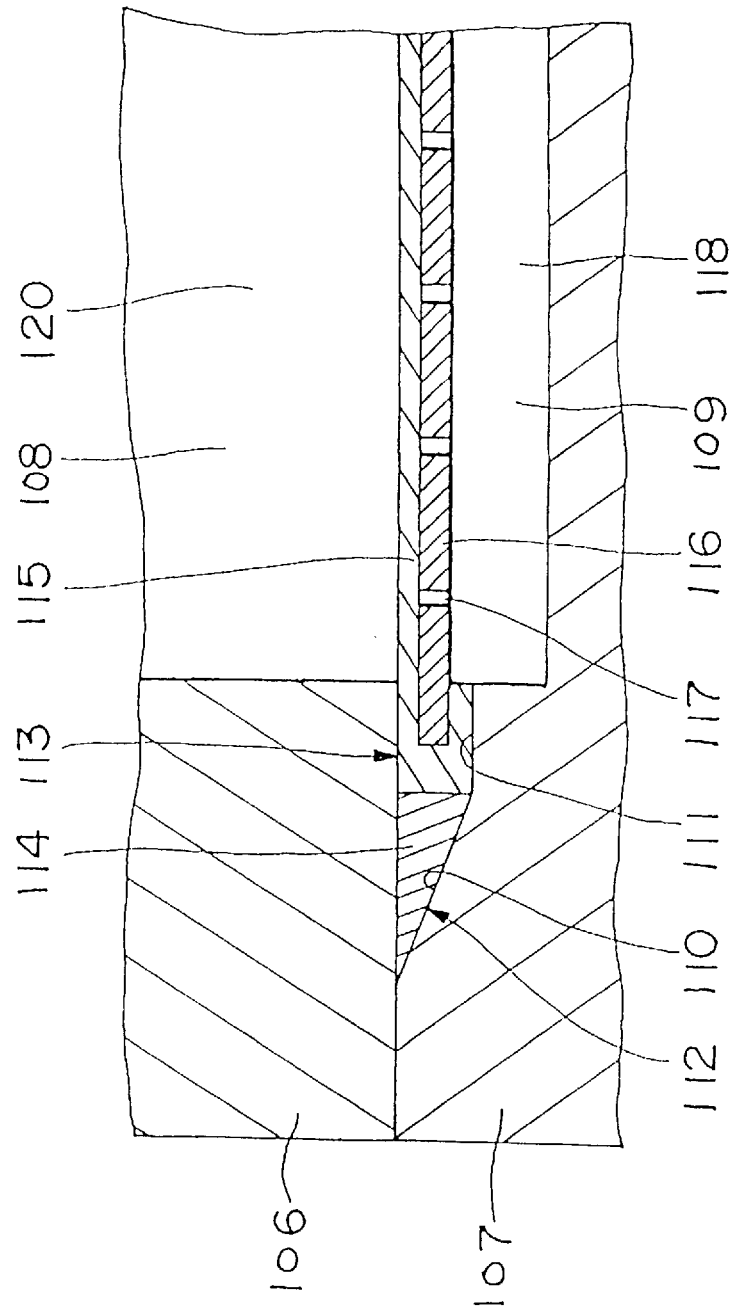
FIG. 13 is a fragmentary sectional view showing a junction between superposed first and second bodies of the press-formed product making apparatus which is an embodiment of the present invention.

As shown in FIG. 13, the first body 106 has formed therein a circular disk-like space 108 having upper and lower openings.

As shown in FIG. 13, the second body 107 is so shaped as to support the first body 106 superposed thereon and has formed therein a recess 109 having an opening of the same shape as the space 108 of the first body 106. In other words, the first body 106 is formed of a cylindrical member having a first opening for receiving the closure and a second opening disposed in opposed relationship to the first opening.

When the first body 106 is superposed upon the second body 107, the upper end surface of the second body 107 engages with the bottom surface of the first body 106. As shown in FIG. 13, the upper end face of the second body is provided with an annular tapered surface 110 inclined toward the recess 109 and surrounding the recess 109, and an annular horizontal surface 111 horizontally extending from the lower end of the annular tapered surface 110 and connected to the recess 109. When the first body 106 is superposed on the second body 107 such that the bottom end of the first body 106 engages with the upper end of the second body 107, the bottom surface of the first body 106, the annular horizontal surface 111 parallel to the bottom surface and the annular tapered surface 110 cooperate together to define a gap in a vertical section, as shown in FIG. 13. The bottom surface of the first body 106 and the annular tapered surface 110 formed on the upper end of the second body 107 cooperate together to define a wedge-shaped back-up ring mounting portion 112, while the bottom surface of the first body 106 and the annular horizontal surface 111 formed on the upper end of the second body 107 cooperate together to define an elastic member mounting portion 113.

A back-up ring 114 having a wedge-shaped section is mounted in the back-up ring mounting portion 112. The wedge-shaped back-up ring 14 may be formed of any material provided that the material is plastically deformable or resiliently deformable during a press-forming operation. The material of the wedge-shaped back-up ring 114 may be appropriately selected, depending on the level of the pressure force, from various kinds of thermo-plastic materials, various kinds of metals, various kinds of rubbers and the like. The back-up ring used in this embodiment is made of a metal.

An elastic member 115 has its periphery mounted in the elastic member mounting portion 113. The elastic member 115 may be made of any material having elastic and pressure-resistant characteristics and, usually, is made of rubber.

The elastic member 115 is circular as viewed in plan view and has a backwardly folded peripheral portion to which an edge of a disk-like support member 116 is secured so that the elastic member 115 and the support member 116 are connected together. The support member 116 has formed therein a large number of apertures 117. The support member 116 is provided not only to prevent the central section of the elastic member 115 from being downwardly hung or downwardly bulged when the elastic member 115 is mounted to cover the recess in the pressure container 101, but also to transmit, through the apertures 117 to the elastic member 115, the pressure of a pressure medium 119 (which is also termed as pressurized fluid) forcibly introduced into a pressure medium containing space 118 (which is also termed as pressurized fluid containing space).

Since the elastic member 115 united with the support member 116 has its peripheral portion secured to the elastic member mounting portion 113, the elastic member extends across the interior of the pressure container 101. Because the elastic member 115 so extends, the cavity in the pressure container 101 formed by the first body 106 and the second body 107 is divided into two sections such that the recess in the second body 107 and the elastic member 115 cooperate to define the pressure medium containing space 118 while the cylindrical space 108 in the first body 106 cooperates with the elastic member 115 to define a material receiving space 120.

As will be seen from the above description, the support member 116 with a large number of apertures 117 formed therein and the elastic member 115 act as a partition which deparates the material receiving space 120 (which is also termed as material receiving space) from the pressure medium containing space 118 and also function to transmit to the material the pressure of the pressure medium 119 forcibly introduced into the pressure medium containing space 118.

As shown in FIG. 12, the pressure container 101 is provided with a pressure medium introducing and discharging passage 121 open to the pressure medium containing space 118 (see FIG. 13).

Figure 14:
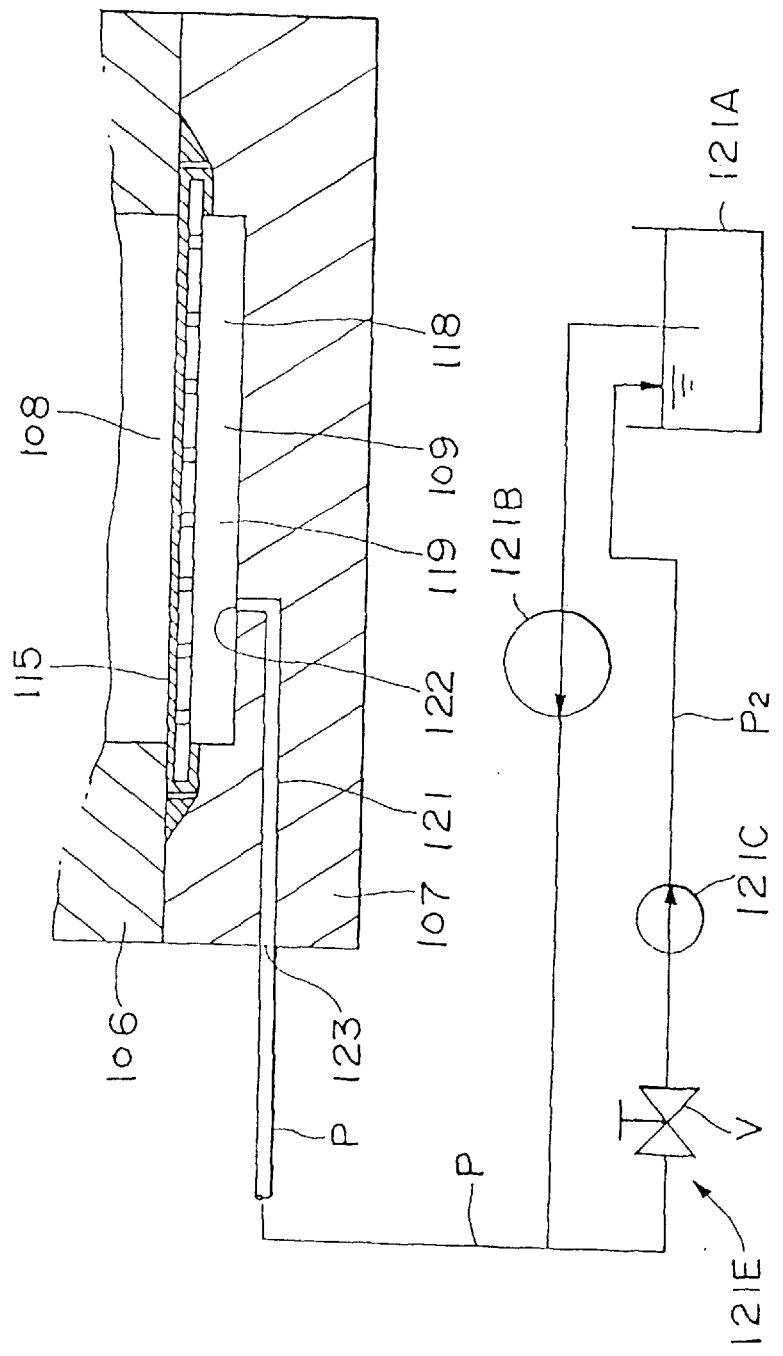
FIG. 14 is a diagrammatic illustration of an example of pressure medium feeding and discharging means of the press-formed product making apparatus which is an embodiment of the present invention.

More specifically, as shown in FIGS. 12 and 13, the pressure medium containing space 118 in the second body 107 of the pressure container 101 is designed to be supplied with the pressure medium 119 by a pressure medium feeding means 121E which comprises, as shown in FIG. 14, a pressure medium introducing and discharging passage 121 connecting a first port 122 open in the bottom surface of the space 118 and a second port 123 open in the outer peripheral surface of the second body 107, a presure medium source such as a pressure medium reservoir 121A disposed outside the pressure container 101, a pipe line P for guiding the pressure medium from the pressure medium reservoir 121A to the second port 123, a first pump 121B disposed in the pipe line P for forcibly feeding the pressure medium 119 to the pressure medium introducing and discharging passage 121 and for forcibly discharging the pressure medium therefrom, a second pipe line P2 branched from the pipe line P and communicated with the pressure medium reservoir 121A, and a valve V and a second pump 121C both provided in the second pipe line P2.

A spacer 104 (FIG. 12) is disposed in the material receiving space 120 (FIG. 13) defined by the first body 106 and the elastic member 115. The spacer 104 is operative to prevent lateral displacement and chattering of stacked sheets 124 placed in the material receiving space 120 and also prevent the elastic member 115 from being unduly bulged to thereby guard the elastic member 115 during a press-forming operation. Therefore, the spacer 104 may be made of any material which has a pressure-resistant property and plays the functions described above. From the practical view points such as workability and easy manufacture, however, the spacer 104 is preferably made from a metal such as steel, stainless steel or the like.

Figure 15:
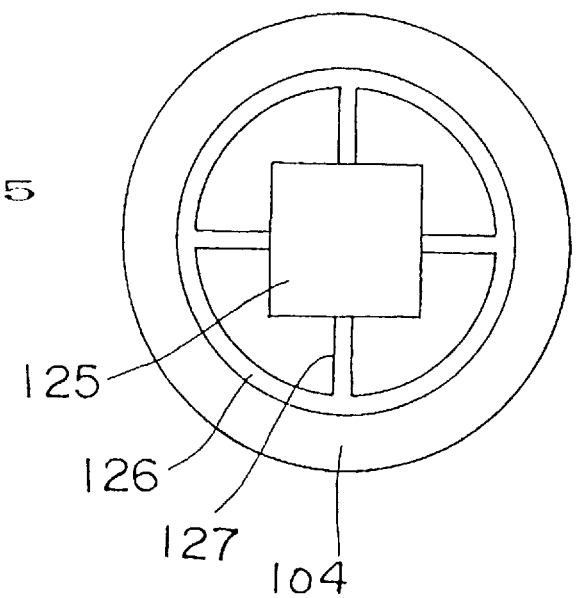
FIG. 15 is a plan view showing a spacer of the press-formed product making apparatus which is an embodiment of the present invention.

As shown in FIG. 15, the spacer 104 has a circular disk-like shape as viewed in plan view and has a central opening (which is termed as square opening 125 hereinafter) of, for example, square shape for receiving stacked sheets 124. The upper surface of the spacer 104 has formed therein an annular groove (which is termed hereunder as annular groove 126) and four straight grooves (which are termed hereunder as straight grooves 127) connecting the annular groove 126 to the square opening 125.

The spacer 104 has a thickness which is designed such that, when the spacer 104 is placed on the elastic member 115 and a projecting portion 128 of the lid member 102 is fitted into the cavity in the pressure container 101, the bottom surface of the projecting portion 128 contacts with the upper surface of the spacer 104. The spacer 104 has a diameter which is designed such that the spacer can be snugly received in the circular space 108 in the first body 106. The square opening 125 formed in the spacer 104 is so shaped and sized as to snugly receive the stacked sheets 124.

Figure 16:
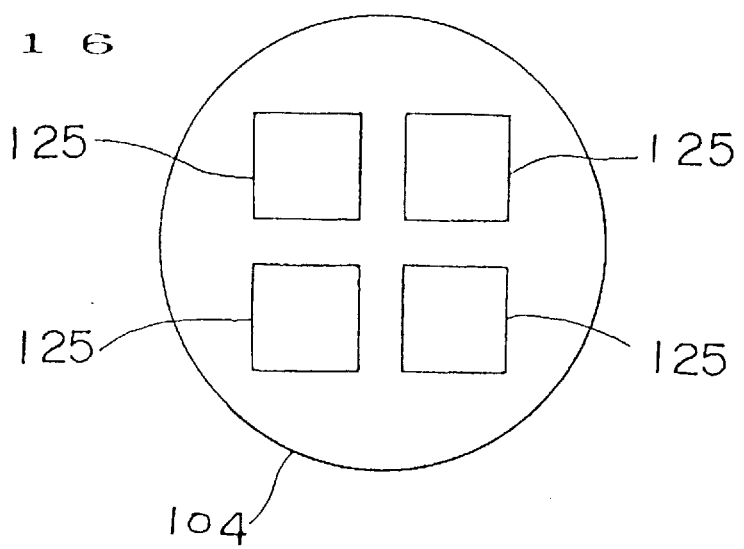
FIG. 16 is a plan view showing another spacer of the press-formed product making apparatus which is an embodiment of the present invention.

In this embodiment, the spacer 104 is provided with a single square opening 125. However, if it is intended to produce a plurality of laminated products at one time, a spacer 104 may be employed which has a plurality of, for example, four, square openings 125, as shown in FIG. 16. The spacer 104 shown in FIG. 16 is not provided with the annular groove 126 and the straight grooves 127. This is because the annulalr groove 126 and the straight grooves 127 are not required if the the gas introducing and discharging passage to be described later is designed to have its ports opened to the square openings 125.

Figure 17:
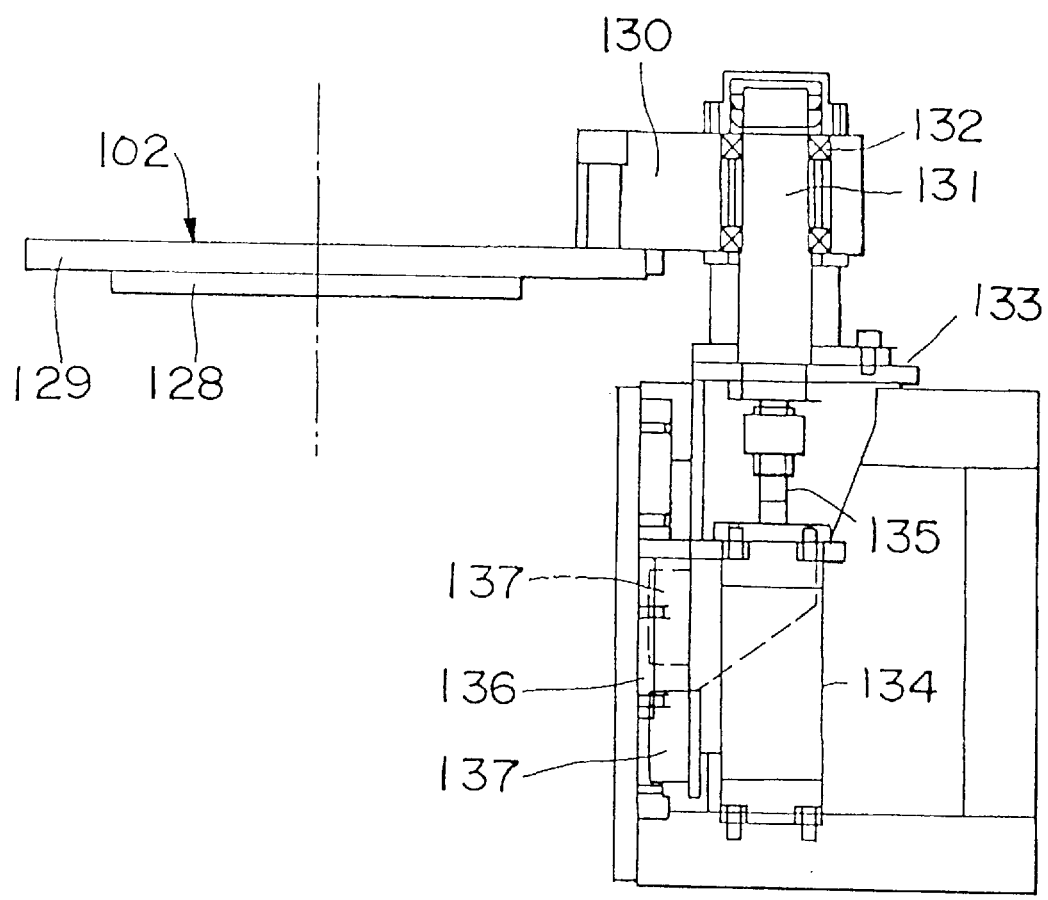
FIG. 17 is a schematic front elevational view of the press-formed product making apparatus which is an embodiment of the present invention, showing a lid member and a mechanism for vertically movably supporting the lid member.

The lid member 102 comprises a lid body 129 and the projecting portion 128, as shown in FIGS. 12 and 17.

The lid body 129 has a circular disk-like shape as viewed in plan view. The lid body 129 is connected to a support 130 at a predetermined portion of the periphery of the upper surface of the lid body 129. The support 130 is rotatably mounted on a vertical support bar 131 with a bearing 132 interposed therebetween. The support bar 131 is upstanding from a base member 133 which supports the support bar 131. The base member 133 is connected to a plunger 135 mounted in a cylinder 134 and is vertically movable by upward and downward vertical movements of the plunger 135. The base member 133 has a guide 137 which bestrides on a vertically extending rail (which is termed hereunder as vertical rail 136).

With the described structure, when the plunger 135 is moved upwards or downwards, the base member 133 is also moved upwards or downwards along the guide 137 to thereby move the lid body 129 upwards or downwards. The lid body 129 is designed to be manually rotatable in a horizontal plane and about the support bar 131. The lid body 129 may alternatively be automatically and electrically rotated by driving means such as a motor, rather than being manually rotable in a horizontal plane.

The lid body 129 has a flat upper surface. This is advantageous in that the lid 102 can be conveniently fixed by a yoke 105, as will be described later.

The projecting portion 128 is provided on the underside of the lid body 129 and has a circular disk-like shape. The projecting portion 128 has diameter and thickness of dimensions which are appropriately designed, based on consideration of dimensions of other members, such that, when the projecting portion 128 is inserted into the cavity in the pressure container 101, the material receiving space 120 defined by the bottom surface of the projecting portion 128, the inner peripheral surface of the cavity and the elastic member 115 is hermetically sealed and the bottom surface of the projecting portion 128 engages with the upper surface of a stack of sheets 124 placed on the elastic member 115.

In this embodiment, an O-ring 138 (see FIG. 12) is mounted on the outer peripheral surface of the projecting portion 128 to assure a gas-tightness of the material receiving space 120 defined by the bottom surface of the projecting portion 128, the inner peripheral surface of the cavity and the elastic member 115 when the projecting portion 128 is inserted into the cavity in the pressure container 101.

The projecting potion 128 is provided with a gas introducing and discharging passage 141 interconnecting a third port 139 opened toward the material receiving space 120 and a fourth port 140 opened in the outer peripheral surface of the lid body 129. The gas introducing and discharging passage 141 is connected with a gas feeding and discharging means (not shown) comprising a pipe line P connected to the fourth port 140, and a gas pump (not shown) connected to an end of the pipe line P and capable of feeding and discharging gas. In this embodiment, a gas introducing and discharging means is formed by the gas introducing and discharging passage 141.

The third port 139 is designed such that, when the projecting portion 128 is inserted into the material receiving space 120, the third port is faced to the annular groove 126 in the spacer 104 mounted in the material receiving space 120.

Figure 18:
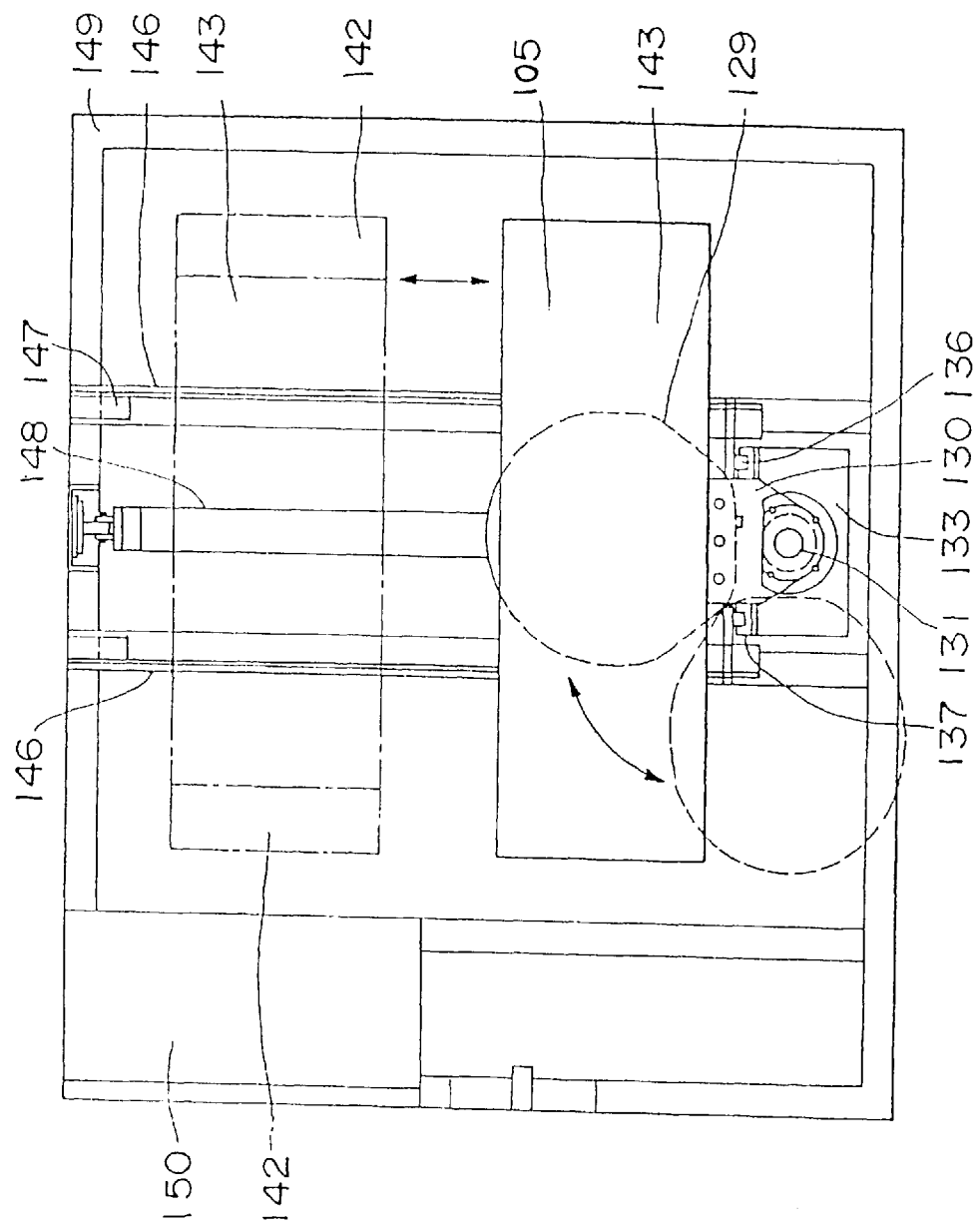
FIG. 18 is a schematic plan view showing the press-formed product making apparatus which is an embodiment of the present invention.

As shown in FIGS. 12 and 18, the yoke 105 has a pair of vertically upstanding vertical sections 142 and parallel upper and lower horizontal sections 143 and 144 horizontally extending to bridge the upper ends and lower ends of the vertical sections 142, respectively. The pair of vertical sections 142 and the upper and lower horizontal sections 143 and 144 are integral. The upper and lower horizontal sections 143 and 144 and the pair of vertical sections 142 cooperate to define an opening (which is termed hereunder as working opening 145) of a size large enough to receive the pressure container 101 with the lid member 102 mounted thereon. In other words, the arrangement is such that, when the pressure container 101 with the lid member 102 mounted thereon is received in the working opening 145, the bottom surface of the upper horizontal section 143 is positioned above the upper surface of the closure 102 with a slight clearance left therebetween, the upper surface of the lower horizontal section 144 is positioned at the bottom surface of the pressure container 101, and the spacing between the pair of vertical sections 142 is designed to be of a dimension sufficiently larger than the diameter of the pressure container 101. The pressure container 101 is supported by appropriate support means such as a frame (not shown).

The yoke 105 is structured to be horizontally movable by means of guides 147 which slidably ride, for example, on a pair of horizontally arranged rails (which are termed hereunder as horizontal rails 146). When stacked sheets 124 are to be placed in the material receiving space 120 in the pressure container 101, the yoke 105 is positioned at a waiting position retracted from the pressure container 101 because the lid member 102 must be dismounted from the pressure container 101. When a press-forming operation is to be started, the yoke 105 is moved so that the pressure container 101 with the lid member 102 mounted thereon can be received in the working opening 145 (see FIG. 12). There is no limitation in respect of the driving source of the yoke 105. In this embodiment, a cylinder 148 is employed. However, an electric motor may alternatively be used.

The yoke 105 is provided with heating means which may be of any structure provided that the heating means are operative to heat stacked sheets 124 during a press-forming operation of the stacked sheets 124 received in the pressure container. In this embodiment, the heating means are formed by electric heaters (not shown) provided on the pair of vertical sections 142 and the upper and lower horizontal sections 143 and 144.

In FIG. 18, reference numeral 149 designates a base frame which supports and fixes the apparatus in its entirety, while numeral 150 indicates an operation box for controlling the operation of the whole apparatus and supporting the operation control.

Production of a laminated product by use of the press-formed product making apparatus of the described structure will be described hereinunder.

In an initial position, the yoke 105 is waiting at a position retracted from the pressure container 101.

As shown in FIG. 18, the lid member 102 is kept removed from the upper surface of the pressure container 101 to assure that the cavity in the pressure container 101 be opened and exposed. Then, the spacer 104 is placed in the material receiving space 120 in the pressure container 101.

More specifically, the spacer 104 is placed on the elastic member 115 in the material receiving space 120. At this time, since the elastic member 115 is integral with the disk-like support member 116, the elastic member 115 is not downwardly bulged by the spacer 104 placed thereon. Thus, the spacer is firmly placed on the elastic member 115. Then, a stack of sheets 124 is inserted into the opening in the spacer 104.

The stack of sheets 124 comprises a stack of a predetermined number of ceramic green sheets each having an electrically conductive layer formed on its surface. In many cases, such stacks are prepared by pressure-bonding a plurality of green sheets so that the green sheets are not separated one from another. However, it is not essential to preliminarily bond a plurality of green sheets against separation and, alternatively, individual green sheets, separated from each other, may be received one after another in the opening in the spacer 10.

Each of the green sheets is prepared, usually, by shaping a body comprising a ceramic and a binder into a predetermined thickness, slicing the thus shaped body to obtain ceramic sheets each of predetermined size and shape (in many cases, square or rectangular shape), and coating a surface of each ceramic sheet with an electrically conductive paint to provide an electrically conductive layer thereon.

Another form of a stack of sheets 124 may be prepared by stacking thin ceramic sheets one upon another and, if required, lightly pressing the stack of sheets to bond them together, or, alternatively, lightly baking the stack of sheets to connect them together or, further alternatively, lightly bonding the sheets together by the binder used in the fabrication of the sheets.

After the stacked sheets 124 are received in the opening 125 in the spacer 104, the lid member 102 is rotated to position the lid member above the pressure container 101.

The cylinder is then actuated to downwardly move the plunger 135 to thereby lower the lid member 102. At this time, the gas feeding and discharging means is driven to suck and discharge gas through the gas introducing and discharging passage 141. When the lower end of the projecting portion 128 is fitted into the cavity in the pressure container 101, the gas in the material receiving space 120 defined by the bottom surface of the projection portion 128, the inner peripheral surface of the first body 106 and the elastic member 115 is discharged therefrom through the gas introducing and discharging passage 141. When the gas in the material receiving space 120 is discharged, the material receiving space 120 is under reduced pressure. Thus, the lid member 102 is forced by the atmospheric pressure so that the projecting portion 128 is immediately drawn into the cavity in the pressure container 101 to immediately complete mounting of the projecting portion 128 into the cavity.

The discharge of the gas through the gas introducing and discharging passage 141 from the material receiving space 120 is continued even after the completion of the mounting of the projecting portion 128 into the cavity.

The yoke 105 is moved so that the pressure container 101 with the lid member 102 mounted thereon is placed in the working opening 145 in the yoke 105. In this position, the bottom surface of the upper horizontal section 143 of the yoke 105 is positioned very close to the upper surface of the lid member 102 while the upper surface of the lower horizontal section 144 of the yoke 105 is positioned very close to the bottom surface of the pressure container 101.

With the members in the described positions, a press-forming of the stacked sheets 124 is performed as follows:

The pressure medium feeding means is operated to forcibly introduce the pressure medium 119 through the pressure medium introducing and discharging passage 121 into the pressure medium containing space 118. When the pressure in the pressure medium containing space 118 reaches a predetermined level, the introduction of the pressure medium 119 by the pressure medium feeding means into the pressure medium containing space 118 is stopped. The predetermined pressure of the pressure medium 119 is applied through the apertures 117 in the support member 116 to the elastic member 115. The predetermined pressure of the pressure medium tends to act through the elastic member 115 and the stacked sheets 124 to lift the lid member 102. However, the lid member 102 is confined by the yoke 105 and thus cannot be lifted. Thus, the predetermined pressure of the pressure medium 119 causes the stacked sheets 124 to be pressed by the elastic member 115 and the lid 102 and, more particularly, the bottom face of the projecting portion 128. During this pressing, the heat of the heated yoke 105 is transmitted to the lid member 102 and the pressure container 101, as described hereinbefore, whereby the stacked sheets 124 are heated. There is a possibility that gas is generated in the stcked sheets 124 due to the heating thereof. However, because the gas feeding and discharging means is operated to discharge the gas from the material receiving space 120, the generated gas is discharged through the straight grooves 127, the annular groove 126 and the gas introducing and discharging passage 141 to the outside of the system, to thereby avoid the occurrence of any defective products having voids and cracks which otherwise would be caused due to residue of gas generated in the stacked sheets 124 during pressing and heating.

By the pressing and heating treatment, the stacked sheets 124 are pressure-bonded together to form a laminated product.

When the pressing and heating treatment for a predetermined time period has been finished, the cylinder 148 is again actuated to retract the yoke 105, so that upper surface of the lid member 102 is now unconfiened.

Then, the pressure medium feeding means is operated to discharge the pressure medium 119 from the pressure medium containing space 118 through the pressure medium introducing and discharging passage 121 until the pressure within the pressure medium containing space 118 is restored to the normal pressure level. Simultaneously with the discharge of the pressure medium 119 or after the restoration of the pressure in the pressure medium containing space 118 to the normal pressure level, the gas feeding and discharging means is operated to forcibly introduce a gas into the material receiving space 120. More specifically, the gas fed by the gas feeding and discharging means is introduced through the gas introducing and discharging passage 141, the annular groove 126 and the straight grooves 127 into the opening 125 in the spacer 104 which is accommodating a laminated product.

The introduction of the gas is effective to backwardly force the elastic member 115 which has been floated into the material receiving space 120, to thereby restore the elastic member to its initial position having the flat upper surface.

The cylinder 134 is also actuated to upwardly move the lid member 102. Thus, because the material receiving space 120 is pressurized by the gas, the projecting portion 128 is easily extracted from the cavity to finish removal of the lid member 102 in a short time. When the projecting portion 128 is extracted from the cavity, the elastic member 115 is not drawn toward the cavity with a resultant prevention of occurrence of cracks in the elastic member 115 because the cavity is filled with the pressurized gas.

When the lid member 102 is dismounted, the spacer 104 and laminated products are exposed and thus are taken out.

With the spacer 104 and the laminated products taken out of the cavity, the face of the elastic member 115 on the side of the cavity is not bulged but kept planar and is free from any damage such as cracks. Thus, a succeeding production of laminated products can be started immediately.

As described above, the laminated product making apparatus provides various advantages as follows:

(1) The lid member can easily be mounted on the pressure container and the projecting portion can be inserted into the cavity in a short time (which can be said as being momentarily);

(2) When the projecting portion is inserted into the cavity, the inner peripheral surface of the cavity is not damaged even if the lid member is slightly inclined due to cantilever-type support of the lid member;

(3) Because gas generated due to heating during pressforming operation is removed, laminated products free from voids and bubbles can be made;

(4) The lid member can easily be dismounted after pressing operation;

(5) The projecting portion of the lid member can be extracted from the cavity without causing any inconvenience that the elastic member is drawn and damaged; and (6) After the pressing operation has been finished, because the elastic member is free of bulge caused due to pressing operation, a succeeding press-forming of succeeding stacked sheets can be started with the elastic member unchanged to assure that a large number of stacked sheets can be successively subjected to pressing treatments to make a large number of laminated products speedily.

EXAMPLE 6

The press-formed product making apparatus of the example 6 is an example of the press-forming apparatus of the present invention. This press-formed product making apparatus is disclosed as example 2 in the specification of Japanese Patent Application No. Hei 6-130688 which is a basis of the present application.

Unlike the apparatus of the above-described example 5, the press-formed product making apparatus of this embodiment is of the form in which a lid member is disposed at a lower portion and a pressure container is disposed at an upper portion.

Figure 19:
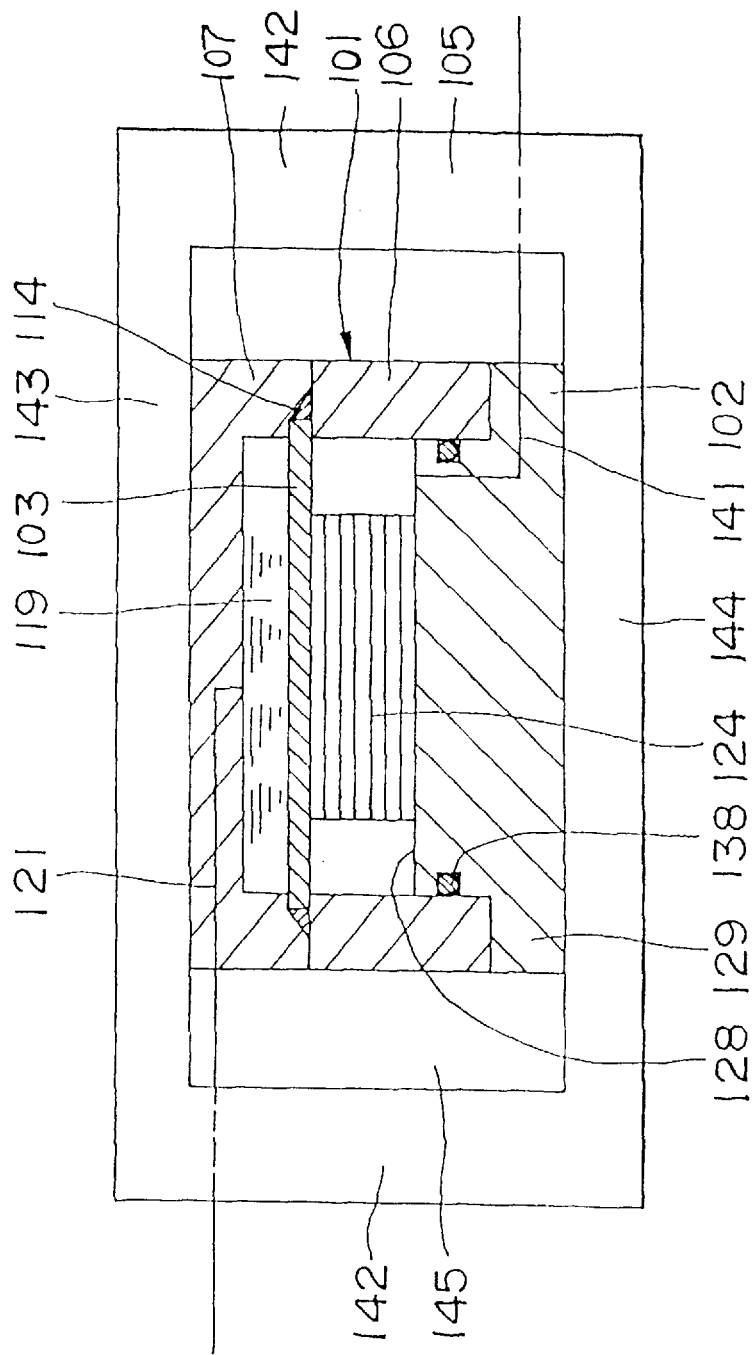
FIG. 19 is a schematic sectional view showing the press-formed product making apparatus which is an embodiment of the present invention.

As shown in FIG. 19, the press-formed product making apparatus has a pressure container 101, a lid member 102, an elastic member 103 and a yoke 105 as a fixing member.

The pressure container 101 is of a shape similar to that of the pressure container 101 of the press-formed product making apparatus of the above-described example 5. In this embodiment, however, the pressure container has its cavity having an opening directed downwards. This point is greatly different from the cavity in the example 5. The pressure container 101 has, as in the example 5, a first body 106 on which a second body 107 is superposed.

The arrangement of the first body 106 and the second body 107 is the same as that in the example 5. This example is also similar to the example 5 in respect of an annular tapered surface and an annular horizontal surface provided on the second body 107, a back-up ring mounting portion 112 and an elastic member mounting portion 113. A wedge-shaped back-up ring 114 is provided in the back-up ring mounting portion 112, as in the above-described example 5.

The elastic member 103 of this example 6 is different from the elastic member of the described example 5 in that the elastic member 103 is not provided with the support member 116 but, instead, the elastic member is made of a thin single sheet having its peripheral edge portion mounted in the elastic member mounting portion 113. The reason why no support member is required in this embodiment is because stacked sheets are placed on a projecting portion of the lid member, rather than on the elastic member as in the described example 5, and thus the elastic member is not required to be supported to enable the stacked sheets to be placed on the elastic member. In some cases, however, the elastic member may alternatively be provided with a support member integrally therewith as in the above example 5. In a case where the elastic member cannot withstand the weight of the pressure medium contained in the pressure medium containing space, it is preferred that a support member be united with the elastic member.

The material of the elastic member may be the same as in the example 5.

The elastic member 103 is provided to extend across the cavity in the pressure container to divide the cavity in the pressure container 101, which is formed by the first and second bodies 106 and 107, into two parts such that a recess 109 in the second body 107 cooperates with the elastic member 103 to define a pressure medium containing space 118 while a material receiving space 120 is defined by the circular disk-like space 108 in the first body 106 and the elastic member 103.

Figure 20:
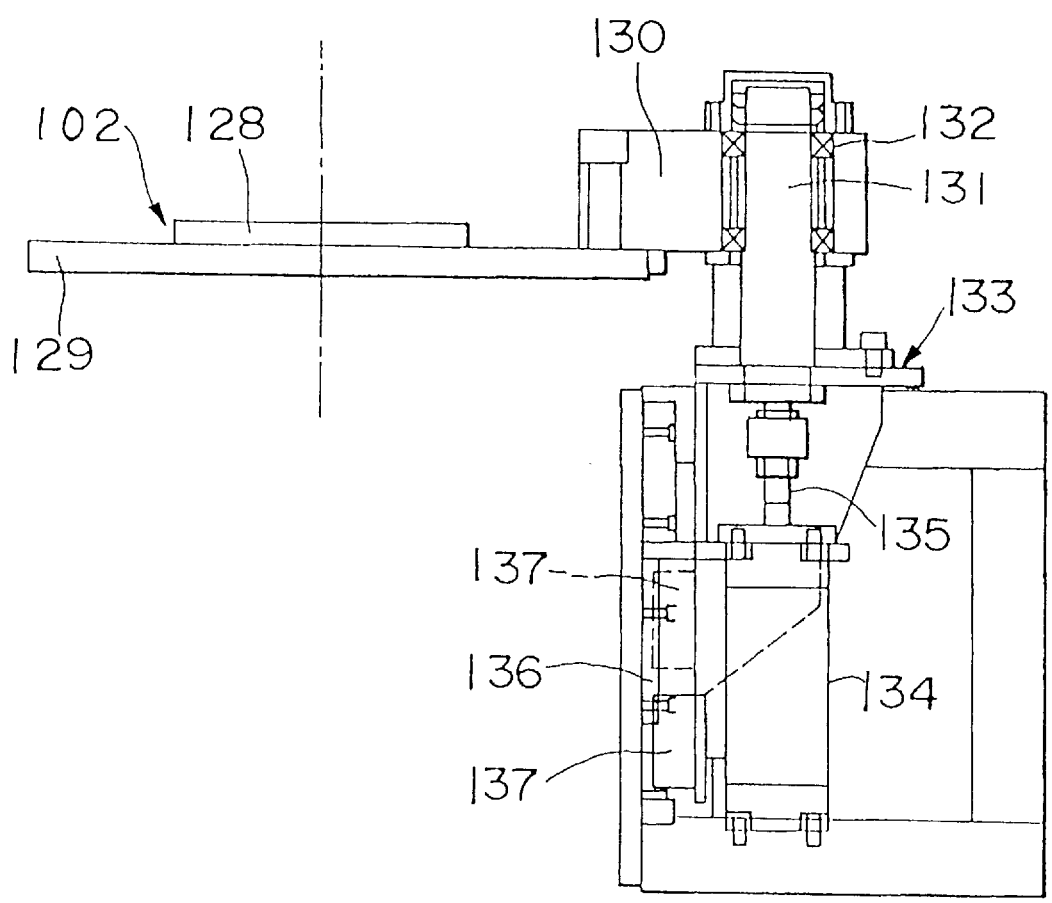
FIG. 20 is a schematic front elevational view of the press-formed product making apparatus which is another embodiment of the present invention, showing a lid member and a mechanism for vertically movably supporting the lid member.

As shown in FIGS. 19 and 20, the lid member has a body 129 and the projecting portion 128 provided on the upper surface of the body 129. In this point, the lid member of the embodiment is distinguished from the lid member of the described example 5.

In the other points, the lid member 102 is the same as in the described example 5.

The difference of the press-formed product making apparatus of this embodiment from that of the example 5 recides in that no spacer is used.

The yoke 105 is of a structure similar to that of the described example 5.

In short, the press-formed product making apparatus of this embodiment is characterized by the facts that the lid member has a body and a projecting portion projecting from the upper surface of the body, that the pressure container is so disposed and fixed as to downwardly direct the opening of its cavity and that no spacer is mounted in the material receiving space.

Figure 21:
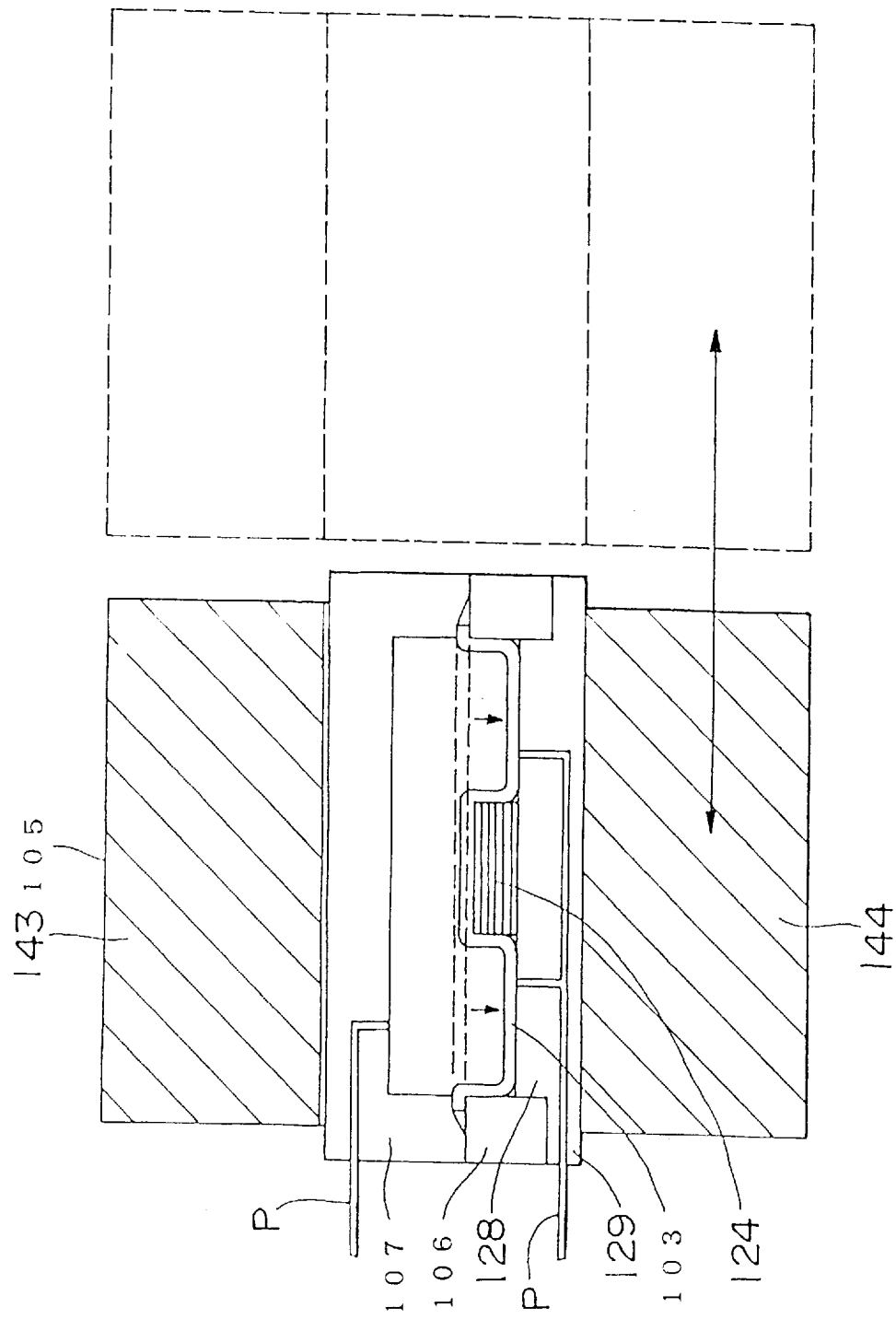
FIG. 21 is a diagrammatic illustration of the operation of the press-formed product making apparatus which is a further embodiment of the present invention.

In FIGS. 19, 20 and 21, the members similar to those in the example 5 are given the same reference numerals as in the described example 5.

The operation of the press-formed product making apparatus of the above-described structure will be described hereunder.

In an initial position, the yoke 105 is waiting at a position retracted from the pressure container 101.

The lid member 102 is kept dismounted from the bottom surface of the pressure container 101 and placed at a position angularly retracted from under the pressure container 101, so that the cavity in the pressure container 101 is opened and exposed. Then, stacked sheets 124 are placed on the upper surface of the projecting portion 128. The operation to place the stacked sheets 124 on the upper surface of the projecting portion 128 is greatly easier than the operation in the example 5 to place the stacked sheets 124.

The projecting portion 128 is then horizontally rotated to a position directly under the pressure container 101.

A cylinder is actuated to upwardly move a plunger 135 to thereby lift the lid member 102. At this time, a gas feeding and discharging means is operated to suck and discharge gas through a gas introducing and discharging passage 141. When the upper end of the projecting portion 128 is fitted into the cavity in the pressure container 101, the gas contained in the material receiving space 120 defined by the end surface of the projecting portion 128, the inner peripheral surface of the first body 106 and the elastic member 103 is discharged through the gas introducing and discharging passage 141. When the gas in the material receiving space 120 is discharged, the pressure in the material receiving space 120 is reduced, so that the lid member 102 is pressed by the atmospheric pressure, whereby the projecting portion 128 is immediately drawn into the cavity in the pressure container 101 to finish the mounting of the projecting portion 128 in the cavity.

Even after the completion of the mounting of the projecting portion 128 into the cavity, the discharge of the gas from the material receiving space 120 through the gas introducing and discharging passage 141 is continued.

The yoke 105 is moved, so that the the pressure container 101 with the lid member 102 mounted therein is placed in the working opening 145 in the yoke 105. With the members so positioned, the upper surface of the lower horizontal section 144 of the yoke 105 is positioned so close to the bottom surface of the lid member 102 while the bottom surface of the upper horizontal section 143 of the yoke 105 is positioned so close to the upper surface of the pressure container 101.

With the members so position, a press-forming of the stacked sheets 124 is carried out.

The pressure medium feeding means is operated to forcibly introduce the pressure medium 119 through the prressure medium introducing and discharging passage 121 into the pressure medium containing space 118. When the pressure in the pressure medium containing space 118 has reached a predetermined pressure level, the introduction of the pressure medium by the pressure medium feeding means into the pressure medium containing space 118 is stopped. The pressure of the predetermined level is applied to the elastic member 103. The portions of the elastic member 103 where no support member is proviced are bulged by the pressure medium 119 toward the projecting portion 128 and into intimate contact therewith, as shown in FIG. 21. The predetermined pressure of the pressure medium 119 tends to act through the elastic member 103 and the stacked sheets 124 to downwardly move the closure 102. However, the lid member 102 cannot be lowered because it is confined by the yoke 105. Accordingly, the predetermined pressure of the pressure medium 119 causes the stacked sheets 124 to be pressed by the elastic member 103 and particularly the upper surface of the projecting portion 128.

During this pressing operation, the heat of the heated yoke 105 is transmitted to the lid member 102 and the pressure container 101, whereby the stacked sheets 124 are heated. There is a possibility that the heating of the stacked sheets 124 results in generation of gas in the stacked sheets 124, as pointed out hereinabove. However, because the gas in the material receiving space 120 is being discharged by the gas introducing and discharging means, as pointed out hereinabove, the generated gas is discharged out of the system through the straight grooves 127, the annular groove 126 and the gas introducing and discharging passage 141.

Thus, occurrence of defective laminated products having voids and cracks therein is avoided which would otherwise be caused due to residue of gas generated in the stacked sheets 124 during heating and pressing.

By such pressing and heating treatment, the stacked sheets 124 are pressed into a unit to form a laminated product.

When the pressing and heating treatment for a predetermined time period has been finished, the cylinder 148 is again actuated to move the yoke 105 to the retracted position. This movement allows the lower surface of the lid member 102 to be unconfined.

Then, the pressure medium feeding means is operated to discharge the pressure medium 119 which has been forcibly introduced through the pressure medium introducing and discharging passage 121 into the pressure medium containing space 118, until the pressure in the pressure medium containing space 118 is restored to the normal pressure level. Simultaneously with the discharge of the pressure medium or after the restoration of the pressure in the pressure medium containing space 118 to the normal pressure level, the gas feeding and discharging means is operated to forcibly introduce gas into the material receiving space 120. More specifically, the gas is fed by the gas feeding and discharging means through the gas introducing and discharging passage 141, the annular groove 126 and the straight grooves 127 and introduced through the port 125 into the space 104 in which the laminated product is contained.

The introduction of the gas is effective to forcibly return the portions of the elastic member 103 which have been intimately contacted with the upper surface of the projecting portion 128, so that the elastic member is restored to its initial planar shape.

When the cylinder 134 is actuated to downwardly move the lid member 102, the projecting portion 128 can be quite easily removed from the cavity to finish a dismounting of the lid member 102 in a short time because the material receiving space 120 is kept by the gas at an elevated pressure level. When the projecting portion 128 is removed from the cavity, the elastic member 115 is not drawn toward the material receiving space 120 because the cavity is filled with pressurized gas. Thus, the removal of the projecting potion 128 from the cavity does not cause any cracks in the elastic member 103.

When the lid member 102 is lowered and dismounted from the pressure continer 101, the laminated product is exposed and can be taken out therefrom.

In the position in which the laminated product has been taken out of the cavity, the surface of the elastic member adjacent to the cavity is not bulged but planar and free from any damage such as cracks. Thus, a production of succeding laminated product can be started immediately.

As having been described, this press-formed product making apparatus provides following advantages:

(1) The lid member can be easily mounted in the pressure container and the projecting portion can be inserted into the cavity in a short time (which can be said to be a moment);

(2) When the projecting portion is inserted into the cavity, the inner peripheral surface of the cavity is not damaged even if the lid member is slightly inclined due to cantilever-type support of the lid member;

(3) Because the gas generated due to heating during press-forming operation is removed, laminated products free from voids and bubbles can be made;

(4) After the pressing operation, the lid member can be dismounted easily;

(5) When the projecting portion of the lid member is pulled out of the cavity, the elastic member does not suffer from disadvantageous drawning which would damage the elastic member;

(6) After the pressing operation is finished, the elastic member is restored from its bulged shape caused due to the pressing operation, to thereby assure that an operation to press-form a succeeding stack of sheets can be started with the elastic member unchanged, whereby a large number of stacked sheets can be successively subjected to pressing treatments to speedily make a large number of laminated products; and (7) Because the method of which stacked sheets as works are placed on the projecting portion of the lid member is employed, the operation is easier than in a method of which stacked sheets are fitted into a cavity as employed in the above-described example 5, with a resultant advantage that a full-automatic laminated product making system can be assemblyed in which stacked sheets conveyed by an automatic conveying means are gripped by an automatic handling means and placed thereby on the upper surface of the projecting portion and laminated products made by press-forming of the stacked sheets are transferred from the upper surface of the projecting portion to another conveying means by the automatic handling means. In other words, the apparatus of this embodiment for carrying out a press-forming treatment of stacked sheets placed on the upper surface of the projecting portion can easily be fully automated.

EXAMPLE 7

The press-formed product making apparatus of the example 7 is an embodiment of the press-forming apparatus of the present invention. The press-formed product making apparatus is disclosed as embodiment 3 in the specification of Japanese Patent Application No. Hei 6-130688 which is a basis of the present application.

This embodiment is concerned with a gas introducing and discharging means in the press-formed product making apparatus. In the examples 5 and 6, the third port 139 of the gas introducing and discharging means is opened in that surface of the projecting portion of the lid member which is directed to the material receiving space.

However, the third port can be disposed at any point so long as the port functions to discharge the gas in the material receiving space.

However, the position of the opening of the third port of the gas introducing and discharging means should preferably be carefully determined based on factors such as, for example, the material of the spacer to be disposed in the space defined between the elastic member and the projecting portion of the lid member, or whether the spacer is not to be disposed. For example, in the case where the spacer for surrounding a material is not to be disposed in the space defined between the elastic member and the projecting portion of the lid member, in the case where a spacer for surroundig the material, namely, a spacer of a non-metallic material, such as hard rubber (having a resiliency less than that of the elastic member but exhibiting a resiliency against a high pressure applied by the pressure medium), is to be disposed, the third port of the gas introducing and discharging means, namely, the third port through which the gas is discharged from or introduced into the material receiving space, should preferably be positioned and opened in the peripheral side surface of the projecting portion of the lid member. When the projecting portion of the lid member is mounted in the pressure container, the inner peripheral surface of the pressure container is in engagement with the outer peripheral surface of the projecting portion. In fact, however, there is a very small clearance between the inner peripheral surface of the pressure container and the outer peripheral surface of the projecting portion. Accordingly, even if the third port is provided in the outer peripheral surface of the projecting portion, the third port is operative to efficiently discharge the gas in the material receiving space defined by the elastic member, the projecting portion and the inner peripheral surface of the pressure container. In addition, should the elastic member be bulged into contact with the surface of the projecting portion due to the vacuum created in the material receiving space, the third port is never blocked by the bulged elastic member.

EXAMPLE 8

The press-formed product making apparatus of the example 8 is an example of the press-forming apparatus of the present invention. This press-formed product making apparatus is disclosed as example 4 in the specification of Japanese Patent Application No. Hei 6-130688 which is a basis of the present application.

The difference of the press-formed product making apparatus of the embodiment 8 from that of the above-described example 5 resides in that the pressure medium feeding means 121F of the press-formed product making apparatus of the example 8 uses a single pump, whereas the pressure medium feeding means 121E of the press-formed product making apparatus of the example 5 uses two pumps 121B and 121C.

Figure 22:
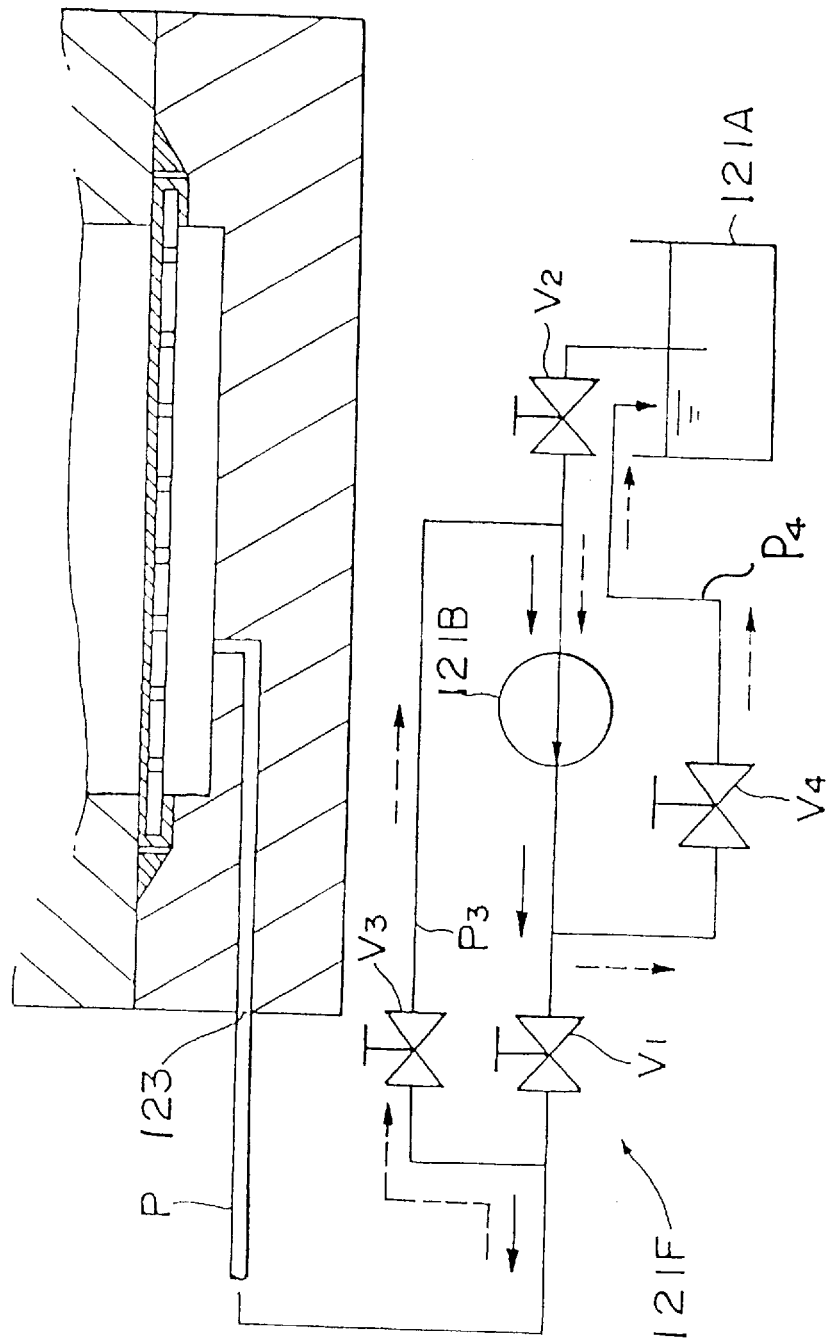
FIG. 22 is a diagrammatic illustration of pressurized fluid feeding and discharging means of the press-formed product making apparatus which is an embodiment of the present invention.

As shown in FIG. 22, the pressure medium feeding means 121F of the press-formed product making apparatus of this embodiment comprises a first pump 121B provided in the pipe line P connected to the second port 123 and extending to the pressure medium reservoir 121A, a first valve V1 provided in the pipe line P between the first pump 121B and the second port 123, a second valve V2 provided in the pipe line between the first pump 121B and the pressure medium reservoir 121A, a bypass pipe line P3 provided with a third valve V3 and having an end connected to the pipe line P between the first valve V1 and the second port 123, the other end of the bypass pipe line P3 being connected to the pipe line P between the first pump 121B and the second valve V2, and a branch pipe line P4 having an end connected to the pipe line P between the first pump 121B and the first valve V1 and provided with a fourth valve V4 thereon, the other end of the branch pipe line extending into the pressure medium reservoir 121A.

With the pressure medium feeding means 121F, when the pressure medium 119 is to be forcibly introduced into the pressure medium containing space 118, the first and second valves V1 and V2 are opened while the other valves V3 and V4 are closed. In this state, the first pump 121B is operated to forcibly introduce the pressure medium 119 through the pipe line P into the pressure memdium containing space 118. When the pressurized pressure medium 119 in the pressure medium containing space 118 should be discharged, the first and second valves V1 and V2 are closed while the other valves V3 and V4 are opened. Then, the pressure medium is allowed to be discharged through the bypass pipe line P3, the first pump 121B and the branch pipe line P4 into the pressurized fluid reservoir 121A.

The employment of such pressure medium feeding means as is shown in this embodiment can reduce the number of the pump to one and, thus, is effective to simplify the structure of the apparatus and decrease the size of the apparatus.

The pressure medium feeding means of the structure described above can also be employed in press-forming apparatus of other examples disclosed in the specification of this application.

In the described examples, stacked sheets have been described as being materials to be worked. However, the press-formed product making apparatus of the present invention can also be applied to the forming or molding of powdered material.

Modes of the invention inductive from the described examples 5–8 are pointed out as follows:

A first mode is a press-formed product making apparatus comprising a pressure container having a cavity forming a material receiving space, and a lid member having a projecting portion to be inserted into the cavity, the lid member being provided with gas introducing and discharging means for introducing and discharging gas into and from the cavity.

A second mode is a press-formed product making apparatus comprising a pressure container having a cavity; a lid member having a projecting portion to be inserted into the cavity; fixing means for confining the lid member and the pressure container against pressure force during press-forming of a material received in a material receiving space; and heating means for heating the interior of the cavity during the press-forming, the lid member being provided with gas introducing and discharging means for introducing and discharging gas into and from the cavity, the cavity in the pressure container being provided with an elastic member disposed to extend thereacross to separate the cavity into the material receiving space and a pressure medium containing space, the pressure container being provided with pressure medium introducing and discharging means having a second port open toward the pressure medium containing space and being operative to introduce and discharge the pressure medium into and from the pressure medium containing space.

A third mode is a press-formed product making apparatus of any one of the first and second modes, wherein the cavity is opened upwardly.

A fourth mode is a press-formed product making apparatus of any one of the first and second modes, wherein the cavity is opened downwardly.

A fifth mode is a press-formed product making apparatus of any one of the second to fourth modes, wherein the pressure container comprises a first body having a cylindrical inner peripheral surface and a second body so shaped as to be superposed on the first body and provided with a recess, and wherein an elastic member nipping portion for nipping the elastic member and a back-up ring mounting portion of a wedge-shaped section for mounting a back-up ring of a wedge-shaped section are provided at the junction between the superposed first and second bodies, the back-up ring mounting portion being disposed outwardly of the nipping portion.

A sixth mode is a press-formed product making apparatus of any one of the first to fifth modes, wherein the pressure container comprises a cylindrical body having an opening to which the lid member is to be attached and an opposed opening disposed on the opposite side of the cylindrical body, and a closure member to be mounted to the opposed opening.

The seventh mode is a press-formed product making apparatus of any of the first to sixth modes, wherein the pressure medium feeding and discharging means comprises a pump for sucking and discharging the pressure medium, a feeding pipe line system through which the pressure medium is pumped by the pump from the pressure medium reservoir to the pressure medium containing space, and switching means for switching a pipe line system from the feeding pipe line system to a discharging pipe line system through which the pressure medium is discharged by the pump from the pressure medium containing space to the pressure medium reservoir.

According to the press-formed product making apparatus of the invention supported by the examples 5–8, because the lid member is provided with gas introducing and discharging means having a first port open in the projecting portion toward the cavity for introducing gas into the cavity and discharging the gas from the cavity, (1) the lid member can be easily mounted on the pressure container and the projecting portion can be inserted into the cavity in a short time (which may be said to be a moment), (2) when the projecting portion is to be inserted into the cavity, the projecting portion of the lid member can be inserted into the cavity in the pressure container in such a manner as not to damage the inner peripheral surface of the cavity even if the lid member is slightly inclined, and (3) because the gas generated during press-forming operation is removed, press-formed products free from voids and bubbles can be made.

According to the press-formed product making apparatus of the invention supported by the examples 5–8, (1) the lid member can be easily mounted on the pressure container and the projecting portion can be inserted into the cavity in a short time (which may be said to be a moment), (2) when the projecting portion is to be inserted into the cavity, the projecting portion of the lid member can be inserted into the cavity in the pressure container in such a manner as not to damage the inner peripheral surface of the cavity even if the lid member is slightly inclined, (3) because the gas generated during press-forming operation is removed, press-formed products free from voids and bubbles can be made, (4) the elastic member or members subjected to pressure medium during the press-forming operation is or are not damaged, (5) the lid member can be easily dismounted after the press-forming operation, (6) when the projecting portion of the lid member is pulled out of the cavity, the elastic member is prevented from being damaged due to reduced pressure which would otherwise be caused in the cavity to forcibly pull the elastic member, and (7) after the completion of the pressing operation, the elastic member is restored from a bulged position caused by the pressing operation.

Accordingly, a press-forming operation for a succeeding stack of sheets can be quickly started with the elastic member kept unchanged, with a result that a large number of stacks of sheets can be successively pressed and treated to make a large number of laminated products speedily.

In the press-formed product making apparatus of the invention supported by the examples 5–8, in the case where the pressure container is so disposed that its cavity is opened upwardly, the lid member can be mounted on the fixed pressure container from the upper space thereof with a resultant improvement in the operability.

In the press-formed product making apparatus of the invention supported by the examples 5–8, in the case where the pressure container is so disposed that its cavity is opened downwardly, the projecting portion of the lid member extends upwardly, so that the production of laminated products is carried out such that stacked sheets are placed on the projecting portion. The operation to place stacked sheets on the upper surface of the projecting portion can be related to a transfer operation achieved by a handling robot operative to transfer supplied stacks of sheets from a transfer table to the upper surface of the projecting portion. This arrangement, therefore, is convenient to automate a series of steps such as producing stacks of sheets, transferring the stacks of sheets, making laminated products from the stacked sheets and transferring the thus made laminated products from the upper surface of the projecting portion to another transfer place. In other words, the press-formed product making apparatus in which the cavity in the pressure container is opened downwardly is convenient for fully automating the production of laminated products.

The press-formed product making apparatus of the invention supported by the examples 5–8 is provided with an elastic member nipping portion, or an elastic member mounting portion and a back-up ring mounting portion, the nipping portion and the mounting portions being disposed at the junction between the first and second superposed or stacked bodies which form the pressure container. In addition to the various technological advantages pointed out above, therefore, the apparatus further provides a merit that the liquid-tightness of the pressure medium containing space can be assured to lead to an efficient press-forming operation free from pressure loss.

EXAMPLE 9

The press-formed product making apparatus shown in the example 9 is an example of the press-forming apparatus of the present invention. The press-formed product making apparatus is disclosed as an example 1 in the specification of Japanese Patent Application No. Hei 6-130409 which is a basis of the present application.

Figure 23:
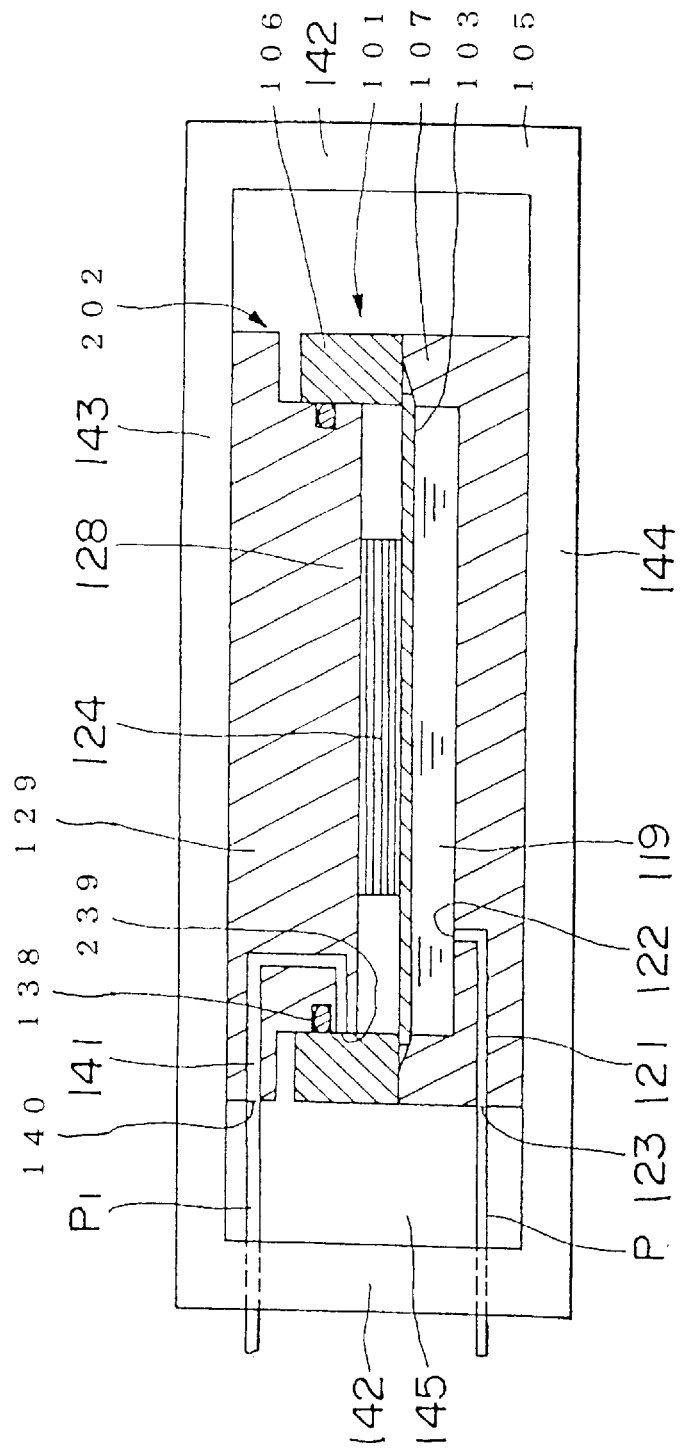
FIG. 23 is a diagrammatic sectional view of the press-formed product making apparatus which is an embodiment of the press-forming apparatus of the present invention.

As shown in FIG. 23, the press-formed product making apparatus has a pressure container 101, a lid member 202, an elastic member 103 similar to the elastic member of the preceding embodiment and a yoke 105 as a fixing member.

The pressure container 101 has a structure similar to that of the pressure container 101 of the example 5 and thus will not be described in detail hereunder. The parts which are related to the pressure container 101 and are the same as the members shown in FIGS. 12, 13 and 14 are designated by the same reference numerals.

The first point in which this press-formed product making apparatus is distinguished from the press-formed product making apparatus shown in the example 5 is that such a spacer as one 104 shown in FIG. 12 is not disposed in the material receiving space 120.

The lid member 202 is of a structure which is basically of the same as that of the lid member 102 shown in FIGS. 12 and 17. However, the lid member 202 is different from the lid member 102 in the point that, in the lid member 202, a third port 239 corresponding to the third port 139 in the lid member 102 is opened not in the bottom surface of the projecting portion 128 but in the peripheral side surface of the projecting portion 128.

In the other points, the structure of the lid member 202 is the same as that of the lid member shown in FIGS. 12 and 17 and, thus, will not be described in detail herein. The structural details of the lid member 202 can be readily understood by referring to the description of the lid member of the example 5.

Another point in which the press-formed product making apparatus is distinguished from the press-formed product making apparatus shown in the example 5 is that an elastic member 215A is mounted on the surface of a sealing member 115 on a support member 116.

Figure 24:
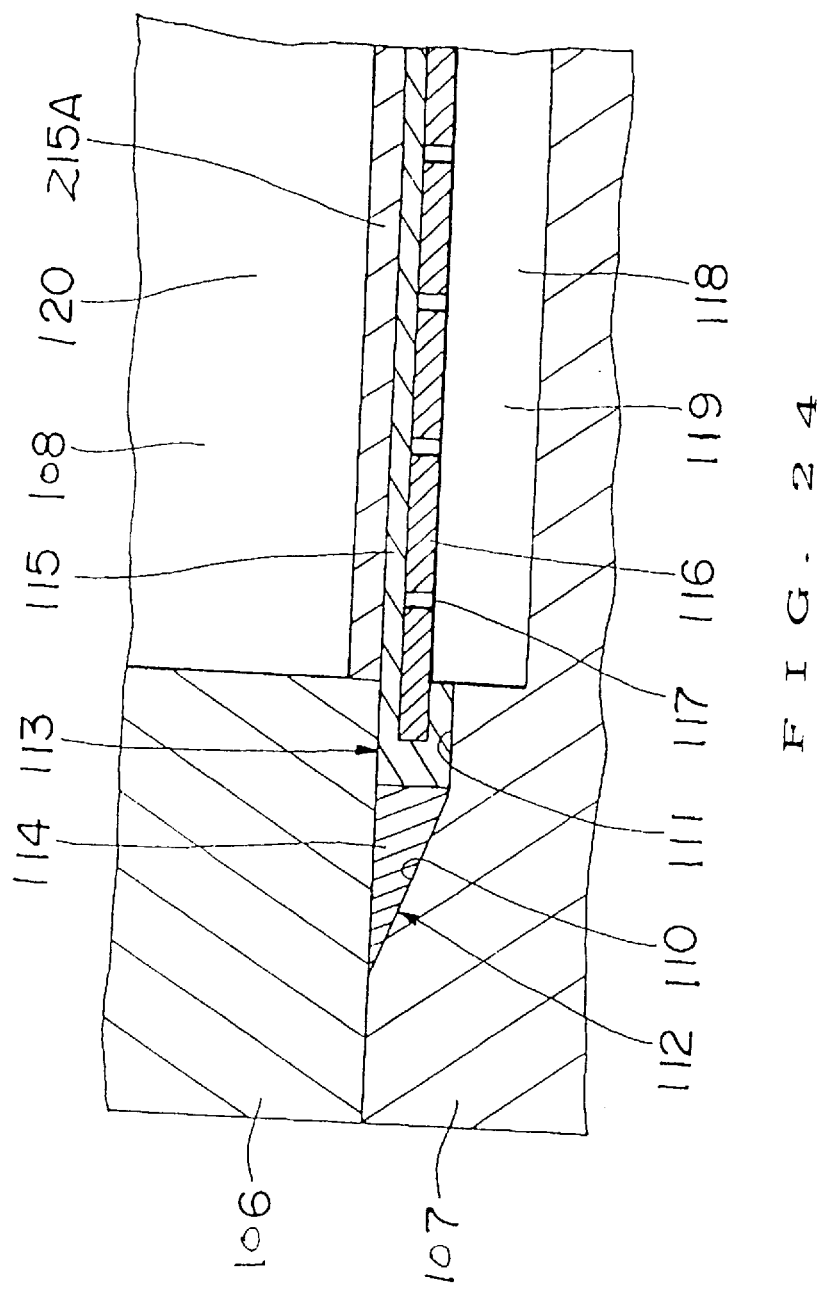
FIG. 24 is a diagrammatic fragmentary sectional view showing a junction between first and second bodies of the press-formed product making apparatus which is an embodiment of the present invention.

As shown in FIG. 24, the elastic member 215A is further mounted on the upper surface of the sealing member 115. This elastic member 215A may be made of any material so long as it has a resiliency and a pressure-resistant property and is capable of transmitting the pressure of the pressure medium and may be made of rubber, for example.

Figure 25:
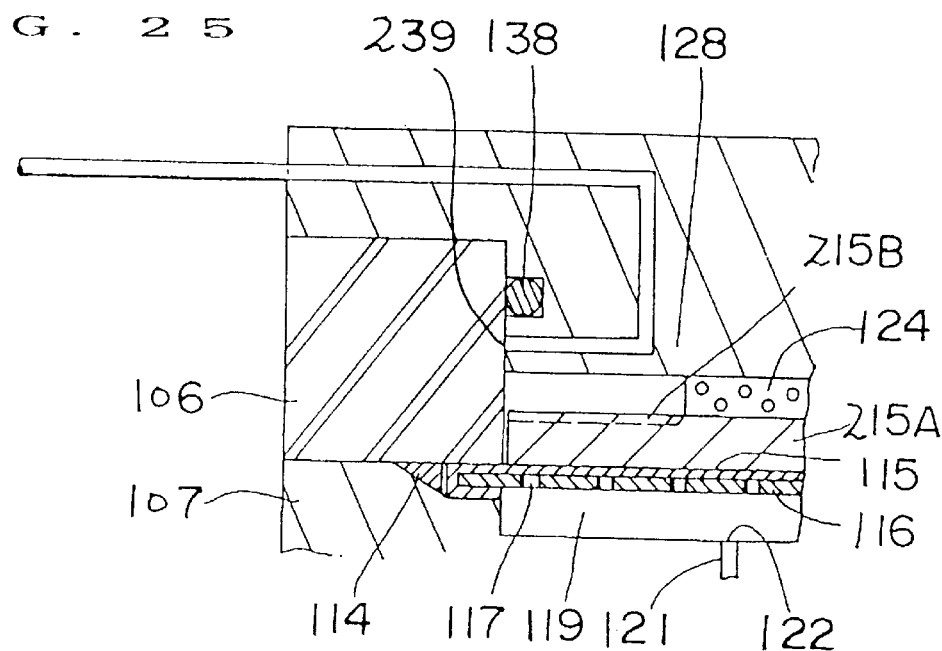
FIG. 25 is a diagrammatic fragmentary sectional view showing an elastic member in its mounted position.
Figure 26:
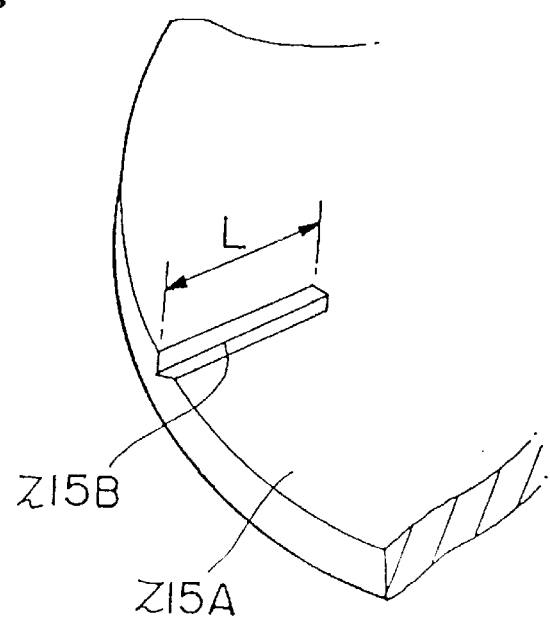
FIG. 26 is a fragmentary perspective view of an elastic member having an upper surface formed therein with a groove.

As is also shown in FIGS. 25 and 26, the elastic member 215A is of a circular disk-like shape and has an upper surface, i.e., the surface directed toward the projecting portion 128 to be described hereinafter, having formed therein a groove 215B arranged radially with respect to the center of the circular disk-like elastic member 215A. This groove 215B has a predetermined length L measured from the peripheral edge of the circular disk-like elastic member 215A. In other words, the length L is determined such that the groove is formed in the area of the upper surface of the elastic member 215A other than the area thereof on which a stack of sheets 124 to be press-formed is to be placed.

In this embodiment, the support member 116, the sealing member 115 and the elastic member 215A form a pressure transmitting means, as shown in FIG. 24. The elastic member 215A, however, may be omitted so that the pressure transmitting means is formed solely by the support member 116 and the sealing member 115. In this case, therefore, the sealing member 115 acts as the elastic member in the pressure transmitting means in the present invention.

The provision of the pressure transmitting means formed by the support member 116, the seal member 115 and the elastic member 215A is effective to divide, into two spaces, the cavity in the pressure container 101 formed by the first and second bodies 106 and 107 so that a recess 119 in the second body 107 and the elastic member 215A cooperate to define a pressure medium containing space 118 while a circular disk-like space 108 in the first body 106 and the elastic member 215A cooperate to define a material receiving space 120.

A detailed explanation of the structure of the yoke is omitted because it is similar to that in example 5 described before.

The manufacture of a laminated product by use of the press-formed product making apparatus of this example will be described hereunder.

In an initial position, the yoke 105 is waiting at a position retracted from the pressure container 101.

As shown in FIG. 24, the lid member 202 (designated by 102 in FIG. 18) is kept dismounted from the upper surface of the pressure container 101 to keep the cavity in the pressure container 101 opened and exposed. Then, the elastic member 215A is placed on the sealing member 115 in the material receiving space 120. At this time, because the sealing member 115 is integral with the circular disk-like support member 116, the elastic member 215A placed on the sealing member 115 does not lower the sealing member 115 downwards but is stably supported on the sealing member 115. A stack of sheets 124 is then placed on the elastic member 215A.

The stack of sheets 124 is similar to those used in the examples 1–8 and thus will not be described in detail herein.

After the stacked sheets 124 are received, the lid member 202 is turned to a position above the pressure container 101.

A cylinder is actuated to downwardly move a plunger 135 to thereby downwardly move the lid member 202. At this time, a gas feeding and discharging means is operated to suck and discharge gas through a gas introducing and discharging passage 141. When the lower part of the projecting portion 128 is fitted into the cavity in the pressure container 101, the gas in the material receiving space 120 defined by the bottom surface of the projecting portion 128, the inner peripheral surface of the first body 106 and elastic an member 215A is discharged through the gas introducing and discharging passage 141. When the gas in the material receiving space 120 has been discharged, the pressure in the material receiving space 120 is lowered to allow the lid member 202 to be pressed by the atmospheric pressure so that the projecting portion 128 is drawn into the cavity in the pressure container 101 to immediately finish the mounting of the projecting portion 128 in the cavity in the pressure container 101.

At this time, there is a possibility that the reduced pressure in the material receiving space 120 causes the elastic member 215A to be bulged toward the projecting portion 128 and, in some cases, the upper surface of the elastic member 215A might be brought into contact with the bottom surface of the projecting portion 128. In such a case, however, the groove 215B formed in the upper surface of the elastic member 215A is operative to allow the gas in the whole parts of the material receiving space 120 to be smoothly discharged through the groove 215B even if the upper surface of the elastic member 215A is in contact with the bottom surface of the projecting portion 128.

In addition, because the third port 239 of the gas introducing and discharging passage 141 is opened in the outer peripheral surface of the projecting portion 128, the material receiving space can effectively be evacuated even if the elastic membmer 215A could be bulged into contact with the bottom surface of the projecting portion 128. In other words, if the third port 139 were opened in the bottom surface of the projecting portion 128, as shown in FIG. 23 bulged elastic member 215A would disadvantageously close the third port 139. Such a disadvantage, however, is eliminated because the third port 239 is opened in the peripheral surface of the projecting portion 128.

The discharge of the gas from the material receiving space 120 is continued even after the completion of the mounting of the projecting portion 128 into the cavity.

In the case where the discharge of the gas is continued, the gas in the material receiving space 120 is smoothly discharged therefrom through the groove 215B formed in the upper surface of the elastic member 215A even if the upper surface of the elastic member 215A is in intimate contact with the bottom surface of the projecting portion 128.

Then, the yoke 105 is moved so that the pressure container 101 with the lid member 202 mounted thereon is disposed in the working opening 145 in the yoke 105. In this state, the bottom surface of the upper horizontal section of the yoke 105 is positioned close to the upper surface of the lid member 202 while the upper surface of the lower horizontal section 144 of the yoke 105 is positioned close to the bottom surface of the pressure container 101.

The members positioned as described above, pressforming of the stack of sheets 124 is carried out as follows:

The pressure medium feeding means is operated to forcibly introduce the pressure medium 119 through the pressure medium introducing and discharging passage 121 into the pressure medium containing space 118. When the pressure in the pressure medium containing space 118 is raised to a predetermined pressure level, the introduction of the pressure medium 119 by the pressure medium feeding means into the pressure medium containing space 118 is stopped. The predetermined pressure of the pressure medium 119 is applied through the apertures 117 in the support member 116 to the elastic member 215A. The predetermined pressure of the pressure medium 119 tends to lift the lid member 202 via the elastic member 215A and the stacked sheets 124. However, the lid member 202 is confined by the yoke 105 and thus cannot be lifted. Accordingly, the predetermined pressure of the pressure medium 119 causes the stacked sheets 124 to be pressed by the elastic member 215A and the lid member 202 and, more particularly, the bottom surface of the projecting portion 128. During this pressing operation, the heat of the heated yoke 105 is transmitted to the lid member 202 and the pressure container 101 whereby the stacked sheets 124 are heated, as described hereinbefore.

There is a possibility that, due to the heating of the stacked sheets 124, gas is generated in the stack of sheets 124. However, because the gas in the material receiving space 120 is discharged therefrom by the gas feeding and discharging means, as described hereinbefore, the generated gas is discharged out of the system through the groove 215B formed in the upper surface of the elastic member 215A and the gas introducing and discharging passage 141 whereby the occurrence of defective products can be avoided which would otherwise be caused due to residue of gas generated in the stacked sheets 124 during the heating and pressing operation.

The above pressing and heating treatment forcibly secures the stacked sheets 124 together to form a laminated product.

When the pressing and heating treatment has been conducted for the predetermined time period, the cylinder 148 is again actuated to retract the yoke 105. The movement of the yoke 105 to its retracted position unconfines the upper surface of the lid member 202.

Then, the pressure medium feeding means is operated to discharge the presure medium 119, which has been forcibly introduced into the pressure medium containing space 118 through the pressure medium introducing and discharging passage 121, until the pressure in the pressure medium containing space 118 is restored to the normal pressure level. Simultaneously with the dischage of the pressure medium 119 or after the pressure in the pressure medium containing space 118 has been restored to the normal pressure level, the gas feeding and discharging means is driven to forcibly introduce the gas into the material receiving space 120. More particularly, the gas fed by the gas feeding and discharging means is introduced through the gas introducing and discharging passage 141 and the groove 215B into the space in which the laminated product is contained.

The introduction of the gas is effective to return the elastic member 215 from the position in which the elastic member has been bulged toward the material receiving space 120 to a position in which the elastic rember is adjacent to the support member 116, whereby the elastic member is restored to its initial position in which the elastic member has its planar upper surface.

When the cylinder 134 is actuated to upwardly move the lid member 202, the projecting portion 128 can easily be retracted from the cavity to complete the dismounting of the lid membmer 202 in a short time because the material receiving space 120 is kept by the pressure medium at an elevated pressure level. When the projecting portion 128 is retracted from the cavity, the elastic member 215A is not drawn toward the cavity because the cavity is filled with the pressure medium, to thereby assure that no crack is formed in the elastic member 215A.

When the lid member 202 is removed, the laminated product is exposed and can be taken out.

With the laminated product taken out of the cavity, the side of the elastic member 215A adjacent to the cavity is not bulged but kept planar and free from any damage such as cracks, so that a production of a succeeding laminated product can be started immediately.

As having been described above, the press-formed product making apparatus of the described embodiment provides advantages as follows:

(1) The lid member can be mounted on the pressure container easily and the projecting portion can be inserted into the cavity in a short time (which can be said to be a moment);
(2) When the projecting portion is inserted into the cavity, the inner peripheral surface of the cavity is not damaged even if the lid member is slightly inclined due to cantilevered support thereof;
(3) The groove formed in the upper surface of the elastic member is effective to lower the pressure in the space with a material being received therein even if the elastic member is bulged due to the reduced pressure in the material receiving space to bring the upper surface of the elastic member into contact with the bottom surface of the projecting portion;
(4) The gas generated due to heating during press-forming operation is removed through the groove formed in the elastic member to assure that void-free and bubble-free laminated products can be made;
(5) The lid member can easily be dismounted after pressing operation;
(6) There occurs no inconvenience that, when the projecting portion of the lid member is retracted from the cavity, the elastic member is pulled with a resultant damage thereof;
(7) After a pressing operation has been finished, the elastic member is restored from its bulged state, to thereby assure that a press-forming of a succeeding stack of sheets can be started with the elastic member unchanged, whereby a large number of stacks of sheets can be successively subjected to press-forming treatments with a resultant speedy production of a large number of laminated products.

EXAMPLE 10

The press-formed product making apparatus of the example 10 is an example of the press-forming aparatus of the present invention. This press-formed product making apparatus is disclosed as embodiment 2 in the specification of Japanese Patent Application No. Hei 6-130409 which is a basis of the present application.

Unlike the apparatus of the example 9, the press-formed product making apparatus of this embodiment has its lid member disposed in a lower portion and a pressure container disposed in an upper portion.

Figure 27:
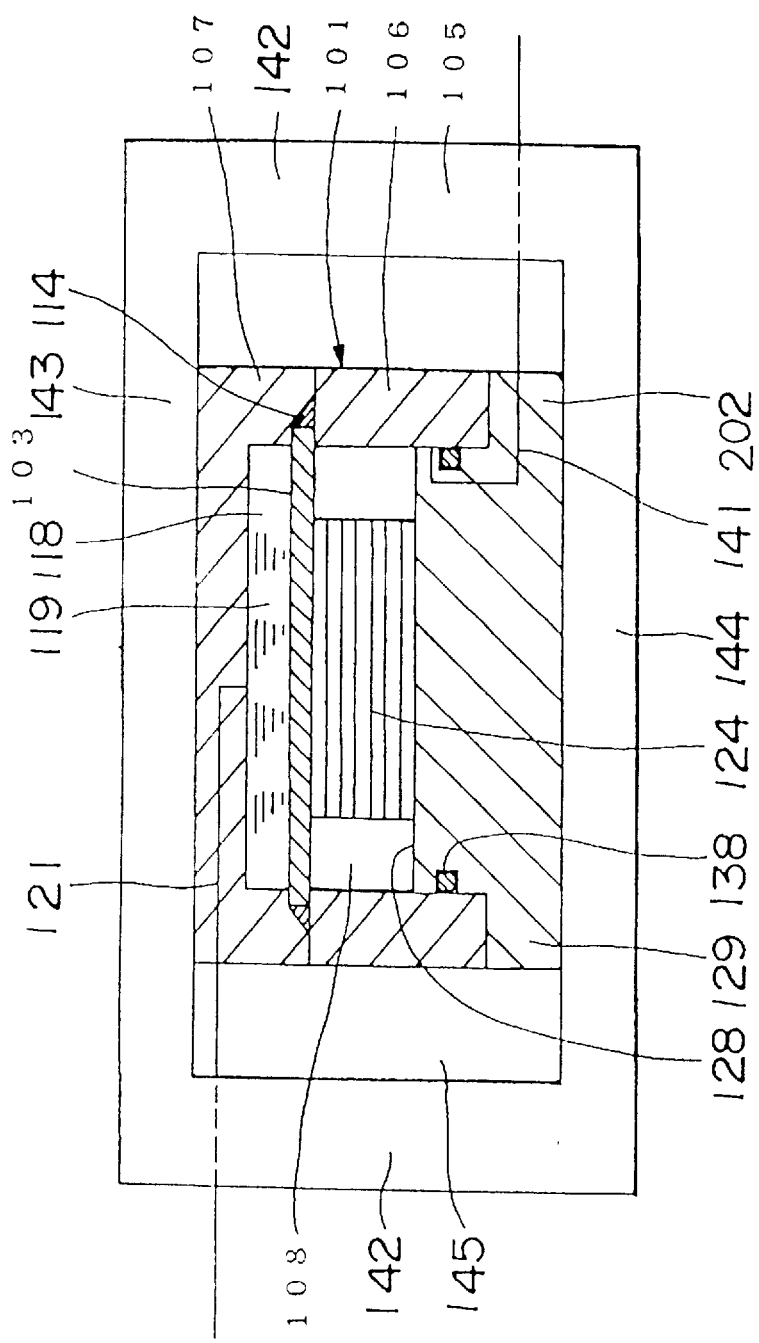
FIG. 27 is a diagrammatic sectional view showing the press-formed product making apparatus which is another embodiment of the present invention.

As shown in FIG. 27, the press-formed product making apparatus has a pressure container 101, a lid member 202, an elastic member 103 and a yoke 105 as a fixing member.

The shape of the pressure container 101 is similar to that of the pressure container 101 of the press-formed product making apparatus of the example 9 described above. In this embodiment, however, the cavity in the pressure container is opened downwardly, contrary to that in the described example 9. The pressure container 101 has a first body 106 and a second body 107 superposed thereon, as in the embodiment 9 described above.

The structures of the first and second bodies 106 and 107 are similar to those in the example 9. An annular tapered surface and annular horizontal surface are provided on the second body 107, as in the example 9, and a back-up ring mounting potion and an elastic member mounting portion are also provided. A ring of a wedge-shaped section is also provided in the back-up ring mounting portion, as in the example 9.

A pressure transmitting means in this example 10 is also formed by a support member, a sealing member and an elastic member, as in the example 9, and has a structure similar to that in the example 9. The sealing member has its edge portion formed into a sealing member mounting portion on which the edge portion of the support member is secured so that the sealing member is applied to the bottom surface of the support member. The elastic member is mounted on the bottom surface of the sealing member. In short, while the pressure transmitting means of the example 9 described above has the sealing member applied to the upper surface of the support member and has the elastic member provided on the upper surface of the sealing member, the pressure transmitting means of the example 10 has the sealing member applied to the bottom surface of the support member and has the elastic membmer provided on the bottom surface of the sealing member. In the example 9, the groove, which is ventilation means, is formed in the upper surface of the elastic means. In the example 10, however, the groove is formed in the bottom surface of the elastic member.

FIG. 27 does not show the pressure transmitting means in detail. However, the structure of the pressure transmitting means formed by the support member 116 and the sealing member 115 can be easily understood by referring to FIGS. 24 and 25.

The material of the elastic member 215A (see FIG. 28) is similar to that in the example 9.

The elastic member is provided to extend across the cavity in the pressure container to divide, into two, the cavity in the pressure container 101, which is formed by the first and second bodies 106 and 107, so that a recess 119 in the second body and the elastic member 215A cooperate to define a pressure medium containing space 118 while a circular disk-like space 108 in the first body 106 and the elastic member 215A cooperate to define a material receiving space 120.

The lid member 202 has a lid body 129 and a projecting portion 128, as shown in FIG. 27 and will be understandable by referring to FIG. 20, and is distinguished from the lid member of the example 9 in that the projecting portion 128 of the lid member 202 is provided on and projects from the upper surface of the lid body 129.

In the other points, the lid member 202 is the same as that in the example 9.

The yoke 105 has a structure similar to that in the example 9.

In short, the point in which the press-formed product making apparatus of the example 10 is remarkably distinguished from that of the example 9 is that the lid member has a lid body and a projecting portion on the upper surface of the lid body and the pressure container is arranged to have its cavity opened downwardly.

In FIG. 27, the members similar to those of the example 9 are designated by the same reference numerals as in the example 9. It is to be noted that the lid member of this embodiment is designated by reference numeral 202.

The operation of the press-formed product making apparatus of the described structure will be described hereinunder.

In an initial position, the yoke 105 is waiting at a retracted position.

The lid member 202 is kept removed from the bottom surface of the pressure container 101 and is turned to a position retracted from under the pressure container 101 to allow the cavity in the pressure container 101 to be opened and exposed. Then, a stack of sheets 124 is placed on the upper surface of the projecting portion 128. The operation to place the stack of sheets 124 on the upper surface of the projecting portion 128 is greatly simplified compared with the operation to place the stack of sheets 124 in the example 9. The reason will be easily understandable by considering the case in which a plurality of stacked sheets 124 are to be placed in order in a recessed place and the case where a plurality of stacked sheets 124 are to be placed on an open and plannar surface.

The projecting portion is horizontally turned to a position directly under the pressure container 101.

A cylinder is actuated to lift a plunger 135 to upwardly move the lid member 202. At this time, a gas feeding and discharging means is driven to suck and discharge gas through a gas introducing and discharging passage 141 (see FIG. 27). When the upper part of the projecting portion 128 is fitted into the cavity in the pressure container 101, the gas in a material receiving space 120 defined by the upper surface of the projecting portion 128, the inner peripheral surface of a first body 106 and an elastic member 215A is discharged from the space through the gas introducing and discharging passage 141. When the gas has been discharged from the material receiving space 120, the pressure in the material receiving space 120 is lowered, so that the lid member 202 is forced by the atmospheric pressure and the projecting portion 128 is drawn into the cavity in the pressure container 101 to immediately finish the mounting of the projecting portion 128 in the cavity.

In the state in which the projecting portion 128 is inserted into the cavity, the space defined by the projecting portion 128, the inner peripheral surface of the first body 106 and a pressure transmitting means having the elastic member 215A is kept at a lowered pressure level. Accordingly, there is a possibility that the bottom surface of the bulged elastic member 215A is brought into contact with the upper surface of the projecting portion 128. However, because a groove 215B (see FIG. 26) is formed in the bottom surface of the elastic member 215A, the gas in the material receiving space is efficiently discharged therefrom through the groove 215B.

In addition, because a third port 139 is opened in the peripheral side face of the projecting portion 128, there is no hindrance to the discharge of gas from the material receiving space even if the bottom surface of the elastic member 215A is in contact with the upper surface of the projecting portion 128.

The discharge of the gas from the material receiving space 120 through the gas introducing and discharging passage 141 is continued even after the completion of the mounting of the projecting portion 128 into the cavity. At this time, the discharge of the gas from the material receiving space 120 can be continued because the bottom surface of the elastic member 215A has the groove formed therein.

The yoke 105 is moved so that the pressure container 101 with the lid member 202 mounted thereon is placed in a working opening 145 in the yoke 105. In this state, the upper surface of the lower horizontal section 144 of the yoke 105 is positioned close to the bottom surface of the lid member 202 while the bottom surface of the upper horizontal section 143 of the yoke 105 is positioned close to the upper surface of the pressure container 101.

Figure 28:
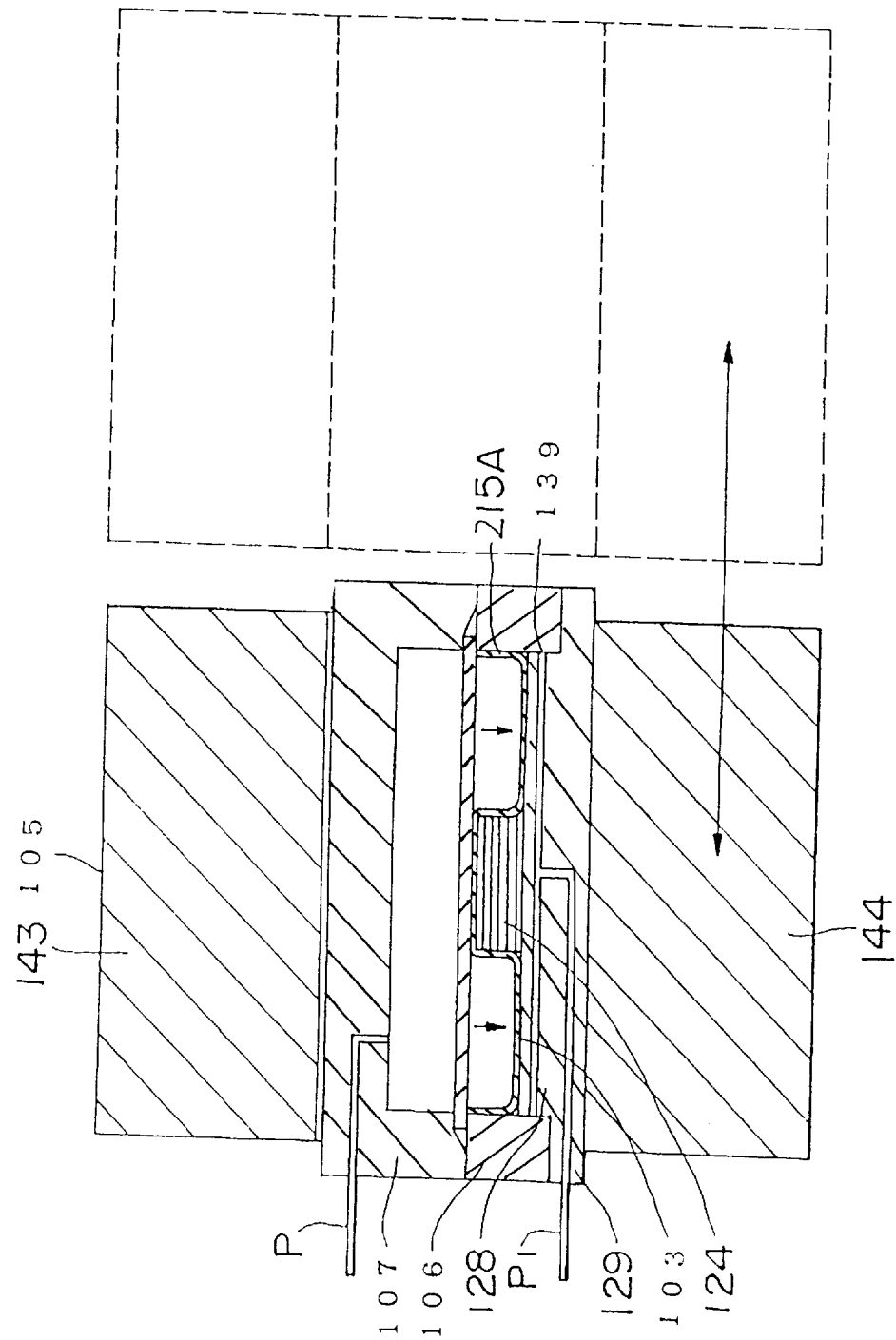
FIG. 28 is a diagrammatic sectional view illustrating the operation of the press-formed product making apparatus which is a further embodidment of the present invention.

In this state, a press-forming of a stack of sheets 124 is carried out as follows:

A pressure medium feeding means is operated to forcibly introduce a pressure medium 119 through a pressure medium introducing and discharging passage 121 into the pressure medium containing space 118. When the pressure in the pressure medium containing space 118 has reached a predetermined pressure level, the introduction of the pressure medium 119 by the pressure medium feeding means into the pressure medium containing space 118 is stopped. The predetermined pressure of the pressure medium 119 is applied to the elastic member 215A. As shown in FIG. 28, the portions of the elastic member 215A where no spacer is provided are bulged by the pressure medium 119 toward and into contact with the projecting portion 128. The predetermined pressure of the pressure medium 119 acts through the elastic member 215A and the stacked sheets 124 on the lid member 202 and tends to downwardly move the same. However, the lid member 202 cannot be lowered because it is confined by the yoke 105. Thus, the predetermined pressure of the pressure medium 119 causes the stacked sheets 124 to be pressed by the elastic member 215A and the lid member 202, particularly, the upper surface of the projecting portion 128. During this pressing operation, the heat of theheated yoke 105 is transmitted to the lid member 202 andthe pressure container 101, whereby the stacked sheets 124 are heated, as described hereinbefore.

There is a possibility that, due to the heating of the stacked sheets 124, gas is generated in the stacked sheets 124. However, because the gas in the material receiving space 120 is discharged therefrom by the gas feeding and discharging means and because the elastic member 215A has the groove formed in the bottom surface thereof, the gas generated is discharged out of the system through the groove 215B and the gas introducing and discharging passage 141. Accordingly, the occurrence of defective laminated products having voids and bubbles therein due to residue of gas generated in the stack of sheets 124 during heating and pressing can be avoided.

By such pressing and heating treatment, the stacked sheets 124 are pressed together into a unit to form a laminated product.

After the pressing and heating treatment for a predetermined time period finished, a cylinder 148 (see FIG. 18) is again actuated to retract the yoke 105, so that the lid member 202 is now unconfined.

Then, the pressure medium feeding means is operated to discharge the pressure medium 119, which has been introduced into the pressure medium containing space 118 through the pressure medium feeding and discharging passage 121 (see FIG. 27), until the pressure in the pressure medium containing space 118 is restored to the normal pressure level.

When the pressure in the pressure medium containing space 118 is restored to the normal pressure level, and preferably, simultaneously with the discharge of the pressure medium 119, the gas introducing and discharging means is operated to forcibly introduce gas into the material receiving space 120. More specifically, the gas being fed by the gas feeding and discharging means is introduced through the gas introducing and discharging passage 141 and the groove 215B into the material receiving space 120 in which the stacked sheets 124 are received.

Due to the introduction of the gas, the portions of the elastic member 215A which have been in contact with the upper surface of the projecting portion 128 are now forced backwardly toward the support member 116 and restored to its initial planar shape.

When the cylinder 134 (see FIG. 17) is actuated to move the lid member 202 downwards, the projecting portion 128 can be retracted from the cavity quite easily to finish dismounting of the lid member 202 in a short time because the material receiving space 120 is kept by the gas at an elevated pressure level. When the projecting portion 128 is retracted from the cavity, the elastic member 215A is not drawn into the material receiving space 120 because the cavity is filled with a pressurized gas, with a result that no cracks are formed in the elastic member 215A when the projecting portion 128 is retracted.

When the lid member 202 is lowered and removed from the pressure container 101, the laminated product is exposed and can be taken out.

In the state in which the laminated product has been taken out of the cavity, the side of the elastic member 215A adjacent to the cavity is not bulged but in a planar condition and is free from any damage such as cracks, a process for the production of a succeeding laminated product can be started immediately.

As having been described, the press-formed product making apparatus produces following advantages:
(1) The lid member can be easily mounted in the pressure container and the projecting portion can be inserted into the cavity in a short time (which can be said as being a moment);
(2) When the projecting portion is inserted into the cavity, the inner peripheral surface is not damaged even if the lid member is slightly inclined due to a cantilevered support therefor;
(3) The groove formed in the bottom surface of the elastic member is effective to assure that, when the gas in the material receiving space is to be discharged to establish a reduced pressure therein, the discharge of the gas can be prevented from being blocked due to bulged elastic member;
(4) Because the gas generated due to heating during press-forming operation is removed through the groove, void-free and bubble-free laminated products can be made;
(5) The lid member can be easily dismounted after pressing operation;
(6) When the projecting portion of the lid member is withdrawn from the cavity, the elastic member is not drawn and thus is prevented from being disadvantageously damaged;
(7) After the completion of the pressing operation, the elastic member is restored from a bulged shape caused due to the pressing operation, with a result that a press-forming of a succeeding stack of sheets can be started with the elastic member unchanged, whereby a large number of stacks of sheets can be subjected to successive pressing treatments to speedily make a large number of laminated products; and
(8) Because a method is employed in which a stack of sheets as a work is placed on the upper surface of the projecting portion of the lid member, the operation is easier than that in the example 9 in which a stack of sheets is fitted into the cavity, with a result that a fully automated laminated product making apparatus can be achieved by using an automatic handling means which grips and places on the upper surface of the projecting portion a stack of sheets fed by an automatic conveying means and, after the press-forming treatment of the stack of sheets into a laminated product, transfers the laminated product from the upper surface of the projecting portion to another conveying means. In other words, the apparatus of this embodiment in which the press-forming treatment is performed with a stack of sheets placed on the upper surface of the projecting portion can easily achieve a full automation.

EXAMPLE 11

The press-formed product making apparatus of the example 11 is an example of the press-forming apparatus of the present invention. This press-formed product making apparatus is disclosed as example 3 in the specification of Japanese Patent Application No. Hei 6-130409 which is a basis of the present application.

This embodiment is concerned with a press-formed product making apparatus having a spacer.

Figure 29:
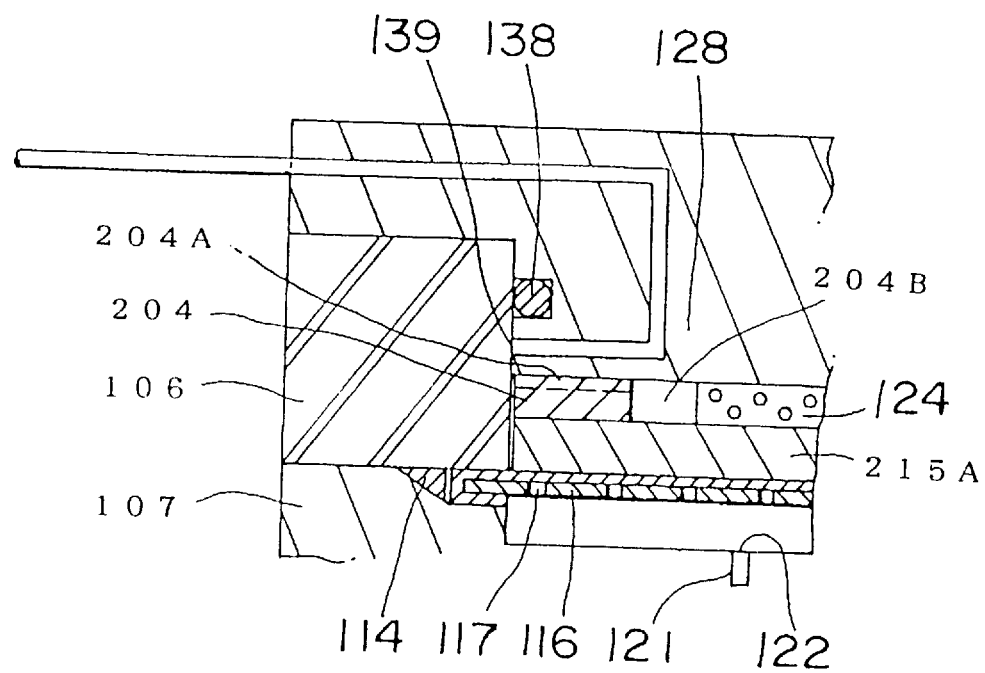
FIG. 29 is a diagrammatic sectional view of a still further embodiment of the press-formed product making apparatus of the present invention which employs a spacer having a groove formed therein.
Figure 30:
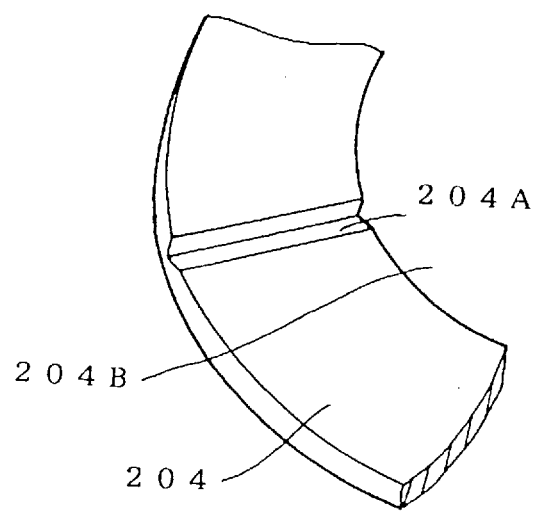
FIG. 30 is a fragmentary perspective view of the spacer having a groove formed therein.

As shown in FIG. 29, the press-formed product making apparatus of the example 11 is distinguished from the press-formed product making apparatus of the example 9 in that the surface of the elastic member 215A directed to the projecting portion 128 is not provided with any groove, that a spacer 204 is disposed in that area of the space defined between the upper surface of the elastic member 215A and the projecting portion 128 when the projecting portion 128 is inserted into or mounted in the material receiving space which area is not occupied by a stack of sheets 124, and that the surface of the the spacer 204 faced to the projecting portion 128 has a groove 204A formed therein as shown in FIG. 30.

Figure 31:
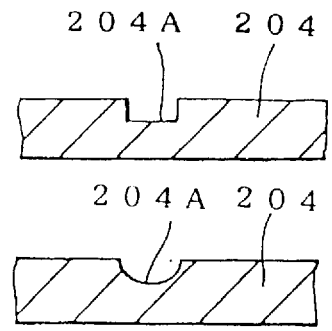
FIG. 31 illustrates shapes of grooves formed in spacers.

The spacer 204 is an annular plate-like member having a surface in which the groove 204A is formed and has a V-shape in cross-section, as shown in FIGS. 29 and 30. The spacer 204 has a receiving opening 204B of a shape, as viewed in plan view, such as square or circular shape (circular shape in this embodiment), of a size greater than that of a stack of sheets 124. The spacer 204 may be made of a material such as hard rubber. The groove 204A may be of any cross-sectional shape so long as the groove exhibits a function to effectively discharge gas from a material receiving space,.i.e., the receiving opening 204B. Any desired number of such grooves may be formed in the surface of the spacer 204. For example, a plurality of such grooves may be formed in the surface of the spacer 204 so as to extend radially outwardly. The groove 204A may alternatively have a square or semi-circular cross-sectional shape, as shown in FIG. 31.

The provision of the spacer 204 is effective to avoid the occurrence of the undesired that, when the pressure in the material receving space is lowered and the pressurized fluid is forcibly introduced into the pressure medium containing space during a press-forming operation, the elastic member 215A is bulged and unduly deformed to such an extent as to be brought into contact with the bottom surface of the projecting portion 128. The spacer 204 prevents the elastic member 215A from being unduly deformed or distorted, whereby occurrence of the damage in the elastic member 215A can be reduced correspondingly.

The groove 204A formed in the upper surface of the spacer 204 assures that the gas in the area in which a stack of sheets is present can be efficiently discharged therefrom through the groove 204A even if the pressure in the material receiving space is lowered so that the upper surface of the spacer 204 and the bottom surface of the projecting portion 128 are brought into intimate contact with each other. Accordingly, the gas generated in the stacked sheets during heating and pressing operation can be efficiently discharged out of the system to assure production of void-free and crack-free laminated products.

EXAMPLE 12

The press-formed product making apparatus of the example 12 is an example of the press-forming apparatus of the present invention. This press-formed product making apparatus is disclosed as example 4 in the specification of Japanese Patent Application No. Hei 6-130409 which is a basis of the present application.

Figure 32:
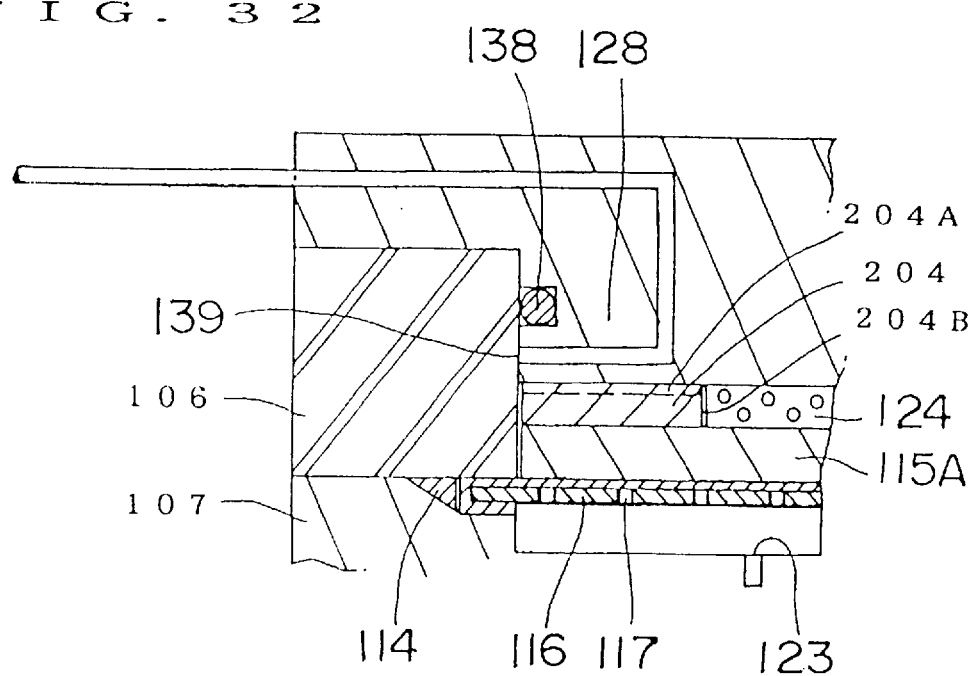
FIG. 32 is a diagrammatic sectional view of a still further embodiment of the press-formed product making apparatus of the present invention which employs a different form of spacer.

As shown in FIG. 32, the press-formed product making apparatus of this embodiment is substantially the same in structure as the press-formed product making apparatus of the example 11 with the exception that a spacer 204 is used which has a receiving space 204B substantially the same in shape in plan view as the stack of sheets 124.

Also in the apparatus of this embodiment, a groove 204A is formed in the spacer 204, so that the embodiment provides advantages substantially the same as those obtained from the embodiment 11.

The remarkable advantage of the apparatus of this embodiment is that, since the space defined between an elastic member 215A and a projecting portion 128 is substantially fully occupied by the stack of sheets 124 and the spacer 204, the bulging of the elastic member 215A caused during press-forming operations or during pressure-reducing operations in non-press-forming operations is reduced to the utmost, to thereby minimize damage of the elastic member 215A caused by deformation fatigue. In other words, in this embodiment, damage of the elastic member is minimized with a resultant increase in the operative life of the elastic member 215A.

EXAMPLE 13

The press-formed product making apparatus of the example 13 is an example of the press-forming apparatus of the present invention. This press-formed product making apparatus is disclosed as example 5 in the specification of Japanese Patent Application No. Hei 6-130409 which is a basis of the present application.

Figure 33:
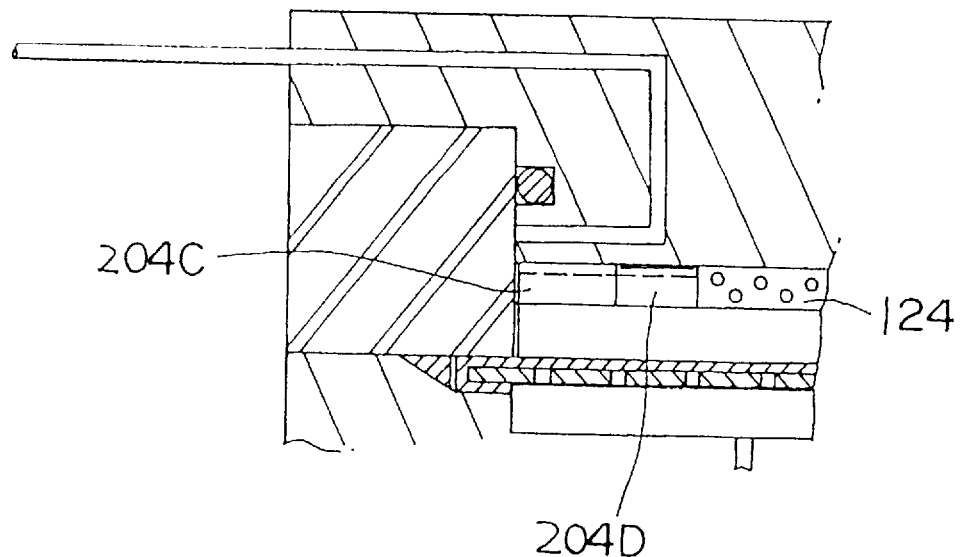
FIG. 33 is a diagrammatic sectional view showing the press-formed product making apparatus which employs a pair of inner and outer spacers having grooves formed therein.
Figure 34:
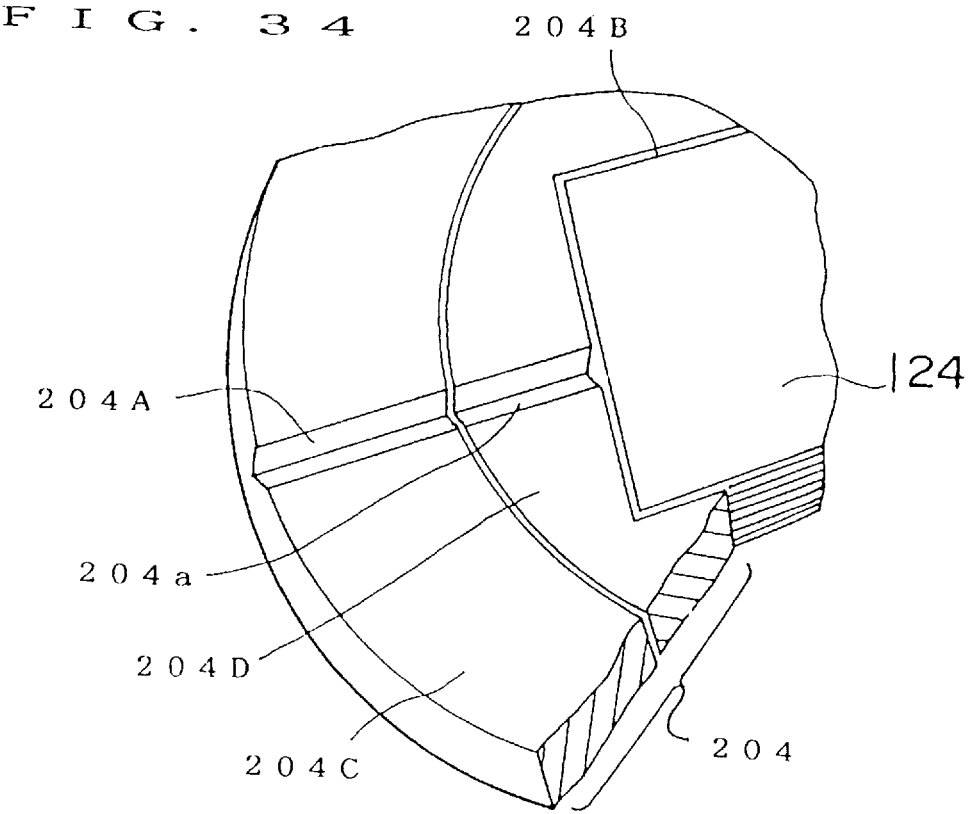
FIG. 34 is a fragmentary perspective view of the pair of spacers.
Figure 35:
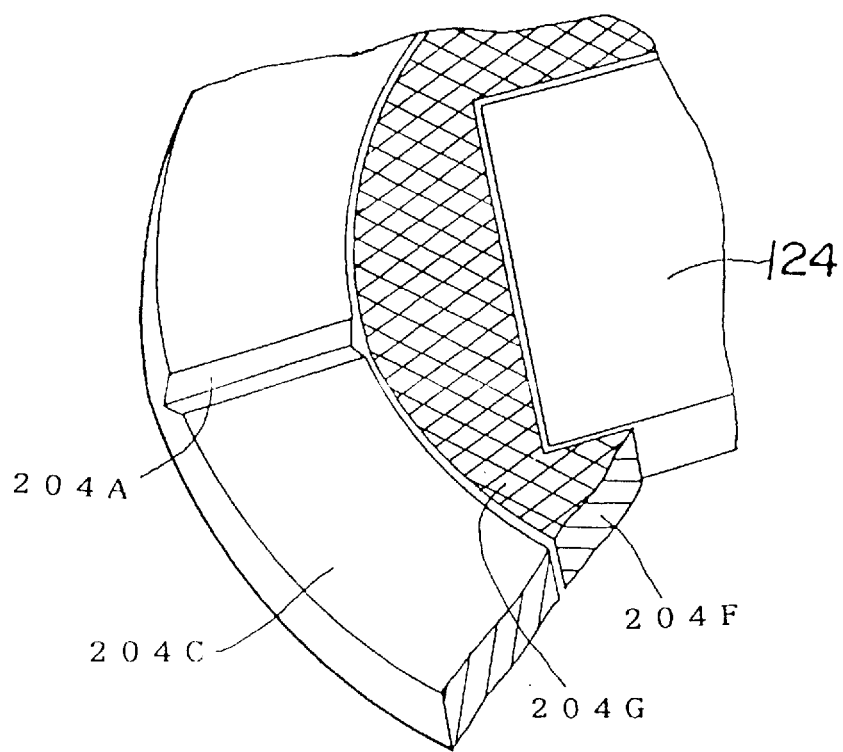
FIG. 35 is a fragmentary perspective view showing an outer space having a groove formed therein and an inner spacer having a screen member thereon.

As shown in FIGS. 33 and 34, the press-formed product making apparatus of this embodiment has a spacer 204 having a receiving space 204B substantially the same in shape in plan view as the stack of sheets 124 and being formed of a pair of outer spacer 204C and an inner spacer 204D. The inner spacer 204D has a receiving space 204B substantially the same in shape in plan view as the stack of sheets 124 and is formed of a circular disk-like member. A plurality of grooves 204a are formed in the upper surface of the inner spacer 204D. On the other hand, the outer spacer 204C is formed of an annular disk-like member having a receiving space 204B substantially the same in shape in plan view as the inner spacer 204D. A plurality of grooves 204A are also formed in the upper surface of the outer spacer 204C. These grooves 204a and 204A are so arranged as to be continuous when the inner spacer 204D is fitted in the opening in the outer spacer 204C.

The spacer 204 formed by a pair of the spacers provides an advantage that a plurality of inner spacers of different kinds 204D having different receiving spaces 204B may be prepared to make it possible to use inner spacers suitably selected for the opening of the outer spacer 204C to produce laminated products of different sizes by the use of the same press-formed product making apparatus.

EXAMPLE 14

The press-formed product making apparatus of the example 14 is an example of the press-forming apparatus of the present invention. This press-formed product making apparatus is disclosed as example 6 in the specification of Japanese Patent Application No. Hei 6-130409 which is a basis of the present application.

The point in which this embodiment is distinguished from the press-formed product making apparatus of the above-described example 13 is that, in place of the inner spacer provided with grooves, an inner spacer which is not provided with grooves but has a net member 204G such as wire screen disposed on the surface thereof directed to the projecting portion 128.

The net member 204G and the groove 204A in an outer spacer 204C form a ventilation means.

The net member 204G provides an advantage that, although the use of an inner spacer provided with a groove and an outer spacer provided with a groove necessitates an adjustment to place the grooves in registration with each other, the use of the net memmber 204G is free from such adjusting operation.

Preferred modes of the present invention which can be concluded from the examples 9–14 will be pointed out hereunder.

A first mode is a press-formed product making apparatus comprising:

a pressure container having formed therein a material receiving space and a pressure medium containing space, and pressure transmitting means having an elastic member separating the material receiving space from the pressure medium containing space and being operative to transmit the pressure of a pressure medium forcibly introduced into the pressure medium containing space to a material disposed in the material receiving space;

heating means for heating the interior of the pressure container;

a lid member having a projecting portion to be inserted into the material receiving space and gas introducing and discharging means for introducing and discharging the pressure medium into and from the material receiving space;

ventilation assuring means for assuring discharge of the gas from the material receiving space through the gas introducing and discharging means when the pressure in the material receiving space is to be lowered by the gas introducing and discharging space; and fixing means operative, when the lid member is mounted on the pressure container, to fix the lid member to the pressure container so that the projecting portion cannot be forced out from the material receiving space during a press-forming of the material.

A second mode is a press-formed product making apparatus of the first mode, wherein the pressure transmitting means has a support member disposed to separate the material receiving space from the pressure medium containing space and having formed therein a large number of apertures, a first sealing member disposed on the surface of the support member adjacent to the material receiving space, and the elastic member disposed on the surface of the sealing member.

A third mode is a press-formed product making apparatus of the first mode or second mode, wherein the ventilation assuring means comprises a groove formed in the surface of the pressure transmitting means adjacent to the material receiving space.

A fourth mode is a press-formed product making apparatus of any one of the first to third modes, wherein said ventilation assuring means comprises a groove formed in an area of the surface of the pressure transmitting means adjacent to the material receiving space, the area being other than the surface area of the pressure transmitting means on which the material is to be placed.

A fifth mode is a press-formed product making apparatus of the first mode or second mode, wherein the ventilation assuring means comprises a groove formed in the surface of a spacer directed to the lid member, the spacer having an open space for receiving the material therein and being so formed as to be disposed on the upper surface of the pressure transmitting means in the material receiving space.

A sixth mode is a press-formed product making apparatus of the first mode or second mode, wherein the ventilation assuring means comprise a net member provided on the surface of a spacer directed to the lid member, the spacer having an open space for receiving the material therein and being so formed as to be disposed on the upper surface of the pressure transmitting means in the material receiving space.

The press-formed product making apparatus of the present invention which is supported by the first to sixth modes provides following advantages:

(1) The lid member can be easily mounted on and dismounted from the pressure container, so that the projecting portion can be inserted into and retracted from the cavity in a short time (which can said to be a moment);
(2) When the projecting portion is inserted into or retracted from the cavity in the pressure container, the inner peripheral surface of the cavity is not damaged even if the lid member is slightly inclined;
(3) When the lid member is mounted and when a press-forming operation is performed, the pressure in the material receiving space can be lowered without any problem and this space can be kept at the lowered pressure without any problem; and
(4) Because the gas generated during press-forming operation, void-free and bubble-free laminated products can be made.

EXAMPLE 15

The press-formed product making apparatus shown in the example 15 is an example of the press-forming apparatus of the present invention. This press-formed product making apparatus is disclosed as an embodiment in the specification of Japanese Patent Application No. Hei 6-164427 which is a basis of the present invention.

Figure 36:
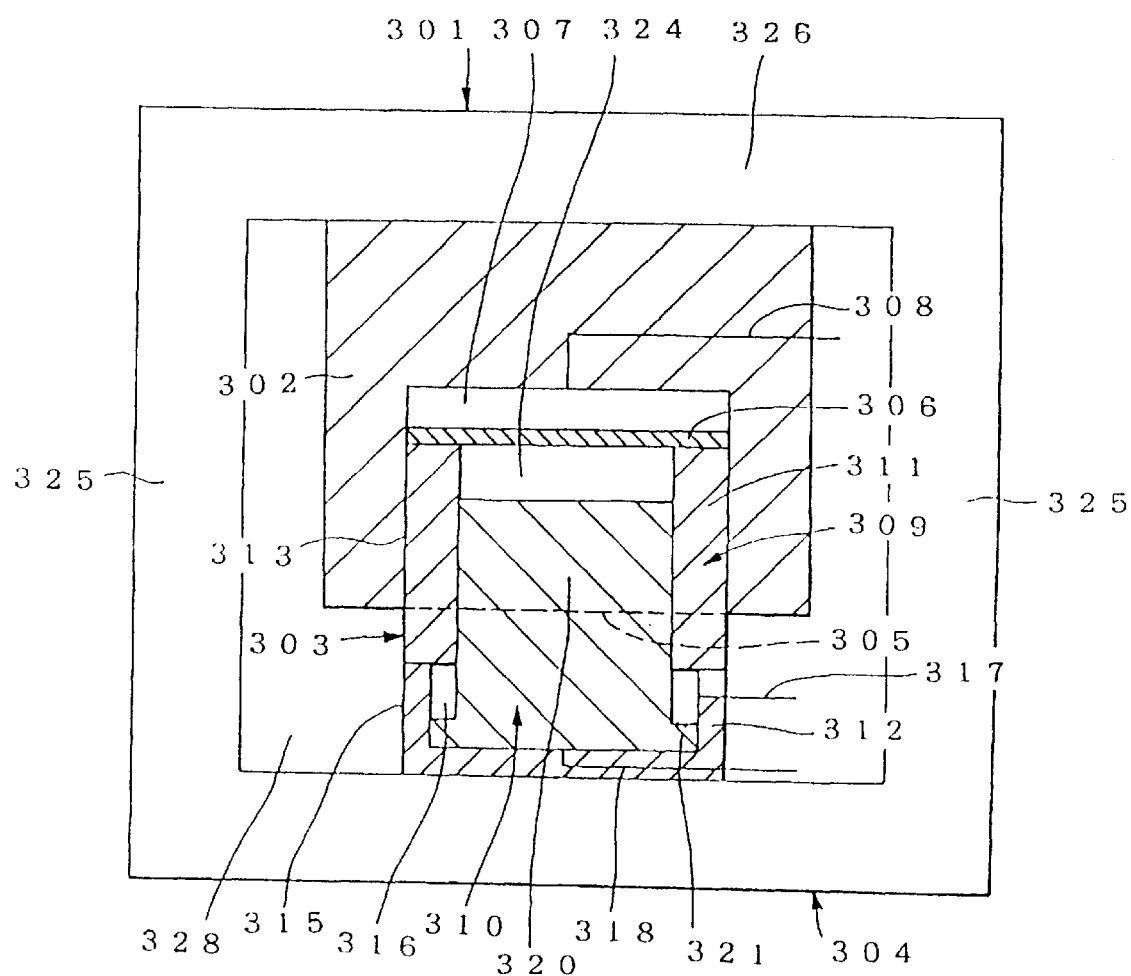
FIG. 36 is a diagrammatic illustration of a formed-product making apparatus which is an example of the press-forming apparatus of the present invention, showing an insert mounted in a cavity in a pressure container and a yoke confining the upper surface of the pressure container and the bottom surface of the insert.

As shown in FIG. 36, a press-formed product making apparatus 301 has a pressure container 302, an insert body 303 and a yoke 304 as a fixing member.

The pressure container 302 is in the form of a cylindrical body having an upper end face, an outer peripheral surface and a bottom end face. The pressure container 302 has formed therein a generally cylindrical cavity 305 having an open end opened in the bottom end face of the container and an inner end face confronting the open end of the cavity.

An elastic member 306 is disposed in and extends across the interior of the cavity 305 to divide the same into a space adjacent to the open end and another space adjacent to the inner end face.

The elastic member 306 cooperates with the inner end face and the inner peripheral surface of the cavity 305 to define a pressure medium containing space 307 which is filled with a pressure medium under pressure, such as pressurized liquid. The pressure medium must be contained in the pressure medium containing space 307 in a liquid-tight manner. For this purpose, the elastic member 306 extends across the cavity 305 in a liquid-tight manner.

In this embodiment, when the insert body 303 is inserted into the cavity 305, as will be described later, the insert body is designed to be in direct contact with a material to be press-formed received in the material receiving space. The elastic member 306 has an appropriate elasticity. Thus, even if the elastic member is brought into direct contact with the material to be press-formed, the elastic member does not adversely affect the material to be press-formed or a resultant press-formed product. However, in order to assure that a good press-formed product without any damage, is reliably obtained, a protective member having an elasticity should preferably be applied to the surface of the elastic member 306 which is directed to the open end of the cavity.

The pressure container 302 is provided with a pressure medium feeding line 308 having an end open in the inner end face of the pressure medium containing space 307 or the inner peripheral surface of the cavity 305 at an appropriate portion thereof. The pressure medium feeding line formed in the pressure container 302 is connected to pressure medium feeding means through a pipe line, not shown. This pressure medium feeding means comprise a pump for sucking and discharging the pressure medium, a pipe line connecting the pump to the pressure medium feeding line 308 and, if necessary, an ON-OFF valve and so on.

The insert body 303 has a cylinder 309 and a piston 310.

As shown in FIG. 36, the cylinder 309 has a cylinder body 311 and a cylinder bottom 312 on which the cylinder body 311 is superposed.

Figure 37:
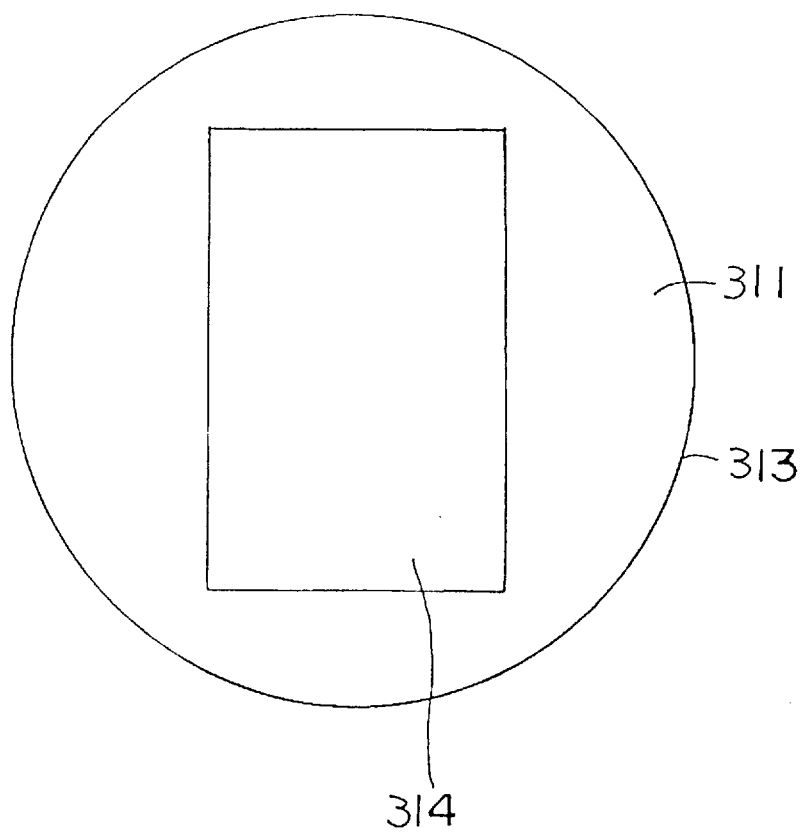
FIG. 37 is a top plan view of the upper surface of a cylinder of the press-forming apparatus which is an embodiment of the present invention.

As shown in FIG. 37, the cylinder body 311 is in the form of a generally cylindrical body having an outer surface 313 designed to be in contact with the inner peripheral surface 313 of the cavity 305 when the insert body 303 is inserted into the cavity 305, and a first inner space 314 of a rectangular horizontal cross-section as viewed from above the cylinder 309. The first inner space 314 extends through the cylinder body 311 from its one end face to the other end face thereof. An O-ring, not shown in FIG. 36, is mounted on and extends around the outer peripheral surface of the cylinder body 311 to assure that, when air is discharged from a material receiving space to be described later, the ambient air does not enter the material receiving space through a gap between the inner peripheral surface of the cavity 305 and the outer peripheral surface of the cylinder body 311.

The cylinder bottom 312 is in the form of a bottomed cylindrical member having the same diameter as the cylinder body 311 and has an outer peripheral surface 315 designed to be continuous with the outer peripheral surface 313 of the cylinder body 311 when the cylinder body 311 is superposed on the cylinder bottom 312, and a second cylindrical inner space 316 of a diameter greater than the dimension of the diagonal of the rectangular horizontal cross-section of the first inner space in the cylinder body 311.

In this embodiment, the cylinder bottom 312 is provided with a first gas introducing and discharging line 317 opened in the inner peripheral surface of the cylinder bottom 312. The first gas introducing and discharging line is connected to a first air feeding and discharging means, not shown.

The first air introducing and discharging means is so arranged as to feed and discharge air into and from the cylinder 309 through the first gas introducing and discharging line 317 and comprises, for example, a pipe line connected to the first gas introducing and discharging line 317, a pump for sucking and discharging air and, if required, valve means and so on.

The cylinder bottom 312 is provided with a second gas introducing and discharging line 318 opened in the bottom face of the second cavity 316 and connected to a second air feeding and discharging means, not shown. Air is introduced into and discharged from the second inner space 316 through the second gas introducing and discharging line 318.

The second air feeding and discharging means is so arranged as to feed and discharge air into and from the second inner space 316 through the second gas introducing and discharging line 318 and comprises, for example, a pipe line connected to the second gas introducing and discharging line 318, a pump for sucking and discharging air and, if required, valve means and so on.

Figure 38:
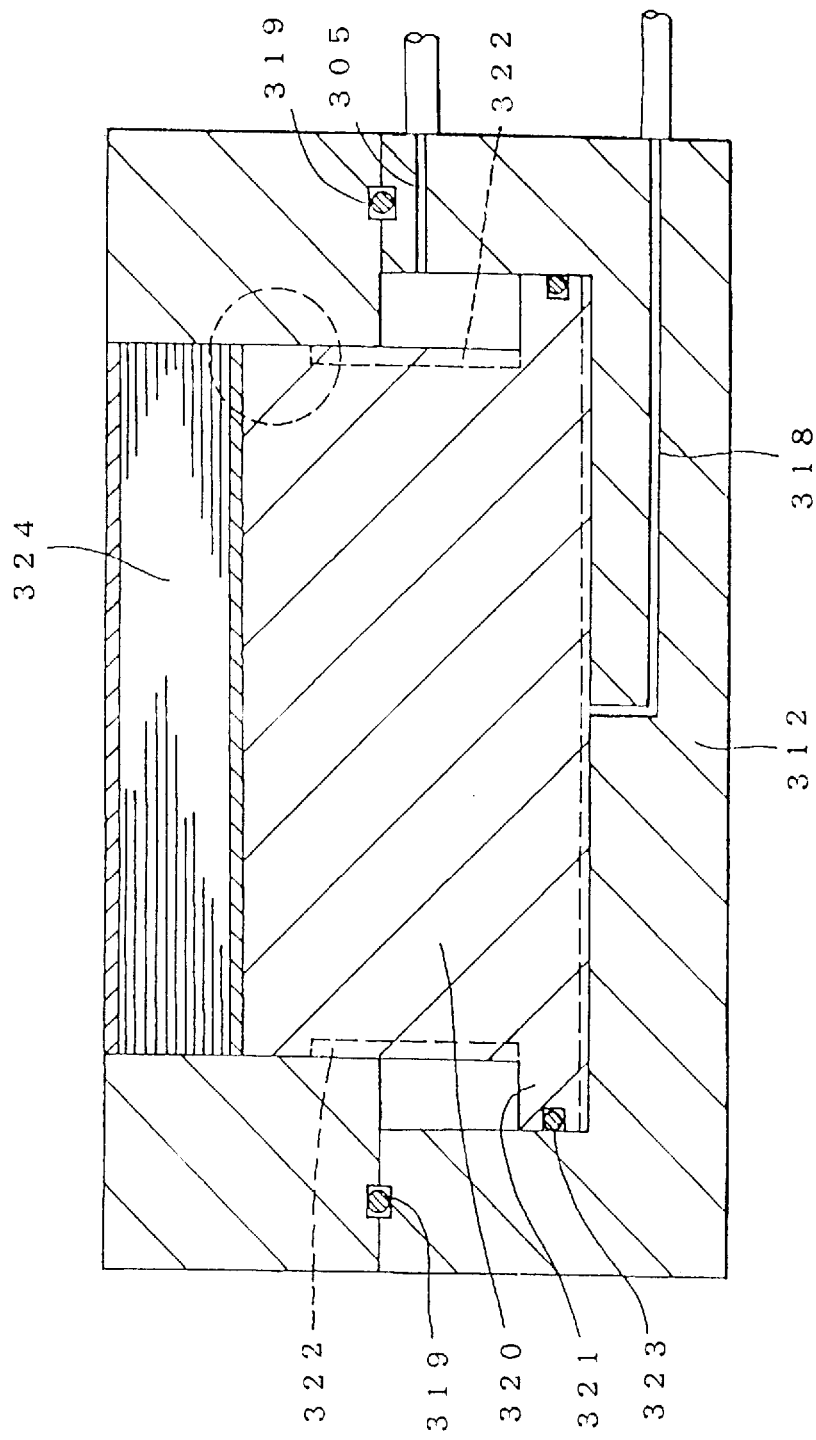
FIG. 38 is a diagrammatic sectional view showing the structure of an insert of the press-forming apparatus which is an embodiment of the present invention.

In order to provide a gas-tight seal between the upper surface of the cylinder bottom 312 and the bottom surface of the cylinder body 311 superposed thereon, an O-ring 319, for example, is interposed between the upper surface of the cylinder bottom 312 and the bottom surface of the cylinder body 311, as shown in FIG. 38.

The piston 310 has a piston body 320 and a flange 321.

The piston body 320 is in the form of a square pole having an outer peripheral surface slidably engaged with the inner peripheral surface of the cylinder body 311 and has a lower end from which the flange extends. As shown in FIG. 38, an appropriate number of grooves 322 are formed in the outer peripheral surface of the piston body 320 and extend continuously from the flange 321 to the free end face of the piston body 320.

The flange 321 is of a circular disk-like shape having a diameter substantially the same as the inner diameter of the second inner space 316 in the cylinder body 312. An O-ring 323 is mounted on and extends around the outer peripheral surface of the flange 321 to provide a gas-tight seal between the inner peripheral surface of the second inner space 316 in the cylinder bottom 312 and the outer peripheral surface of the flange 321, but the O-ring does not adversely affect the vertical movement of the flange 321 within the cylinder boottom 312.

The piston 310 and the cylinder 309 are so shaped and dimensioned that, when the flange 321 of the piston 310 is in contact with the bottom face of the second inner space 316 in the cylinder bottom 312, the free end face of the piston body 320 is positioned below the free end face of the cylinder body 311 and that, when the piston 310 is moved to a position in which the flange 321 is engaged with the bottom face of the cylinder body 311, the free end face of the piston body 320 is positioned at least in the same plane (in some case, the free end of the piston body 320 may extend beyond the free end face of the cylinder body 311).

The above-described design assures that, when the piston 310 is disposed in the cylinder such that the flange 321 of the piston 310 is in contact with the bottom surface of the second inner space 316 in the cylinder bottom 312, the upper surface of the piston body 320 and the inner peripheral surface of the cylinder body 311 cooperate to define a material receiving space 324 of a square horizontal cross-section.

The yoke 304 which forms a fixing means is basically the same in structure and function as the yoke 104 of the preceding embodiments and, thus, will not be described hereunder in detail. In FIG. 36, reference numeral 325 designates a pair of vertical sections, 326 designates an upper horizontal section and 327 designates a lower horizontal section which cooperates with the vertical and upper horizontal sections 325 and 326 to define an opening (which will be called hereunder as working opening 328).

To describe briefly again, the arrangement is such that, when the pressure container 302 with the insert body 303 mounted thereon is received in the working opening 328, the bottom surface of the upper horizontal section 326 is positioned at a high level with a small clearance defined between the upper surface of the pressure container 303 and the horizontal section bottom surface, the upper surface of the lower horizontal section 327 is positioned below the bottom surface of the insert body 304, and the pair of vertical sections 325 is spaced at a distance which is sufficiently greater than the diameter of the pressure container 302. The pressure container 302 may be supported by an appropriate means such as frame (not shown).

The yoke 304 is horizontally movable by a guide slidable on, for example, a pair of horizontally arranged rails (which will be termed as horizontal guides hereunder). This arrangement will be understandable by referring to FIGS. 5 and 18. When a material to be worked, such as a stack of sheets, is to be placed in the material receiving space 324, the insert body 303 should be dismounted from the pressure container 302. For this purpose, the yoke 304 is waiting at a position retracted from the pressure container 302. When a press-forming is to be performed, the yoke 304 is moved so that the pressure container 302 with the insert body 303 mounted thereon is received in the working space 328 in the yoke 304. The yoke 304 may be actuated by any driving source which, in this embodiment, is a pneumatic cylinder (not shown). However, the driving source for the yoke 304 may alternatively be an electric motor.

The yoke 304 is provided with heating means which may be of any structure so long as the heating means is operative to heat a stack of sheets in the material receiving space 324 during a pressing operation. In this embodiment, the heating means comprises electric heaters provided on the pair of vertical sections 325 and the upper and lower horizontal sections 326 and 327.

The operation of the press-formed product making apparatus of the described structure will be described hereunder.

In an initial position, the the yoke 304 is moved horizontally, for example, to a waiting position retracted from the pressure container 302 and the insert body 303. In addition, the insert body 303 is in a position in which the insert body 303 is dismounted from the cavity 5 in the pressure container 302, namely, separated from the pressure container 302. In the initial position of the insert body 303, in order to facilitate receipt of the material to be pressed into the material receiving space 324, the insert body 303 may be waiting at a position sufficiently spaced from the bottom surface of the pressure container 302 or at a position horizontally spaced from directly under the pressure container 302, although the difference in height between the upper surface of the insert body 303 and the bottom surface of the pressure container 302 is not large.

Anyway, the material to be pressed is inserted into the material receiving space 324 in the insert body 303.

The material to be press-formed may be a powdered material itself. However, in order to allow the press-formed product making apparatus of the present invention to exhibit its intended function, the material to be pressed may preferably be in the form of a ceramic green sheet having an electrically conductive layer provided on its surface or a stack of a plurality of such green sheets processed by pressing, for example, to assure that the green sheets are not separated from each other.

The green sheet is of a predetermined shape (square or rectangular in many cases and rectangular in this embodiment) usually made by preparing a body having ceramic and a binder, shaping the body into a predetermined thickness, slicing the thus shaped body into a ceramic sheet of a predetermined size and coating a surface of the ceramic sheet with an electrically conductive layer of, for example, an electrically conductive paint.

Another form of the material to be press-formed may be a lamination or stack of a plurality of ceramic sheets stacked one upon another and lightly pressed together to bond the sheets with each other, or, if required, lightly baked to secure the sheets each other or lightly bonded each other by the binder used to make the sheets.

Figure 40:
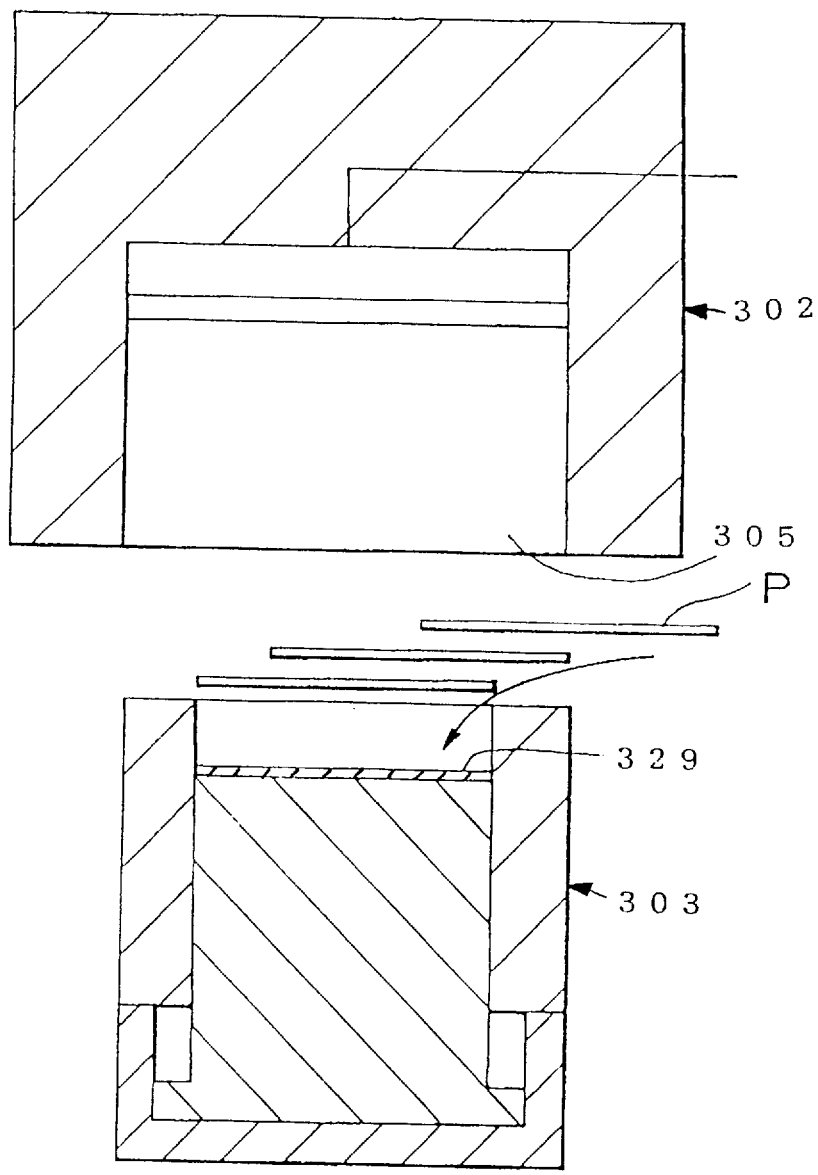
FIG. 40 is a diagrammatic sectional view of the press-forming apparatus which is an embodiment of the present invention, showing the pressure container and insert in separated positions.
Figure 41:
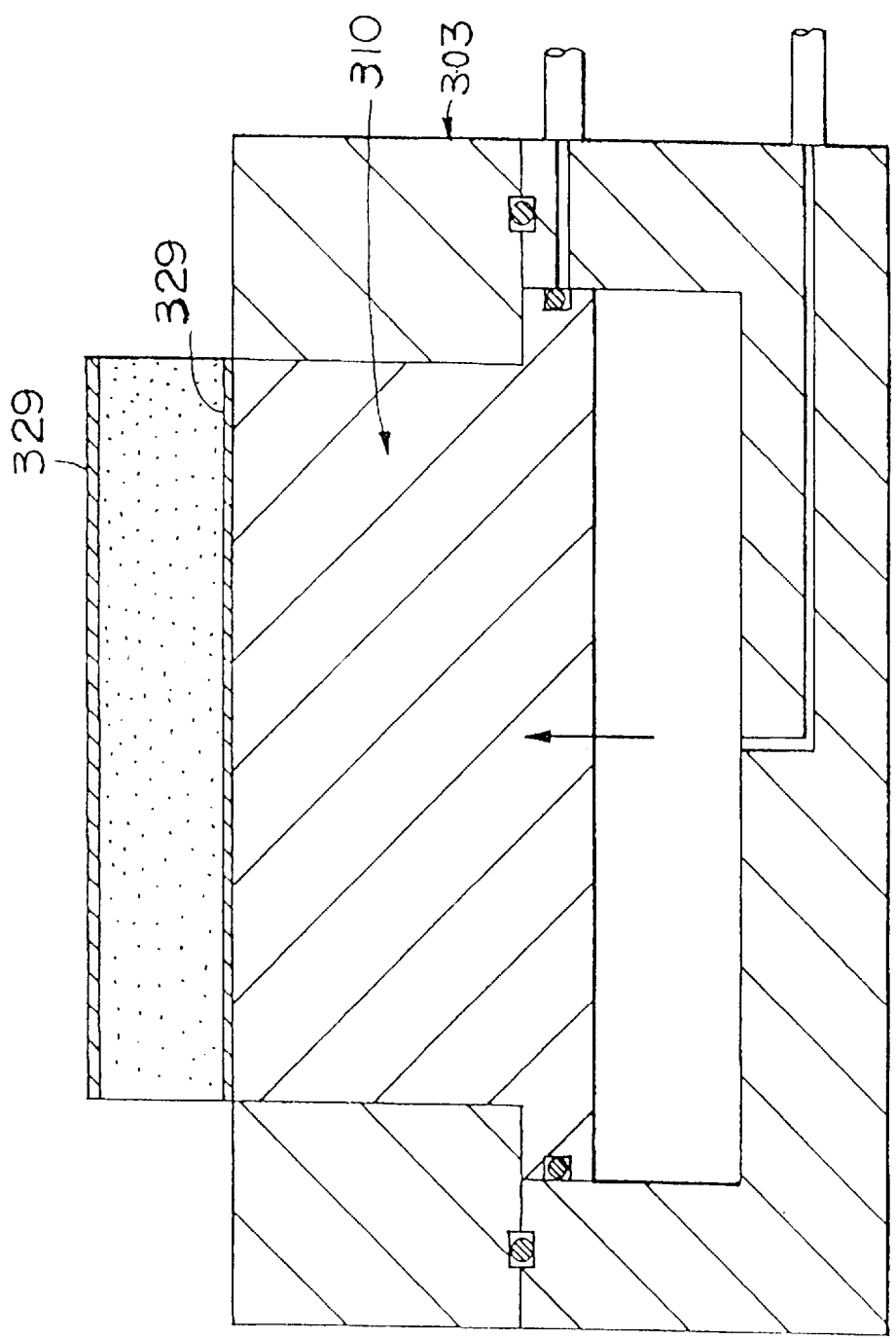
FIG. 41 is a diagrammatic sectional view of the press-forming apparatus which is an embodiment of the present invention, showing a press-formed product forced out by a piston from a material receiving space in a cylinder.

As shown in FIG. 40, a peeling sheet 329 is preferably be disposed on the free end face of the piston body 320 in the material receiving space 324 when the material P to be pressed is received in the material receiving space 324. The peeling sheet 329 disposed on the free end face of the piston body 320 is operative to prevent the material to be pressed from being stuck to the free end face of the piston body 320 to assure that a press-formed product can easily be removed from the free end face of the piston body 320.

In the case where the green sheets or a stack of such green sheets is employed as the material to be pressed, the material is of a very small thickness. Thne, even if a predetermined number of green sheets or a stack of such sheets is received in the material receiving space 324, there is a possibility that a surplus space is left between the upper surface of the thus received green sheets or the stack and the forward end face of the cylinder body 311, In such a case, a flexible member may preferably be disposed as a spacer in the surplus space.

The manner in which the spacer is disposed may be that in which the spacer is placed directly on the free end face of the piston body 320, a peeling sheet 329 is placed on the spacer, the material to be pressed is placed on the peeling sheet 329, and another peeling sheet 329 is placed on the material to be pressed such that the upper surface of the peeling sheet 329 on the material to be pressed is in substantially the same plane as the forward end face of the cylinder body 311. An alternative manner in which the spacer is disposed may be that in which a peeling sheet 329 is placed on the free end face of the piston body 320, the material to be pressed is placed on the peeling sheet 329, another peeling sheet 329 is placed on the material to be pressed and the spacer is placed on the other peeling sheet 329 such that the upper surface of the spacer is substantially in the same plane as the forward end face of the cylinder body 311.

As shown in FIG. 36, after the material to be pressed has been charged into the material receiving space 324, the insert body 303 is inserted into the cavity 305 in the pressure container 302.

Figure 39:
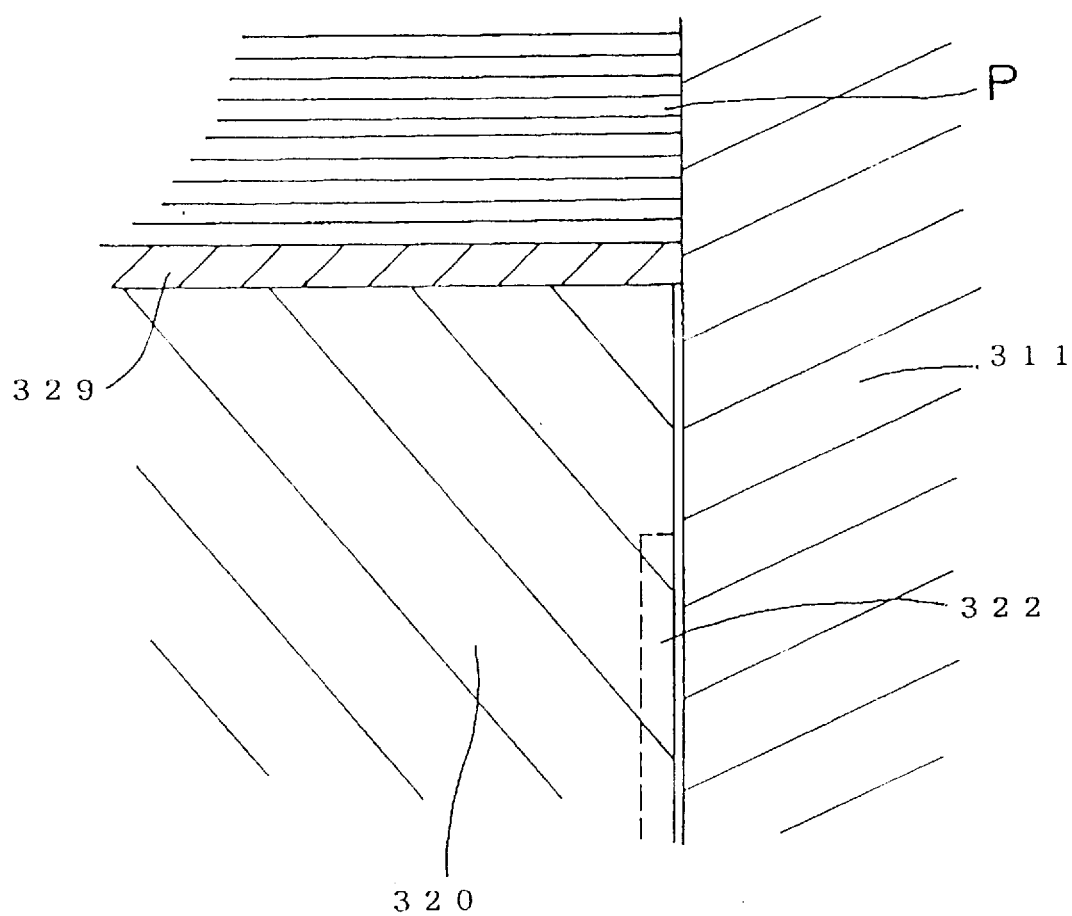
FIG. 39 is an enlarged fragmentary sectional view of the part of the apparatus encircled by a broken line in FIG. 38, showing a small clearance between the inner peripheral surface of a cylinder of the press-forming apparatus which is an embodiment of the present invention and the outer peripheral surface of a piston of the apparatus.

At this insertion time, the first air feeding and discharging means is operated to discharge the air from the material receiving space 324. In this case, as shown in FIG. 39, because a minute gap exists between the inner peripheral surface of the cylinder body 311 and the outer peripheral surface of the piston body 320, the air in the material receiving space 324 is discharged therefrom through the minute gap. In addition, because the grooves 322 are formed in the peripheral surface of the piston body 320, the resistance to the passage of air through the afore-mentioned gap is so small that the pressure in the material receiving space 324 can be speedily lowered.

As the pressure in the material receiving space 324 is lowered, the insert body 303 is urged by the atmospheric pressure quickly into the cavity 305. When the insert body 303 is completely fitted into the cavity 305, the uppermost element received in the material receiving space 324, such as the spacer or the peeling sheet 329, is in contact with the elastic member 306. In the case where a protective member is provided on the surface of the elastic member 306 adjacent to the material receiving space 324, the uppermost element received in the material receiving space 324, such as the spacer or the peeling sheet 329, is in contact with the protective member.

The first air feeding and discharging means is continusouly operated to keep the pressure in the material receiving space 324 lowered.

Then, the yoke 304 is moved to place the upper horizontal section of the yoke 304 on the upper surface of the pressure container 302 and simultaneously place the lower horizontal section 327 of the yoke 304 on the bottom surface of the insert body 303, in this embodiment, on the bottom surface of the cylinder bottom 312.

With the members positioned as described above, the pressure medium is forcibly introduced into the pressure medium containing space 307. The pressure of the pressure medium thus introduced is applied to the material to be pressed in the material receiving space 324. At the same time, the pressure of the pressure medium produces a force which is applied to the cylinder 309 and the piston 310 and tends to force the cylinder 309 and the pistion 310 out of the cavity 305. However, because the lower horizontal section 327 of the yoke 304 is placed on the bottom surface of the cylinder bottom 312 of the insert body 303, the lower horizontal section 327 firmly holds the insert body 303 to prevent the cylinder bottom 312 from being moved. Simultaneously, the pressure of the pressure memdium is also applied to the pressure container 302 and tends to move the pressure container 302 upwardly. However, the upper surface of the pressure container 302 is immovably fixed by the upper horizontal section 326 of the yoke 304. Thus, the pressure force of the pressure medium is concentrated to the material to be pressed, whereby the material is press-formed.

In the case where the interior of the material receiving space 324 is heated by the heating means provided on the yoke 304, a heating and press-forming is performed by the pressure force and the heat applied by the heating means.

Because the air in the material receiving space 324 is continuously discharged therefrom by the first air feeding and discharging means during press-forming or heating and press-forming operation, the gas contained in the material to be pressed or gas generated due to thermal dissolution of a component or components of the material to be pressed is discharged from the material receiving space 324, to thereby avoid the occurrence of voids in press-formed products which would otherwise be caused due to residue of gas in the material to be pressed or residue of gas generated by thermal dissolution.

After the pressing of the material to be pressed in the material receiving space 324 by the forcible introduction of the pressure medium is continued for a predetermined time period, the introduction of the pressure medium is stopped and the pressure medium in the pressure medium containing space 307 is discharged therefrom.

The yoke 304 is retracted to its initial position.

The insert body 303 is dismounted from the cavity 305 in the pressure container 302. In this case, the first air feeding and discharging means is operated to introduce air into the material receiving space 324 to increase the pressure therein to a level higher than the atmospheric pressure. There is a possibility that, when the first air feeding means is operated to lower the pressure in the material receiving space 324, the powder of the material to be pressed would fall into the gap between the inner peripheral surface of the cylinder body 311 and the outer peripheral surface of the piston body 320. The forcible introduction of the air into the material receiving space 324 by means of the first air feeding and discharging means, however, will blow such powder out of the gap into the material receiving space 324, to thereby prevent the sliding movement of the piston 310 from being adversely affected by the irruption of such powder into the gap between the inner peripheral surface of the cylinder 311 and the outer peripheral surface of the piston body 320.

In addition, when the first air feeding and discharging means is operated to increase the pressure in the material receiving space 324 to a level higher than the atmospheric pressure, the insert body 303 is quickly forced out of the cavity 305.

After the insert body 303 is forced out of the cavity 305, and the pressure container 302 and the insert body 303 are separated apart, the second air feeding and discharging means is operated to forcibly introduce air through the second gas introducing line 318 into a space between the bottom surface of the flange 321 of the piston 310 and the upper surface of the cylinder bottom 312. Since the O-ring is mounted on the peripheral surface of the flange 321, a gas-tight space is defined by the bottom surface of the flange 321, the upper surface of the cylinder bottom 312 and the inner peripheral surface of the cylinder bottom 312. Accordingly, the introduction of air into this gas-tight space lifts the piston body 320 so that a press-formed product received in the material receiving space 324 is forced out of the material receiving space 324 by the free end face of the piston body 320.

At this time, even if a peripheral edge portion of the press-formed product is firmly stuck to the inner peripheral surface of the cylinder body 311, the peripheral edge of the free end face of the piston body 320 is slid on the inner peripheral surface of the cylinder body 311 to force the press-formed product out of the material receiving space without causing any damage to the peripheral edge portion of the product.

The material can thus be press-formed into a product and the same can be extracted from the material receiving space without any damage to the product.

In the described embodiment, the bottom surface of the cylinder bottom 312 forms a piston limiting means.

In the present invention, the piston limiting means exhibits a function to prevent the piston 310 from being retracted by the pressure force applied to the piston 310 by the pressure medium during pressing by means of the pressure medium. In the present invention, therefore, the piston limiting means may be variously modified by a skilled person in the art to provide the above-described function.

In the described embodiment, the piston driving means comprises the gas-tight space defined by the flange and the bottom surface of the cylinder body, and the air forcibly introduced into and discharged from the gas-tight space to vertically move the piston. However, the piston driving means may be in any other form which is operative to vertically move the piston.

Modes of the present invention supported by the example 15 will be pointed out hereunder.

A first mode is a press-formed product making apparatus comprising:

a pressure container, an insert body and fixing means;

the pressure container having formed therein a cavity with an open end in an end face of the pressure container and an inner end face confronting the open end, and a pressurising means operative to pressurize the interior of the cavity via an elastic member extending across the cavity;

the insert body having a cylinder and a piston;

the cylinder having an outer peripheral surface disposed in sliding engagement with the inner peripheral surface of the cavity, an inner peripheral surface disposed in sliding engagement with the outer peripheral surface of a free end portion of the piston and cooperating with a free end face of the piston to define a material receiving space for receiving a material to be pressed, piston driving means for driving the piston, and piston limiting means operative to limit the movement of the piston caused by pressure force exerted to the piston during a press-forming operation; and the fixing means comprising a confining member for fixing together the pressure container and the insert body inserted into the cavity in the pressure container during the press-forming operation.

A second mode is a press-formed product making apparatus of the first mode, wherein the cylinder is provided with air introducing and discharging means for introducing and discharging air into and out of the material receiving space.

A third mode is a press-formed product making apparatus of the first mode or the second mode, further comprising material heating means for heating the interior of the material receiving space.

A fourth mode is a press-formed product making apparatus of any one of the first to third modes, further comprising heating means for heating the material to be pressed when the material is pressed.

According to the present invention supported by the example 15, there is provided a press-formed product making apparatus which is operative to make a press-formed product at a high yield and without causing any damage to the peripheraledge portions of the product.

According to the present invention, there is provided a press-formed product making apparatus in which an insert body can be quickly charged into a cavity in a pressure container and which provdes a good operability.

According to the present invention, there is provided a press-formed product making apparatus which is operative to bake and press-form a powdered material.

According to the present invention, there is provided press-formed product making apparatus in which an insert body can be quickly charged into a cavity in a pressure container, press-forming operation and heating and press-forming operation can be performed, and the press-formed product can be easily taken out without causing any damage to a peripheral edge portion of the product to assure a good yield.

B. PRESS-FORMING METHOD

A first mode of the press-forming method of the present invention is a method of press-forming a preform, wherein a preform is received in a forming mold having a non-gas permeable flexible film and a gas discharging port, the interior of the forming mold is kept at a reduced pressure level, and a pressure of a pressurized fluid of a variable pressure level is applied to the preform through the flexible film.

A second mode is a method of press-forming a preform according to the first mode, wherein the minimun pressure level of the variable pressure level of the pressurized fluid is lower than the atmospheric pressure.

A third mode is a method of press-forming a preform according to the first mode or the second mode, wherein the pressurized fluid is a liquid.

A fourth mode is a method of press-forming a preform according to any one of the first to the third modes, wherein the preform is a ceramic green sheet or sheets.

The press-forming method of the present invention will be described hereunder.

Preform

The preform is the same as the preform applied to the press-forming apparatus of the present invention and will not be described in detail.

Forming Mold

The forming mold used in the press-forming method may be of any structure which is capable of receiving therein a material to be press-formed and has formed therein a gas-discharging port and is provided with a non-gas permeable flexible film operative to transmit the pressure of a pressurized fluid to the preform in the mold.

The forming mold which can be used in the method of the present invention may be any one of the forming molds disclosed, for example, in Japanese Patent Publication No. Hei 3-58524 and No. Hei 3-58525.

Figure 42:
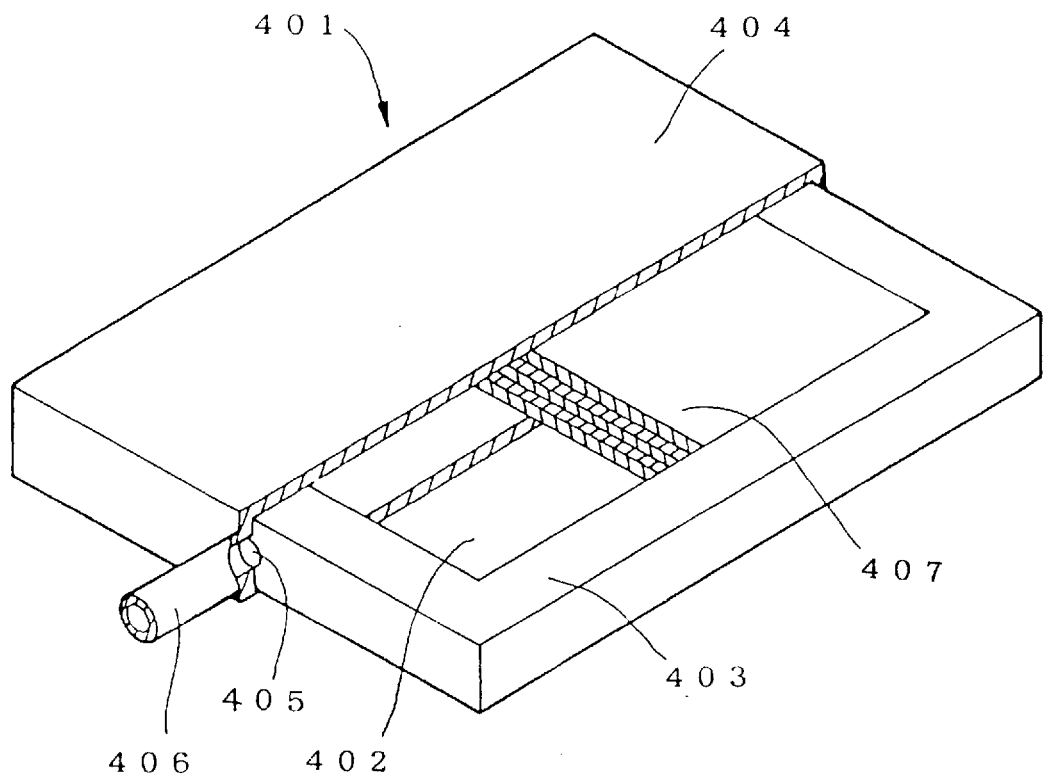
FIG. 42 is a perspective view showing an example of a forming mold used in the method of the present invention, with a part of the mold cut away.

In addition, a forming mold shown in FIG. 42, which has been invented based on the molds disclosed in these publications, can also be used in the method. The forming mold 401 shown in FIG. 42 has a plate-like frame 403 having a rectangular opening 402 opened through the front and back sides of the frame, and a bag 404 of a flexible material which can accommodate the frame 403. The frame 403 has a short side through which a through-hole 405 extends from the outer surface of the short side into the opening in the frame. The bag 404 has formed therein a discharge port 406 aligned with the through-hole 405 and a large opening (not shown) through which the plate-like frame 403 is received in the bag.

A preform can be received in the forming mold 401 in a manner to be described hereunder. For example, a thin sheet having the same area as the plate-like frame 403 is placed on the bottom surface of the plate-like frame 403 which has been removed from the bag 404. The thin sheet placed on the bottom surface of the plate-like frame 403 forms a bottom surface of the opening 402. Ceramic green sheets 407 are placed one after another in the bottomed opening 402 and stacked therein. After a predetermined number of the ceramic green sheets have been received in the opening 402, the plate-like frame 403 with the thin sheet attached thereto is inserted into the bag 404 through the large opening (not shown) thereof. At this time, it is important that the plate-like frame 403 be positioned such that the through-hole 405 provided in the frame 403 is directed toward the discharge port 406 in the bag 404. Then, the thin sheet is extracted from the bag 404, if required, to assure that the plate-like frame 403 with the green sheets 407 received in the opening 402 is left in the bag 404. The large opening of the bag 404 is then closed by suitable means.

Thus, a closed body is formed which consists of the plate-like frame 403 and the bag 404 and contains a stack of the ceramic sheets 407 received in the opening 402 of the plate-like frame 403.

As will be apparent from the above description, the forming mold which comprises a plate-like frame having formed therein a space large enough to receive a sheet-like preform, and a bag of a structure which can contain the plate-like frame in a gas-tight manner and can highly evacuate the interior of the bag, is suitable for the press-forming of the sheet-like preform such as green sheet or sheets. In this forming mold, the pressure is applied during a press-forming operation to the ceramic green sheets in the bag through the portions of the bag which cover the opening in the plate-like frame.

Figure 43:
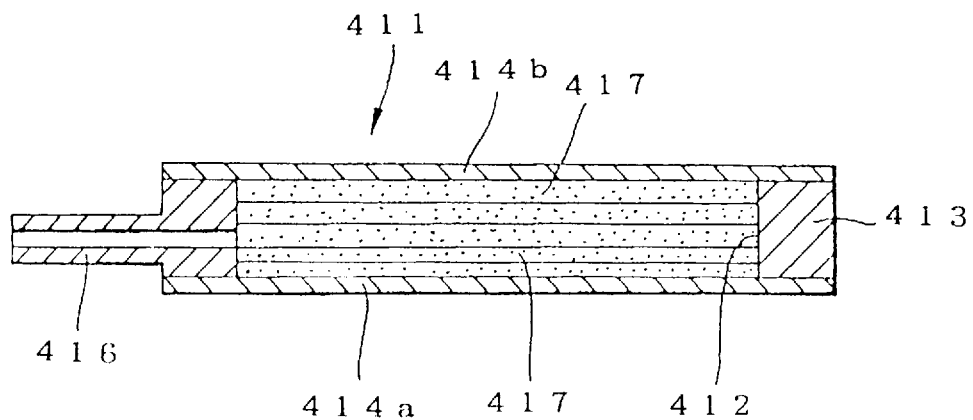
FIG. 43 is a sectional view of an example of the forming mold used in the method of the present invention.

Another mode of the forming mold which can be used in the present invention is shown in FIG. 43.

As shown in FIG. 43, the other mode of the forming mold comprises a plate-like frame 413 having formed therein a rectangular opening 412 open through the frame from the front face to the back face, as in the first mode shown in FIG. 42, and first and second flexible films 414a and 414b covering the back and front faces of the frame 413 to close the opening 412. The plate-like frame 413 is formed therein with a gas dischage port 16 for discharging gas from a space defined by the opening 412 and the first and second flexible films 414a and 414b. The first and second flexible films 414a and 414b are applied to the sides of the plalte-like frame 413 in a gas-tight manner.

A forming mold having such a structure as shown in FIG. 43 is charged with a preform in a manner to be described hereunder.

As shown in FIG. 43, the first flexible film 414a is applied completely to the back face of the plate-like frame 413 of a forming mold 411 such that there is no gap between the plate-like frame 413 and the first flexible film 414a applied thereto. As a result, the opening 412 in the plate-like frame 413 is provided witha bottom formed by the first flexible film 414a. Then, the opening 412 in the plate-like frame 413 is charged with sheet-like preforms 417 such that the opening 412 is filled with the preforms 417. The second flexible film 414b is completely appled to the upper surface of the plate-like frame 413 such that there is no gap between the frame 413 and the second flexible film 414b applied thereto. As a result, the preforms 417 are sealed in the opening 412 in a gas-tight manner. The sealing is achieved by pressing the first and second flexible films 414a and 414b by a pressing tool (not shown), or by sealingly surrounding the outer sides of the assembly except the gas discharge port 416 by a package of a thin film. In this forming mold, pressure is applied during apress-forming operation to the preforms 417 in the mold through the first and second flexible films 414a and 414b which close the opening 412 in the plate-like frame 413.

As another mode of the forming mold which can be used in the present invention may be any one of molds comprising the pressure containers and the lids or lid members of the examples 1 to 15 described hereinabove.

For example, a press-forming apparatus shown in FIG. 44 is the press-forming apparatus of example 1 which is turned upside down. To further describe briefly, the press-forming apparatus shown in FIG. 44 has the structure of the press-forming apparatus of the example 1 shown in FIG. 1.

A forming mold 421 shown in FIG. 44 comprises a base 424 having formed therein cavities 423 capable of accommodating a plurality of sheet-like preforms 422, a first flexible film 425 disposed on the bottom face of each cavity 423 to cover the bottom face in a liquid-tight manner, a second flexible film 426 covering the upper openings of the cavities 423 in a liquid-tight manner, a lid 427 closing the upper openings of the cavities 423 via the second flexible film 426, a first pressurized fluid introducing line 428 formed in the base 424 for introducing a pressurized fluid into a space between the bottom face of each cavity 423 and the first flexible film 425 therein, a second pressurized fluid introducing line 429 for introducing a pressurized fluid to apply a pressure through the second flexible film 426, and a gas discharging line 431 for discharging air from the cavities 423 through ports 430 open in the peripheral surfaces of the cavities disposed between the first flexible films 425 in the cavities 425 and the lid 427.

The press-forming method which uses the forming mold will be described later.

A further mode of the forming mold which can be used in the present invention may be the forming mold disclosed in "Reinforced Plastics Handbook, page 202, lines 1–13, and FIG. 6.64, edited by Reinforced Plastics Technology Association and published by Nikkan Kogyo Shinbun Sha".

The forming mold has a male or female mold made of plaster, FRP or sheet metal, a flexible film covering the surface of the mold and a gas discharge port for discharging gas from the space defined between the mold and the flexible sheet.

On this forming mold, a preform is mounted in a manner to be described hereunder. Namely, the preform is placed in or on the female or male mold. The flexible film is of an area greater than that of the preform and is disposed to cover the preform. An end of the film is clamped in a gas-tight manner. Thereafter, gas is discharged through the gas discharge port.

A further mode of the forming mold which can be used in the present invention may be the forming mold disclosed in" 7th Print of "Composite Material Engineering", edited by Takeshi Hayashi and published by Nikkagiren Shuppansha on Apr. 20, 1979, FIG. 6.41 on page 311 and lines 2–8 of page 312".

This forming mold comprises a metallic mold having a recess in which a preform shaped into a predetermined configuration is to be placed, a pressing plate of a flexible material such as silicone rubber to be fitted into the recess, and a bag of a flexible material for accommodating the mold in its entirety.

In this forming mold, the preform is placed in a manner to be described hereunder. Namely, a predetermined number of the preforms of a predetermined configuration are placed in the recess, the pressing plate is then placed on the preforms, and the metallic mold with the pressing plate placed therein is received in its entirety in the bag of the flexible material.

The forming molds described above are suitable for press-forming a sheet-like or film-like preform. In the case where the material to be press-formed is a powdery or granular material, a forming mold to be described hereinunder is suitable.

An example of the forming mold suitable for forming a powdery material comprises a pair of lids disposed in a cylindrical space in a pressure-resistant pressure container and positioned at the top and bottom of a cylindrical wire screen or a cylindrical body of a metal with a large number of perforations formed in its peripheral wall, and a cylindrical flexible film disposed inside the cylindrical wire screen or cylindrical metal body. One or both of the pair of lids is or are provided with gas discharge port or ports. The pressure container is provided with pressure medium introducing means for forcibly introducing a pressure medium into the cylindrical space in the container.

In this forming mold, the cylindrical space defined by the lids and the cylindrical film is charge with an amount of powdery or granular material.

Press-forming method

The press-forming method can utilize the forming mold described above but, more preferably, may utilize any one of the press-forming molds disclosed in the examples 1–15.

In the press-forming method of the present invention, a preform or material to be formed is received in a forming mold having a gas-impermeable flexible film and a gas discharge port, the pressure within the mold is kept at a lowered pressure level, and pressure of a pressurized fluid having a variable pressure level is applied through the flexible film to the preform.

What is important in the present invention is that the pressure of the pressurized fluid having variable pressure level is applied through the flexible film to the preform while the pressure within the forming mold is kept at a lowered pressure level. If a pressure without pressure variation is simply applied, there is a possibility that the gas discharge port or gas discharging pipe communicated with the space in the forming mold is blocked. However, the application of a pressure having a varying pressure level to the flexible film is effective to assure that the blockage is released when the pressure being applied is at a lowered level, to thereby prevent continued blockage of the gas discharge port. Accordingly, even if gas is generated due to press-forming of a preform, the thus generated gas can be discharged out of the mold to thereby assure that press-formed produce without voids, cracks and bubbles therein can be obtained.

It is preferred that the preform be heated during a press-forming operation. The temperature of the heating may vary depending on the kinds of preforms to be press-formed. For example, a temperature of from 70 to 140 degrees C. and, more preferabaly, from 80 to 90 degrees C., is preferred for ceramic green sheets. A temperature of, normally, from 120 to 180 degrees C. is preferred for an epoxy-based prepreg. For a prepreg of a room temperature setting type, a temperature of from 20 to 80 degrees C. is preferred. A temperature of, normally, from 150 to 220 degrees C. is preferred for a ceramic reinforced ceramic prepreg containing unhardened resin, namely, a prepreg comprising reinforcing fibers, ceramic particles, unhardened resin, a setting agent, a solvent and so on. A temperature of from room temperature to 140 degrees C. is preferred for powdery ceramics. For a thermoplastic resin prepreg, a temperature higher than the fluidizing temperature of the resin is preferred. The temperature ranges pointed out above are applicable to the ranges of the temperature levels attained by the heating means of the examples 1–15.

As for the heating time, in the case where the preform is a prepreg, a heating time of more than 30 minutes is sometimes required, to harden a resin at B stage under pressure. In the case where the preform is a thermoplastic resin prepreg, a heating time shorter than 30 minutes is sufficient in some time.

Regarding the extent of the reduction in the pressure in the forming mold during a press-forming operation in which the press-forming apparatus disclosed in the examples 1–15 is used, the higher the pressure reduction is, the better the result is. A pressure lower than 1 Torr, preferably, lower than 0.1 Torr, is preferred for ceramic green sheets and powdery ceramics. However, for a prepreg having a higher fluidity, a pressure of such a high vacuum level is not required and, instead, a pressure of at least lower than 20 Torr and, preferably, lower than 5 Torr, is sufficient.

Concerning the fluid pressure applied during a forming operation, a pressure of from 1 to 5 atm, normally from 1.5 to 3 atm, is preferred for a pepreg containing an unhardened resin. A pressure of from 200 to 2,000 atm and, preferably, from 350 to 400 atm, is preferred for ceramic green sheets. For powdery ceramics, a pressure of from 500 to 5,000 atm and, preferably, from 1,000 to 4,200 atm, is preferred. The preferred pressure for thermoplastic resin prepreg varies depending upon the temperature. A pressure of a too high level is not required at a high temperature, but the required pressure becomes higher as the temperature is lowered toward the fluidizing temperature. In any case, however, a pressure of up to 10 atm is enough.

It is usual to continuously apply heat and pressure to prepreg containing unhardened resin for more than 30 mimutes until the prepreg is hardened. However, powdery ceramic is usually heated and pressed for about 10 minutes, whereas green sheets are heated and pressed for about 20 minutes.

Regarding the pressure fluctuation during a pressforming operation, a method can be taught in which, after the pressure within the forming mold has been reduced to a predetermined level and the pressure to be applied to the forming mold has reached a predetermined level, a predetermined pressure reduction is performed in a predetermined time period such that predetermined pressurization and predetermined pressure reduction are repeated predetermined times. Alternatively, after the pressure applied to the flexible film has reached a predetermined high pressure level, this pressure may be kept at this high level for a predetermined time period and, thereafter, the pressure being applied may be lowered to a predetermined low pressure level and then kept at this low pressure level for a predetermined time period.

The fluid pressure in a pressure reduction period may be higher than the pressure level within the forming mold but lower than 2 atm which is higher than the pressure level in the mold and, more preferably, higher than the pressure level in the forming mold and lower than 1 atm which is higher than the pressure level in the mold. Usually, however, the pressure in a pressure reduction period is restored to the normal pressure level. It should be avoided that the pressure be lowered to the same level as the pressure level within the forming mold or lower than that so as to prevent the sealing effect from being spoiled.

The pressure reduction time period during a press-forming operation ranges, usually, from 1 to 2 minutes.

The pressure to be applied to the forming mold is obtained, usually, from a pressurized fluid.

Various modes of the press-forming operation will be described hereunder.

When a forming mold of the structure shown in FIG. 42 is used, a hydrostatic press apparatus may preferably be used to perform a press-forming operation. The forming mold with a stack of a plurality of ceramic green sheets received in the opening thereof, as shown in FIG. 42, is received in a pressing chamber in the hydrostatic press apparatus. The hydrostatic press apparatus comprises the pressing chamber formed in, for example, a pressure resistant container, pressure reducing means communicated with a gas discharge port in a forming mold received in the pressing chamber to reduce the pressure in the forming mold, and pressure medium introducing means for introducing a pressure medium into the pressing chamber, the pressure medium introducing means comprising a pressure medium introducing port open to the pressing chamber, a pressure medium introducing line connected to the pressure medium introducing port, a pressure medium feeding pump for feeding the pressure medium into the pressure medium introducing line, and so on. The preform is placed in the pressing chamber in the hydrostatic press apparatus and the gas discharge port in the forming mold is connected to the pressure reducing means. The pressure in the space in the opening in the forming mold in the pressing chamber is reduced by the gas discharging means and the pressure medium introducing means is operated to introduce the pressure medium into the pressing chamber. After the lapse of a predetermined time period after the pressure in the pressing chamber has been raised to a predetermined high pressure level and the pressure in the forming mold has been lowered to a predetermined low pressure level, the high pressure level is lowered to a low pressure level and then restored to the original high pressure level. The lowering of the pressure is repeated predetermined times. The ceramic green sheets may be heated, as required, to a predetermined temperature during the press-forming operation. In the press-forming operation, the high pressure of the pressure medium is applied through the bag of the flexible film to the ceramic green sheets to produce a press-formed product. Even if gas is generated in the ceramic green sheets during the press-forming operation, the generated gas is discharged through the gas discharge port due to the repeated lowerings of the pressure.

After the lapse of a predetermined time period, the pressure medium in the pressing chamber is discharged therefrom and the reduced pressure level in the forming mold is restored to the normal pressure level to finish the press-forming operation.

The above-described hydrostatic press apparatus may also be utilized to perform a press-forming operation by means of the forming mold shown in FIG. 43. In the case of the forming mold shown in FIG. 43, pressure is applied to the preform through the first and second flexible films.

With respect to the forming mold shown in FIG. 44, a stack of a plurality of sheet-like preforms 422 is placed on the first flexible film 425 in each cavity 423 in the base 424. The upper openings of the cavities 423 charged with the plurality of preforms 422 are covered with the second flexible film 426. The upper openings of the cavities 423 thus covered with the second flexible film 426 are further covered with the lid 427. The lid 427 is fixed by means of the fixing member 432. The fixing by means of the fixing member 432 can be achieved by fixing the lid 427 by the fixing member 432 to the base or by disposing the fixing member 432 on the upper end face of the lid 427 so as to assure that the lid 427 is prevented from being projected from the upper opening during a press-forming of the preforms 422 such as green sheets.

Then, the air in the cavities 423 is discharged there from through the gas discharge line 431 to establish a high level of vacuum in the cavities 423. Simultaneously with or after the completion of the discharge of the air, a press-forming of the preforms is performed in the manner to be described hereunder.

A pressure medium is forcibly introduced through the first pressure medium introducing line 428 into the space between the bottom surface of each cavity 423 and the associated first flexible film 425, while a pressure medium is also forcibly introduced through the second pressure medium introducing means 429 into the space between the second flexible film 426 and the lid 427. Thus, the pressure forces of the thus introduced pressure mediums are applied through the first and second flexible films 425 and 426 to a plurality of stacked preforms 422 to integrally connect them together. At this time, because the lid 427 is fixed by th e fixing member 432, pressing forces acting in the confronting vector directions are applied by the first and second flexible films 425 and 426 to the plurality of stacked preforms 422.

During press-forming operation by means of pressurized fluid, lowering of pressure is repeated at predetermined intervals to cause a variation in the pressure of the pressurized fluid. When a press-forming operation for a predetermined time period has been finished, the pressure of the pressurized fluid in the space between the lid 427 and the second flexible film 426 is restored to the normal pressure level and, at the same time, the pressure of the pressurized fluid in the space between the bottom surface of each cavity 423 and the associated first flexible film 425 is also restored to the normal pressure level. The fixing member 432 is released to free the lid 427 and, then, the lid 427 is removed from the upper opening of the cavities 423. The first pressurized fluid introducing line 428 is operated to introduce the pressurized fluid into the space between the bottom of each cavity 423 and the associated first flexible film 425 to force a press-formed laminated ceramic product out of the cavity 423. The thus forced laminated ceramic product is taken out of the cavity 423.

Also in the case where a powdery material is to be press-formed, the press-forming according to the method of the present invention can be performed, wherein, essentially, the pressure within the forming mold is lowered to a predetermined level and a pressure is applied through a flexible film to the material in the forming mold while the pressure being applied is varied.

The press-forming method according to the present invention can be carried out by use of the press-forming apparatus or press-formed product making apparatus disclosed in the examples 1–15.

For example, in the case where the press-forming apparatus shown in FIG. 19 is used, the yoke 105 is initially at a waiting position retracted from the pressure container 101. The lid body 129 is also waiting at a position retracted from the lower opening of the cylindrical first body 106.

A preform in the form of a stack of sheets 124 is placed on the upper surface of the projecting portion 128. The lid member body 129 is horizontally turned to a position in which the projecting portion 128 is positioned immediately under the lower opening of the first body 106. Then, the lid member body 129 is lifted to fit the projecting portion 128 into the lower opening of the first body 106.

When the projecting portion 128 is fitted into the lower opening, the pressure in the material receiving space is lowered by means of the gas introducing and discharging line 141 to assure that the projecting portion 128 is fitted into the lower opening quickly (or, in other words, "fitted in a moment"). After the projecting portion 128 has been fitted into the lower opening 128, the yoke 105 is moved horizontally to receive the pressure container 101 in the working opening 145.

Then, the pressure medium is forcibly introduced through the pressure medium introducing and discharging line 121 into the pressure medium containing space 118. Due to the introduction of the pressure medium, pressure is applied through the elastic member 103 to the stacked sheets 124. The pressure of the pressure medium acts on the lid member body 129 tending to move the same downwardly. However, the lid member body 129 is confined by the lower horizontal section 144 of the yoke 105 and, thus, prevented from being moved downwardly. On the other hand, because the lid member body 129 is not movable downwardly, the pressure of the pressure medium acts on the second body 107, which is the cover member, and tends to move the same upwardly. However, the second body 107 is confined by the upper horizontal section 143 of the yoke 105 against upward movement and, thus, is not movable upwardly. As a result, the stacked sheets 124 are pressed at a high pressure by the elastic member 103 and the upper surface of the projecting portion 128.

The gas in the material receiving space is discharged through the gas introducing and discharging line 141 to establish a high level of vacuum in the material receiving space.

The pressure medium is discharged from and introduced into the pressure medium containing space through the pressure medium introducing and discharging line 121 to vary the pressure of the pressure medium. The manner in which the pressure is varied has been described hereinabove.

After the pressing by the pressure medium and the depression of the pressure in the material receiving space are held for a predetermined time period, gas is introduced into the material receiving space through the gas introducing and discharging line 141 to restore the pressure in the space to the normal level and the pressure medium in the pressure medium containing space 181 is discharged therefrom through the pressure medium introducing and discharging line 121 to remove the pressing force.

When the pressing force by the pressure medium has been reduced to substantially zero, the yoke 105 is horizontally moved to cause the pressure container 101 to be retracted from the working space 63.

Gas is forcibly introduced into the material receiving space through the gas introducing and discharging line 141 while driving means, not shown, is driven to lower the lid member body 129 to retract the projecting portion 128 from the lower opening. At this time, because the gas is forcibly introduced into the material receiving space, the removal of the projecting portion 128 from the lower opening is carried out very smoothly and quickly.

Preferably, when the projecting portion 128 is extracted from the lower opening, gas is forced into the material receiving space and, at the same time, the gas in the pressure mmedium containing space 118 is sucked and discharged therefrom through the pressure medium introducing and discharging line 121. In other words, the material receiving space is pressurized and the pressure medium containing space 118 is depressed. Due to this pressurization and depression, the elastic member 103 which was bulged into the material receiving space during press-forming operation is restored to its initial position. As a result, because the elastic member 103 is restored to flat position, a succeeding press-forming operation can immediately be started. In addition, the elastic member 103 is not broken due to tension when the projecting portion 128 is retracted from the lower opening.

The press-forming apparatus shown in FIG. 19 is structured such that the lid member body 129 is fitted into the lower opening of the first body 106 and the second body 107 is connected to the upper opening of the first body 106. The press-forming apparatus shown in FIG. 19, however, may be modified such that the lid member body 129 is fitted into the upper opening of the first body 106 while the second body 107 is fitted into the lower opening of the first body 106. In other words, this modification corresponds to the press-forming apparatus which is turned upside down. This modification is shown, for example, in FIG. 12. The press-forming apparatus of this modification can provide a functional merit the same as that of the press-forming apparatus shown in FIG. 44.

The press-forming apparatus which can be used may be the rubber press apparatus disclosed in "Powdery Material Forming Apparatus" by Japan Powder Industrial Technique Research Association, in addition to the hydrostatic press apparatus described above.

Products having flat outer peripheries have been disclosed in the description for the purpose of simplification. However, spherical formed product free of defects, dome-shaped formed product, lattice-like formed product, pipe-shaped formed product, spiral formed product, etc. can also be made.

Formed Product

By the method of the invention, various formed products can be made according to the structures of the forming molds used. The formed products made by the method of the invention are ceramic capacitors, large-sized airplane radar domes and other airplane components, submarine radar domes, submarine sonar domes, IC packages, valve members, pump impellers, turbine blades, jet engine exhaust port plugs, furnace materials and so on. Moreover, the publicly known FRP formed products may also be formed by the method of the invention.

EXAMPLE 16

A stack of one hundred green sheets or preforms 422 having internal electrodes formed in their surfaces was charged into a cavity 423 in a forming mold 421 of a structure shown in FIG. 44. In this embodiment, the base 424 had formed therein a single cavity 423 having a square horizontal cross-section of a size of 140 mm×140 mm and a depth of 10 mm.

After the cavity 423 was charged with the stack, the opening of the cavity 423 was closed by the second flexible film 426 and the lid 427 was mounted on the opening of the base. The press assembly comprising the base 424 and the lid 427 was placed in the opening in the frame yoke or fixing member 32.

Then, the gas in the cavity 423 was discharged through the gas discharge line 431 until the pressure therein reached 0.1 Torr. The discharge was then stopped but the cavity 423 was kept at the above-mentioned reduced pressure level. In this condition, a pressure liquid of 80 degrees C. was forcibly introduced through the first and second pressure medium introducing lines 428 and 429 to apply pressure of 300 atm to the first and second flexible films 425 and 426. The pressure of the pressure medium was maintained at 300 atm for fifteen minutes. Thereafter, the pressure was removed to obtain a press-formed product (which is hereinafter termed as 1-cycle press-formed product). The cycle of the pressurization and depression conducted in the process was one cycle.

Apart from the above, similar pressurization and depression were repeated two cycles to obtain another press-formed product (called hereinafter as 2-cycle press-formed product). A further press-formed product (called as 3-cyle press-formed product) was obtained by repeating pressurization and depression three cycles.

Two 1-cycle press-formed products, two 2-cycle press-formed products and two 3-cycle press-formed products were thus prepared. The press-formed products thus prepared were each cut into pieces each of 5 mm square to make one hundred samples of each kind of the products. The samples were then baked in a furnace at 450 degrees C. for 3 days and, thereafter, further baked at 1,300 degrees for 4 hours. The laminated cross-sections were observed by an optical microscope to check cracks between layers. The laminated products each having even a single crack were evaluated to be defective.

The results of the evaluation were that the one hundred samples of the 1-cycle press-formed produces included ninteen (19) defective samples, the one hundred samples of the 2-cycle press-formed products included seven (7) defective samples and the one hundred samples of the 3-cycle press-formed products include two (2) defective samples. From these results, it can be understood that, by repeating pressurization and depression during the press-forming of the preforms, namely, by causing pressure variation during press-forming operation, the occurrence of defective products could be prevented to provide a high production yield.

In the following claims, forcibly introducing gas means supplying gas under pressure, and forcibly discharging means applying a vacuum.

We claim:

1. A press-forming apparatus comprising a pressure container and fixing means for holding the container closed; the container further comprising:

(a) a base including
a cavity having an opening, an inner wall, and a cavity inner end face,
a first elastic member fixed to the inner wall and extending across the cavity to define within the cavity a fluid space and a material-containing space, the fluid space and the material-containing space being sealingly separated by the first elastic member,
whereby the material-containing space is bounded by the inner wall and the first elastic member and the fluid space is bounded by the inner wall and the cavity inner end face;

(b) a lid for closing the cavity;
wherein the fixing means includes means for holding the lid onto the base;

(c) fluid means for forcibly introducing and discharging a fluid into and out of the fluid space;

(d) gas means for forcibly introducing and discharging a gas into and out of the material-containing space;

(e) heating means for heating the material-containing space;
wherein the fixing means further comprises
a frame including a central space for receiving therein the pressure container, the central space being bounded by a pair of horizontal submembers for confining upper and lower container faces of the pressure container; and
moving means for the frame to move to a retracted position where the pressure container is not in the central space.

2. The press-forming apparatus according to claim 1, wherein the lid further comprises
a lid face to cover the opening of the cavity,
a recess in the lid face, and
a second elastic member extended to cover the recess in a liquid-tight manner and define a pressing space therewithin; and
a pressing fluid sealed within the pressing space.

3. The press-forming apparatus according to claim 2, wherein the second elastic member further comprises a liquid-tight bag in the pressing space and wherein the pressing fluid is sealed within the bag.

4. The press-forming apparatus according to claim 2, wherein the pressing fluid is a liquid.

5. A press-forming apparatus comprising a pressure container and fixing means for holding the container closed; the container further comprising:

(a) a base including
a cavity having an opening, an inner wall, and a cavity inner end face,
a first elastic member fixed to the inner wall and extending across the cavity to define within the cavity a fluid space and a material-containing space, the fluid space and the material-containing space being sealingly separated by the first elastic member, whereby the material-containing space is bounded by the inner wall and the first elastic member and the fluid space is bounded by the inner wall and the cavity inner end face;

(b) a lid for closing the cavity;
wherein the fixing means includes means for holding the lid onto the base;

(c) fluid means for forcibly introducing and discharging a fluid into and out of the fluid space;

(d) gas means for forcibly introducing and discharging a gas into and out of the material-containing space; and (e) heating means for heating the material-containing space;
wherein the lid further comprises
a lid face to cover the opening of the cavity and
a projecting portion on the lid face, the projecting portion having an outer wall and an outer end face comprising means for the projecting portion to fit into the cavity; and
the projecting portion including a gas passage having a first end opening into the material-containing space at the outer end face and a second end communicating with the gas means.

6. A press-forming apparatus comprising a pressure container and fixing means for holding the container closed;
the container further comprising:
(a) a base including
a cavity having an opening, an inner wall, and a cavity inner end face,
a first elastic member fixed to the inner wall and extending across the cavity to define within the cavity a fluid space and a material-containing space, the fluid space and the material-containing space being sealingly separated by the first elastic member,
whereby the material-containing space is bounded by the inner wall and the first elastic member and the fluid space is bounded by the inner wall and the cavity inner end face;

(b) a lid for closing the cavity;
wherein the fixing means includes means for holding the lid onto the base;

(c) fluid means for forcibly introducing and discharging a fluid into and out of the fluid space;

(d) gas means for forcibly introducing and discharging a gas into and out of the material-containing space; and (e) heating means for heating the material-containing space;

wherein the lid further comprises
a lid face to cover the opening of the cavity;
a projecting portion on the lid face, the projecting portion having an outer wall and an outer end face comprising means for the projecting portion to fit into the cavity; and
the projecting portion including a gas passage having a first end opening into the material-containing space at the outer wall and a second end communicating with the gas means.

7. The press-forming apparatus according to claim 6, including an O-ring intermediate the lid face and the first end opening of the gas passage.

8. A press-forming apparatus comprising:

a pressure container having formed therein a cavity with an opening at one end and an inner end face confronting said opening, and an elastic member disposed to extend across said cavity and cooperate with said inner end face of said cavity and an inner peripheral surface thereof to define a first pressurized fluid containing space;

pressurized fluid introducing and discharging means for forcibly introducing and discharging a pressurized fluid into and out of said first pressurized fluid containing space;

an insert to be inserted into said cavity; and fixing means for fixing said insert to said pressure container so as not to be separable therefrom when a press-forming of a preform received in said pressure container is performed with said insert received in said cavity in said pressure container;

said insert having a cylinder and a piston;

said cylinder having a cylinder outer peripheral surface to be disposed in sliding engagement with said inner peripheral surface of said cavity, an inner cylinder peripheral surface to be disposed in sliding engagement with a piston outer peripheral surface of a free end portion of said piston, a material receiving space defined by a free end face of said piston and said inner cylinder peripheral surface, and piston driving means for actuating said piston;

wherein said cylinder is provided with gas introducing and discharging means for discharging and introducing gas from and into said material receiving space.

9. The press-forming apparatus according to claim 8, wherein the piston-driving means exerts a force between the piston and the cylinder.

* * * * *